US010708385B2

(12) United States Patent
Tachi et al.

(10) Patent No.: US 10,708,385 B2
(45) Date of Patent: Jul. 7, 2020

(54) INFORMATION PROCESSING APPARATUS, SYSTEM, INFORMATION PROCESSING METHOD, AND PROGRAM

(71) Applicant: CANON KABUSHIKI KAISHA, Tokyo (JP)

(72) Inventors: Daiki Tachi, Kawasaki (JP); Masashi Nishiyama, Tokyo (JP); Kenta Fukushima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 16/043,150

(22) Filed: Jul. 23, 2018

(65) Prior Publication Data

US 2018/0332137 A1 Nov. 15, 2018

Related U.S. Application Data

(62) Division of application No. 14/659,344, filed on Mar. 16, 2015, now abandoned.

(30) Foreign Application Priority Data

Mar. 18, 2014 (JP) .................................. 2014-055371

(51) Int. Cl.
*H04L 29/08* (2006.01)
*H04L 29/06* (2006.01)
(52) U.S. Cl.
CPC ............ *H04L 67/32* (2013.01); *H04L 63/029* (2013.01); *H04L 67/02* (2013.01);
(Continued)

(58) Field of Classification Search
None
See application file for complete search history.

(56) References Cited

U.S. PATENT DOCUMENTS 8,885,466 B1 * 11/2014 Seleznyov .............. H04W 4/50
370/229
2002/0104022 A1 * 8/2002 Jorgenson ............... H04L 29/06
726/12

(Continued)

FOREIGN PATENT DOCUMENTS

CN 1753392 A 3/2006
JP 2002223483 A 8/2002
(Continued)

Primary Examiner — Natisha D Cox
(74) Attorney, Agent, or Firm — Canon U.S.A., Inc. I.P. Division

(57) ABSTRACT

To improve convenience in use of a web service in a secure communication environment, an information processing apparatus includes a conversion unit configured to convert a communication request according to a first format into a communication request according to a second format, a request transmission unit configured to transmit the communication request according to the second format that is converted by the conversion unit, a response reception unit configured to receive a communication response according to the second format returned in response to the communication request according to the second format transmitted by the request transmission unit, and an acquisition unit configured to acquire a communication response according to the first format converted from the communication response according to the second format received by the response reception unit as a response to the communication request according to the first format.

43 Claims, 45 Drawing Sheets

(52) U.S. Cl.
CPC ...... *H04L 67/2823* (2013.01); *H04L 67/2876* (2013.01); *H04L 67/42* (2013.01)

(56) References Cited

U.S. PATENT DOCUMENTS

| | | | | |
|---|---|---|---|---|
| 2003/0187631 | A1* | 10/2003 | Masushige | H04L 63/0281 703/27 |
| 2005/0229243 | A1 | 10/2005 | Svendsen | |
| 2005/0232283 | A1 | 10/2005 | Moyer et al. | |
| 2006/0061803 | A1 | 3/2006 | Oka | |
| 2007/0150610 | A1 | 6/2007 | Vassilev et al. | |
| 2009/0077251 | A1 | 3/2009 | Brown et al. | |
| 2012/0233464 | A1 | 9/2012 | Miller | |
| 2013/0262696 | A1* | 10/2013 | Watanabe | H04L 45/00 709/238 |
| 2013/0288661 | A1* | 10/2013 | Shimizu | G08C 17/00 455/419 |
| 2014/0006475 | A1* | 1/2014 | Harpster | H04L 67/2804 709/202 |
| 2014/0075533 | A1* | 3/2014 | Young | G06F 21/552 726/11 |
| 2014/0075541 | A1 | 3/2014 | Young | |
| 2014/0082173 | A1 | 3/2014 | Kaneko | |
| 2014/0085061 | A1* | 3/2014 | Shimizu | H04M 1/72533 340/12.5 |
| 2015/0381563 | A1* | 12/2015 | Seo | H04L 12/6418 370/401 |
| 2016/0165078 | A1* | 6/2016 | Nishiyama | G06F 3/1203 358/1.15 |

FOREIGN PATENT DOCUMENTS

| | | |
|---|---|---|
| JP | 2005-202918 A | 7/2005 |
| JP | 2005-208974 A | 8/2005 |
| JP | 2008102704 A | 5/2008 |
| JP | 2011124652 A | 6/2011 |
| JP | 2011186912 A | 9/2011 |
| JP | 2011257945 A | 12/2011 |
| JP | 2013162389 A | 8/2013 |
| JP | 2014006910 A | 1/2014 |
| KR | 10-2008-0039382 A | 5/2008 |
| KR | 10-2011-0015382 A | 2/2011 |
| KR | 10-2012-0114228 A | 10/2012 |
| WO | 2007/053029 A1 | 5/2007 |
| WO | WO-2007053029 A1 * | 5/2007 ............. H04L 67/42 |

* cited by examiner

FIG.6A

```
GET /index.html HTTP/1.1
Accept: image/gif, image/x-xbitmap, image/jpeg, image/pjpeg,
image/x-jg, */*
Referer: http://xxx.xxx.xxx.xxx/index.html
Accept-Language: ja, en
User-Agent: Mozilla/2.0 (compatible; MSIE 3.01; Windows NT)
Host: xxx.xxx.xxx.xxx
Connection: Keep-Alive
```

FIG.6B

```
POST /datapost HTTP/1.0
Host: yyy.yyy.yyy.yyy
Content-type: text/plain

ID:0001
GET /index.html HTTP/1.1
Accept: image/gif, image/x-xbitmap, image/jpeg, image/pjpeg, image/x-jg, */*
Referer: http://xxx.xxx.xxx.xxx/index.html
Accept-Language: ja, en
User-Agent: Mozilla/2.0 (compatible; MSIE 3.01; Windows NT)
Host: xxx.xxx.xxx.xxx
Connection: Keep-Alive
```

FIG.7

| 601 | 602 | 603 | 604 |
|---|---|---|---|
| ID | TRANSMISSION TIME | USERNAME | STORAGE URL FOR CLIENT |
| 001 | OCTOBER 28/2013 11:23 | AAA | http://yyy.yyy.yyy.yyy/postdata |

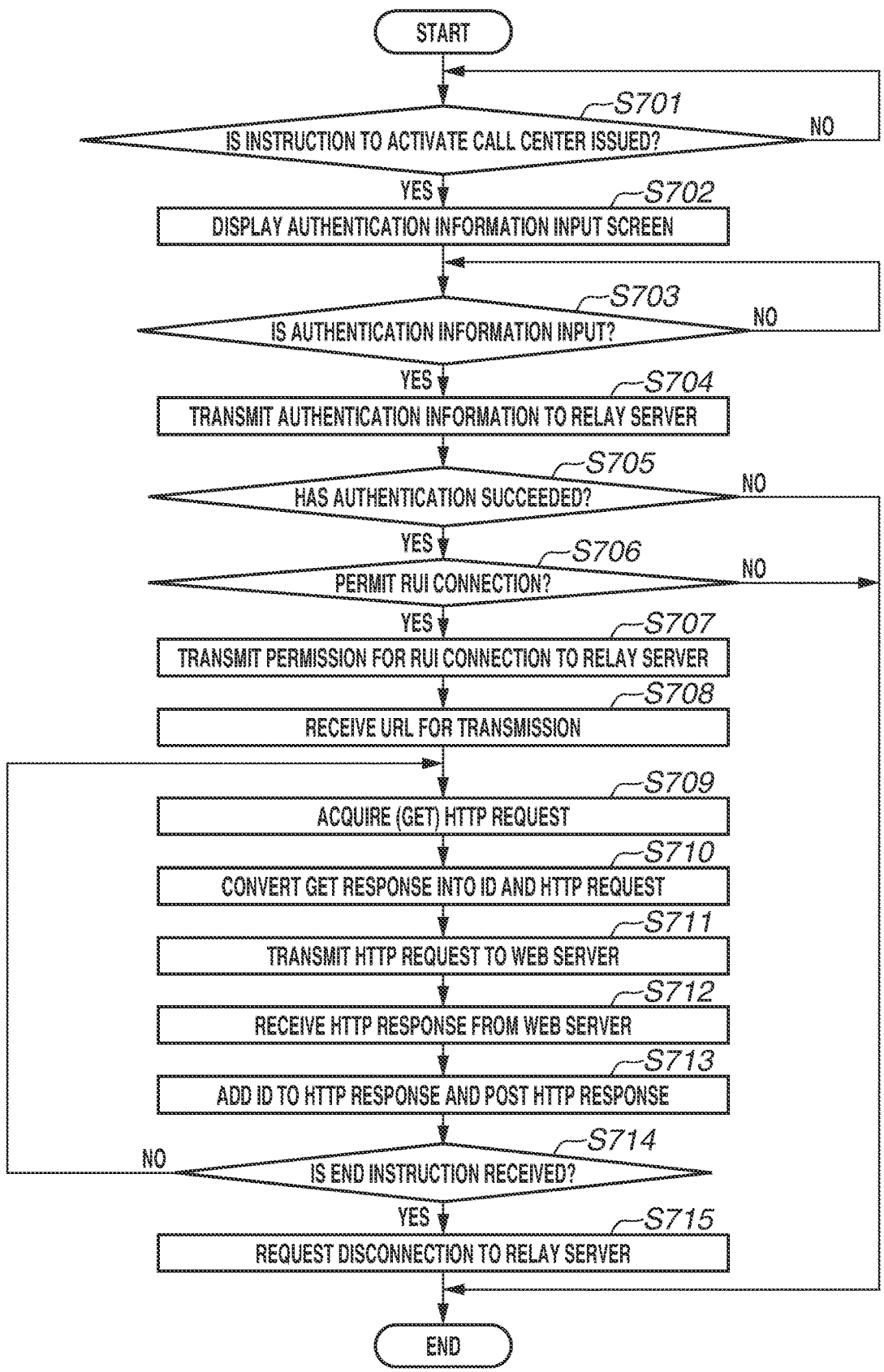

FIG.10A

GET /datapost HTTP/1.1
Accept: image/gif, image/x-xbitmap, image/jpeg, image/pjpeg, image/x-jg, */*
Referer: http://yyy.yyy.yyy.yyy/datapost
Accept-Language: ja, en
User-Agent: Mozilla/2.0 (compatible; MSIE 3.01; Windows NT)
Host: yyy.yyy.yyy.yyy
Connection: Keep-Alive

FIG.10B

HTTP/1.0 200 OK
Server: Netscape-Enterprize/4.1
Date: Mon, 21 Oct 2013 09:06:11 GMT
Content-Type: text/html
Transfer-Encoding:

ID:0001
GET /index.html HTTP/1.1
Accept: image/gif, image/x-xbitmap, image/jpeg, image/pjpeg, image/x-jg, */*
Referer: http://xxx.xxx.xxx.xxx/index.html
Accept-Language: ja, en
User-Agent: Mozilla/2.0 (compatible; MSIE 3.01; Windows NT)
Host: xxx.xxx.xxx.xxx
Connection: Keep-Alive

FIG.10C

HTTP/1.0 200 OK
Server: Netscape-Enterprize/4.1
Date: Mon, 21 Oct 2013 09:06:11 GMT
Content-Type: text/html
Transfer-Encoding:
<html>
<hean>
   .
   .
   .

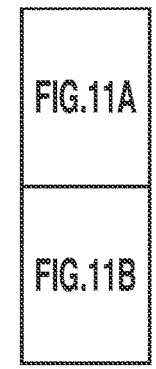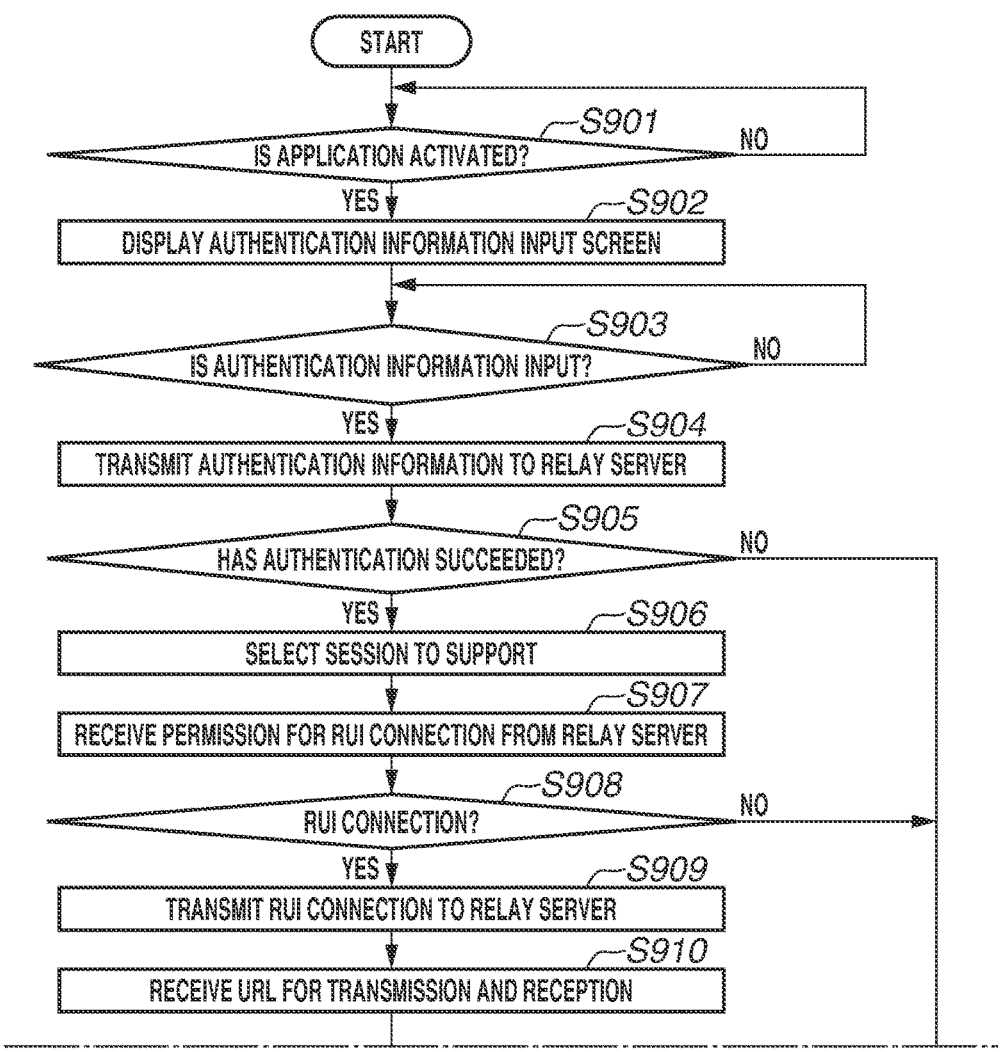

FIG.12A

INPUT AUTHENTICATION INFORMATION

■ USERNAME [_____] ~830
■ PASSWORD [_____] ~831

[ LOGIN ] ~832

FIG.12B

SELECT SESSION TO SUPPORT 840　　　　841

■ AAA COMPANY_MFP1　[ CONNECT ]

FIG.12C

RUI CONNECTION

DO YOU WANT TO CONNECT
TO RUI OF MFP TO SUPPORT?

850　　　　851
[ YES ]　　[ NO ]

FIG.13A

HTTP/1.1 200 OK
Date: Mon, 21 Oct 2013 09:06:11 GMT
Content-Type: text/plain
Content-Length: 2

GET /dataget HTTP/1.1
Accept: image/gif, image/x-xbitmap, image/jpeg, image/pjpeg, image/x-jg, */*
Referer: http://yyy.yyy.yyy.yyy/dataget
Accept-Language: ja, en
User-Agent: Mozilla/2.0 (compatible; MSIE 3.01; Windows NT)
Host: yyy.yyy.yyy.yyy
Connection: Keep-Alive

FIG.13C

HTTP/1.0 200 OK
Server: Netscape-Enterprize/4.1
Date: Mon, 21 Oct 2013 09:06:11 GMT
Content-Type: text/html
Transfer-Encoding:

ID:0001
HTTP/1.0 200 OK
Server: Netscape-Enterprize/4.1
Date: Mon, 21 Oct 2013 09:06:11 GMT
Content-Type: text/html
Transfer-Encoding:
<html>
<hean>
  .
  .
  .

FIG.16A
```
GET /index.html HTTP/1.1
Accept: image/gif, image/x-xbitmap, image/jpeg, image/pjpeg,
image/x-jg, */*
Referer: http://xxx.xxx.xxx.xxx/index.html
Accept-Language: ja, en
User-Agent: Mozilla/2.0 (compatible; MSIE 3.01; Windows NT)
Host: xxx.xxx.xxx.xxx
Connection: Keep-Alive
```

FIG.16B
```
POST /datapost HTTP/1.0
Host: yyy.yyy.yyy.yyy
Content-type: text/plain GET /index.html HTTP/1.1
Accept: image/gif, image/x-xbitmap, image/jpeg, image/pjpeg, image/x-jg, */*
Referer: http://xxx.xxx.xxx.xxx/index.html
Accept-Language: ja, en
User-Agent: Mozilla/2.0 (compatible; MSIE 3.01; Windows NT)
Host: xxx.xxx.xxx.xxx
Connection: Keep-Alive
```

FIG.16C
```
GET /dataget HTTP/1.1
Accept: image/gif, image/x-xbitmap, image/jpeg, image/pjpeg,
image/x-jg, */*
Referer: http://yyy.yyy.yyy.yyy/dataget
Accept-Language: ja, en
User-Agent: Mozilla/2.0 (compatible; MSIE 3.01; Windows NT)
Host: yyy.yyy.yyy.yyy
Connection: Keep-Alive
```

FIG.16D
```
HTTP/1.0 200 OK
Server: Netscape-Enterprize/4.1
Date: Mon, 21 Oct 2013 09:06:11 GMT
Content-Type: text/html
Transfer-Encoding:
<html>
<hean>
    .
    .
    .
```

FIG.18

| ID | DEVICE NAME | CLIENT NAME | STORAGE URL FOR SERVER | ACQUISITION URL FOR SERVER | STORAGE URL FOR CLIENT | ACQUISITION URL FOR CLIENT | TRANSMISSION TIME |
|---|---|---|---|---|---|---|---|
| 1401 | 1402 | 1403 | 1404 | 1405 | 1406 | 1407 | 1408 |
| 001 | MFP1 | PC1 | http://yyy.yyy.yyy.yyy/postdata | http://yyy.yyy.yyy.yyy/getdata | http://yyy.yyy.yyy.yyy/postdata | http://yyy.yyy.yyy.yyy/getdata | OCTOBER 28/2013 11:23 |

FIG.19

```
POST /datapost HTTP/1.0
Host: yyy.yyy.yyy.yyy
Content-type: text/plain

ID:0001
GET /index.html HTTP/1.1
Accept: image/gif, image/x-xbitmap, image/jpeg, image/pjpeg, image/x-jg, */*
Referer: http://xxx.xxx.xxx.xxx/index.html
Accept-Language: ja, en
User-Agent: Mozilla/2.0 (compatible; MSIE 3.01; Windows NT)
Host: xxx.xxx.xxx.xxx
Connection: Keep-Alive
```

FIG.21A

```
GET /datapost HTTP/1.1
Accept: image/gif, image/x-xbitmap, image/jpeg, image/pjpeg,
image/x-jg, */*
Referer: http://yyy.yyy.yyy.yyy/datapost
Accept-Language: ja, en
User-Agent: Mozilla/2.0 (compatible; MSIE 3.01; Windows NT)
Host: yyy.yyy.yyy.yyy
Connection: Keep-Alive
```

FIG.21B

```
HTTP/1.0 200 OK
Server: Netscape-Enterprize/4.1
Date: Mon, 21 Oct 2013 09:06:11 GMT
Content-Type: text/html
Transfer-Encoding:

GET /index.html HTTP/1.1
Accept: image/gif, image/x-xbitmap, image/jpeg, image/pjpeg, image/x-jg, */*
Referer: http://xxx.xxx.xxx.xxx/index.html
Accept-Language: ja, en
User-Agent: Mozilla/2.0 (compatible; MSIE 3.01; Windows NT)
Host: xxx.xxx.xxx.xxx
Connection: Keep-Alive
```

FIG.21C

```
HTTP/1.0 200 OK
Server: Netscape-Enterprize/4.1
Date: Mon, 21 Oct 2013 09:06:11 GMT
Content-Type: text/html
Transfer-Encoding:
<html>
<hean>
    .
    .
    .
```

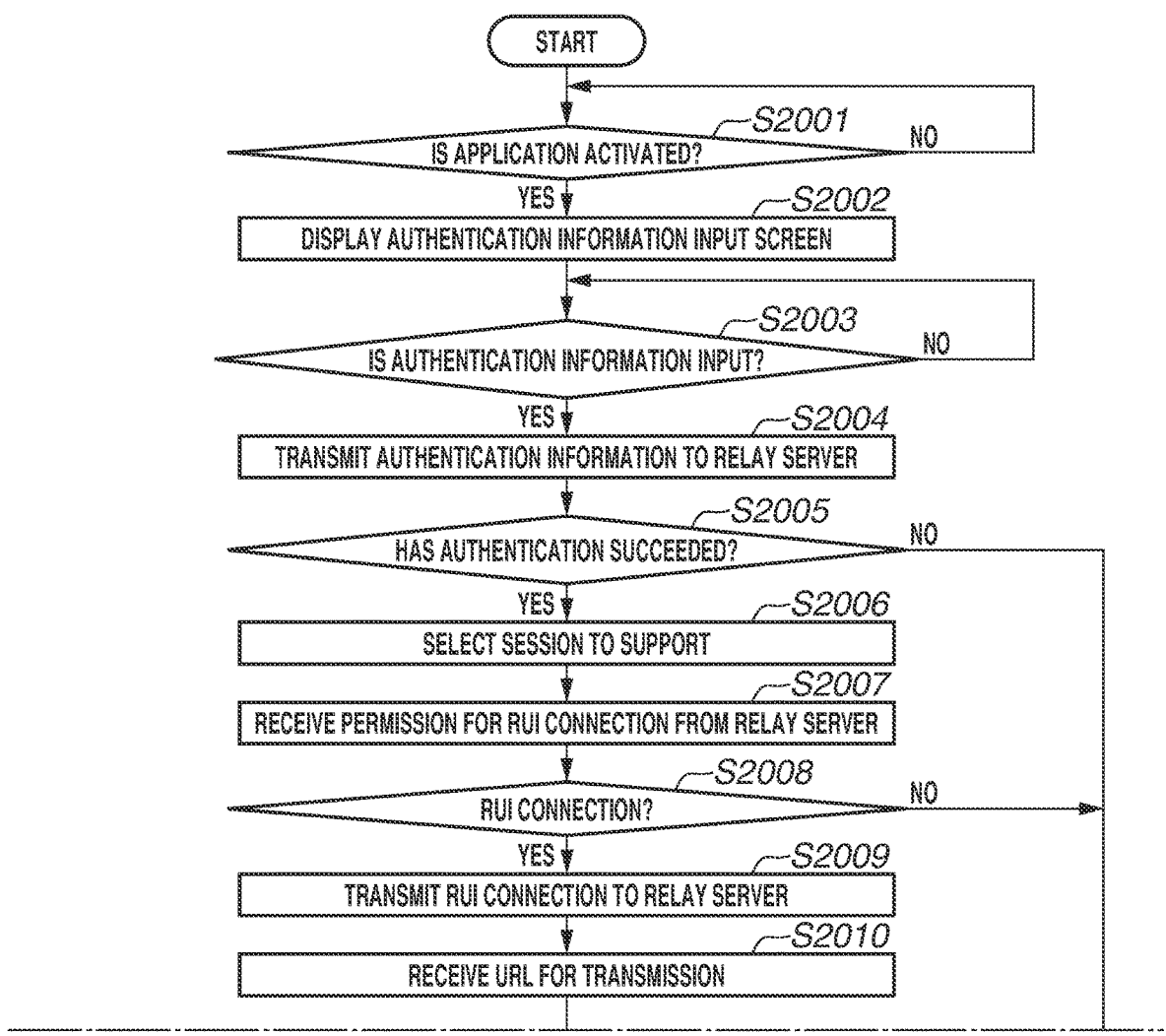

FIG.25A

```
GET /index.html HTTP/1.1
Accept: image/gif, image/x-xbitmap, image/jpeg, image/pjpeg,
image/x-jg, */*
Referer: http://xxx.xxx.xxx.xxx/index.html
Accept-Language: ja, en
User-Agent: Mozilla/2.0 (compatible; MSIE 3.01; Windows NT)
Host: xxx.xxx.xxx.xxx
Connection: Keep-Alive
```

FIG.25B

```
POST /datapost HTTP/1.0
Host: yyy.yyy.yyy.yyy
Content-type: text/plain

GET /index.html HTTP/1.1
Accept: image/gif, image/x-xbitmap, image/jpeg, image/pjpeg, image/x-jg, */*
Referer: http://xxx.xxx.xxx.xxx/index.html
Accept-Language: ja, en
User-Agent: Mozilla/2.0 (compatible; MSIE 3.01; Windows NT)
Host: xxx.xxx.xxx.xxx
Connection: Keep-Alive
```

FIG.25C

```
HTTP/1.1 200 OK
Date: Mon, 21 Oct 2013 09:06:11 GMT
Content-Type: text/plain
Content-Length: 30 http://yyy.yyy.yyy.yyy/dataget
```

FIG.25D

```
GET /dataget HTTP/1.1
Accept: image/gif, image/x-xbitmap, image/jpeg, image/pjpeg,
image/x-jg, */*
Referer: http://yyy.yyy.yyy.yyy/dataget
Accept-Language: ja, en
User-Agent: Mozilla/2.0 (compatible; MSIE 3.01; Windows NT)
Host: yyy.yyy.yyy.yyy
Connection: Keep-Alive
```

FIG.25E

```
HTTP/1.0 200 OK
Server: Netscape-Enterprize/4.1
Date: Mon, 21 Oct 2013 09:06:11 GMT
Content-Type: text/html
Transfer-Encoding:

URL:http://yyy.yyy.yyy.yyy/datapost
HTTP/1.0 200 OK
Server: Netscape-Enterprize/4.1
Date: Mon, 21 Oct 2013 09:06:11 GMT
Content-Type: text/html
Transfer-Encoding:
<html>
<hean>
     .
     .
     .
```

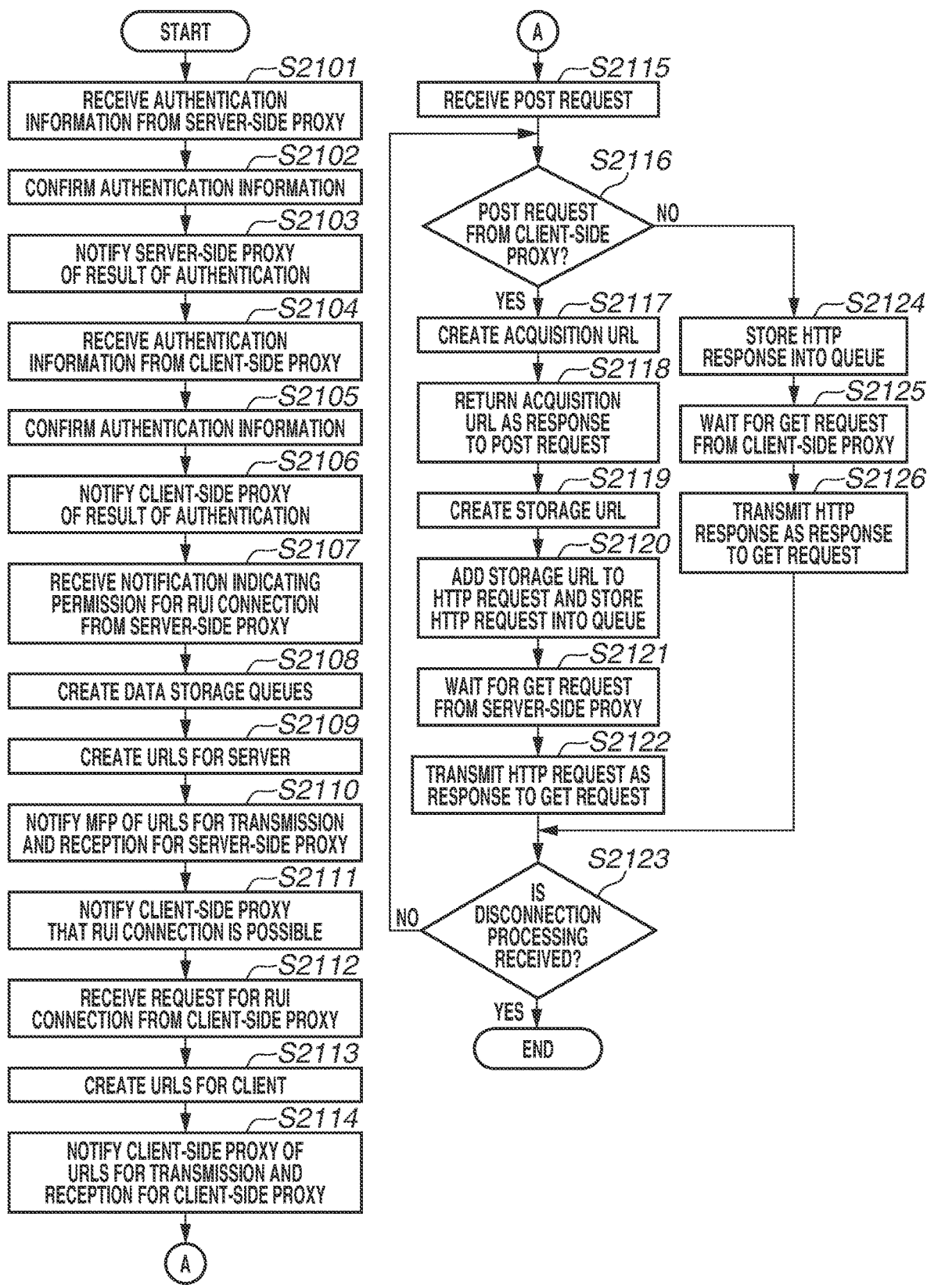

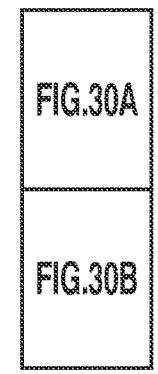
FIG.30
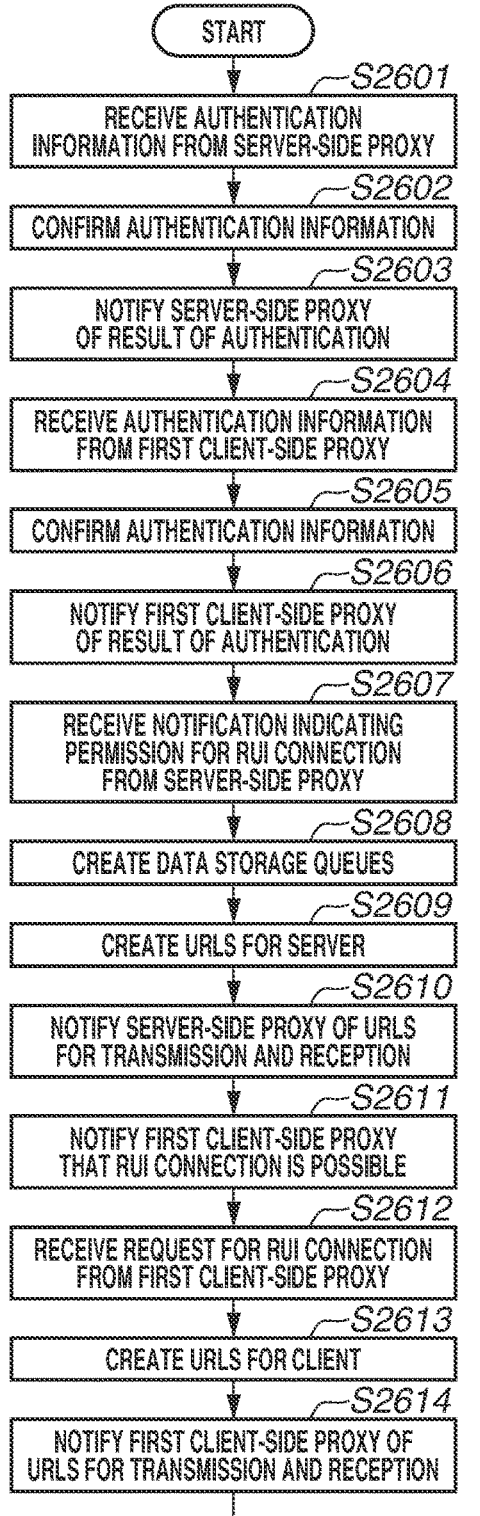
FIG.30A
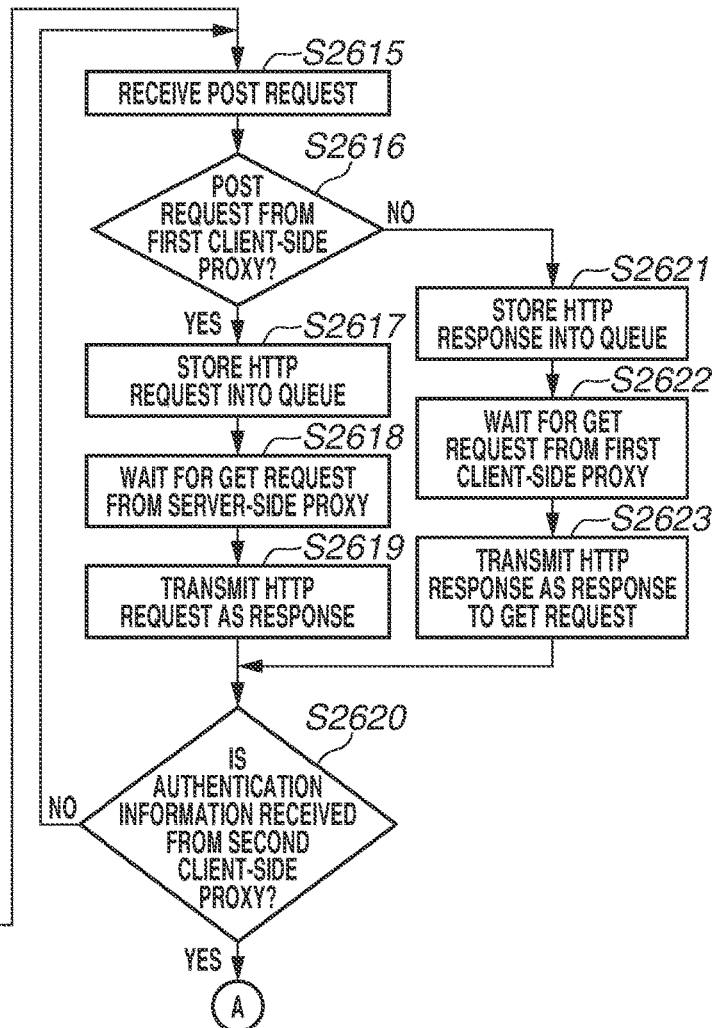

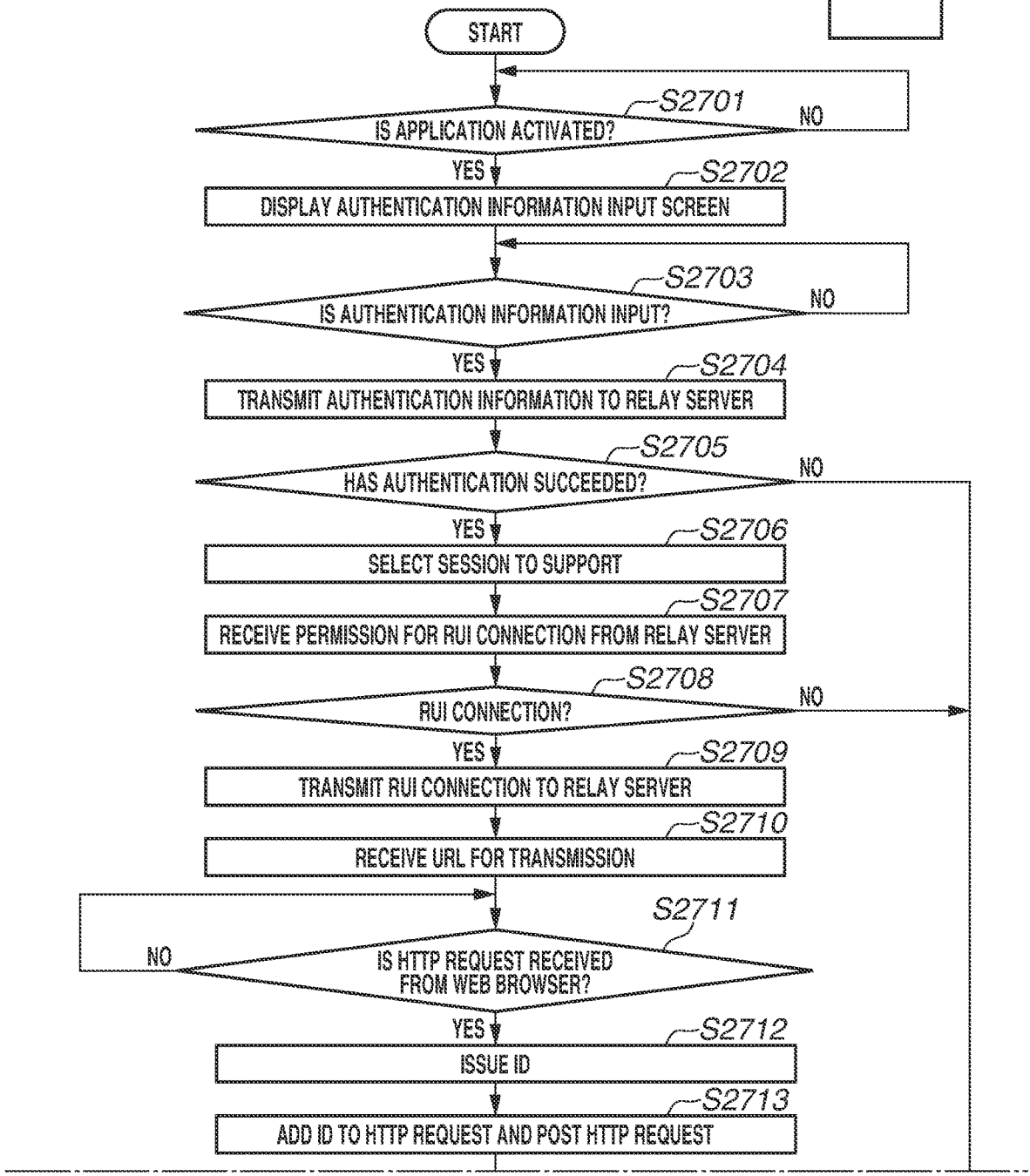

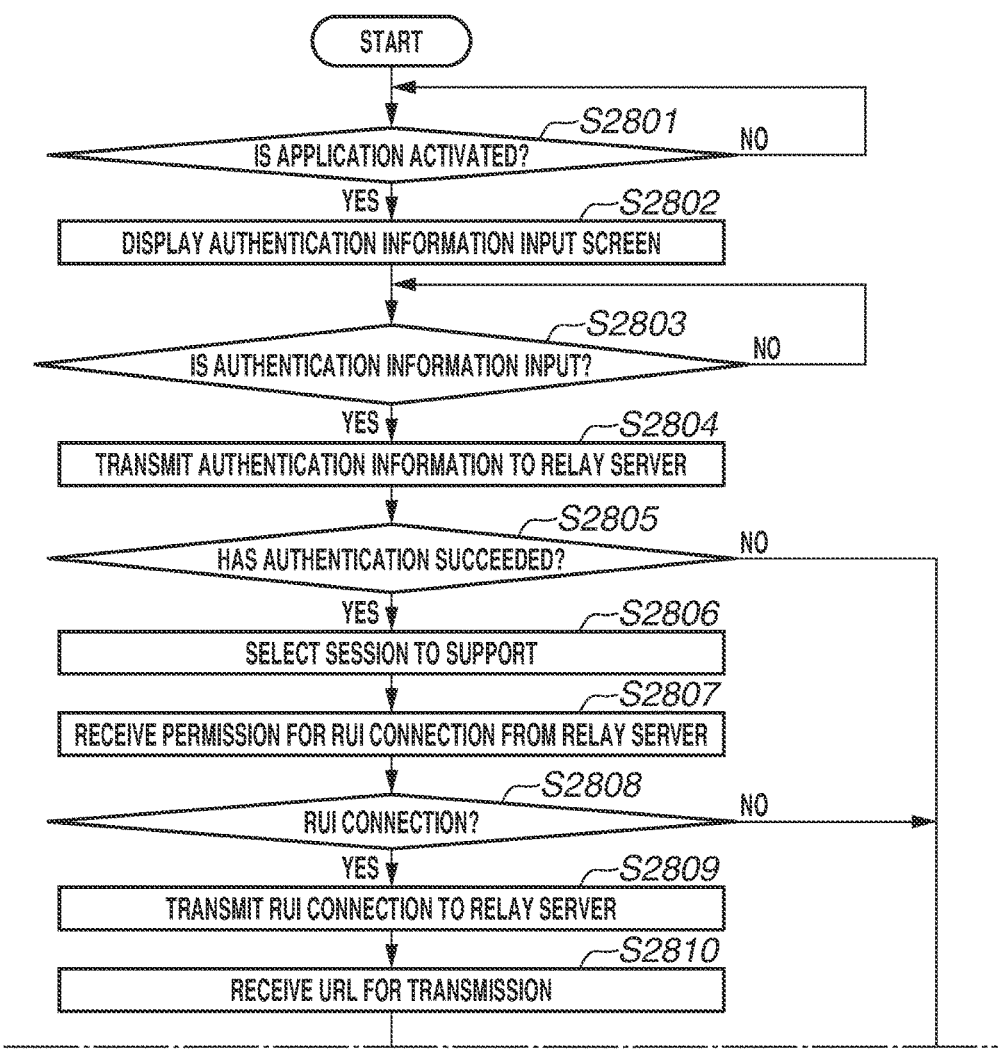

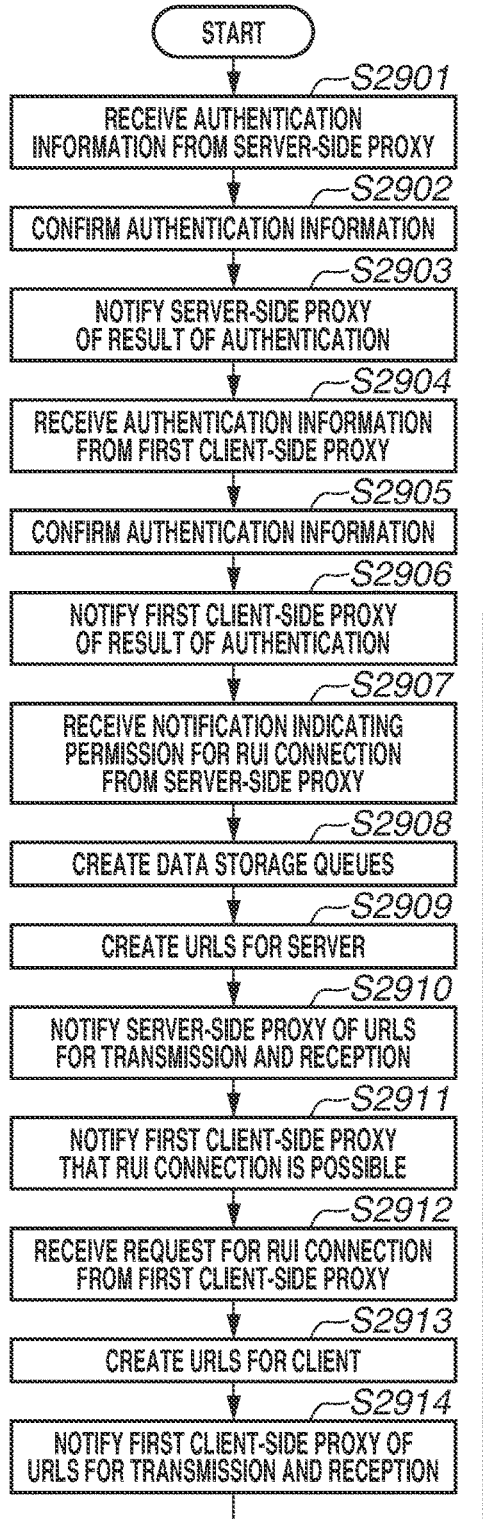
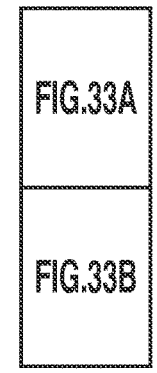
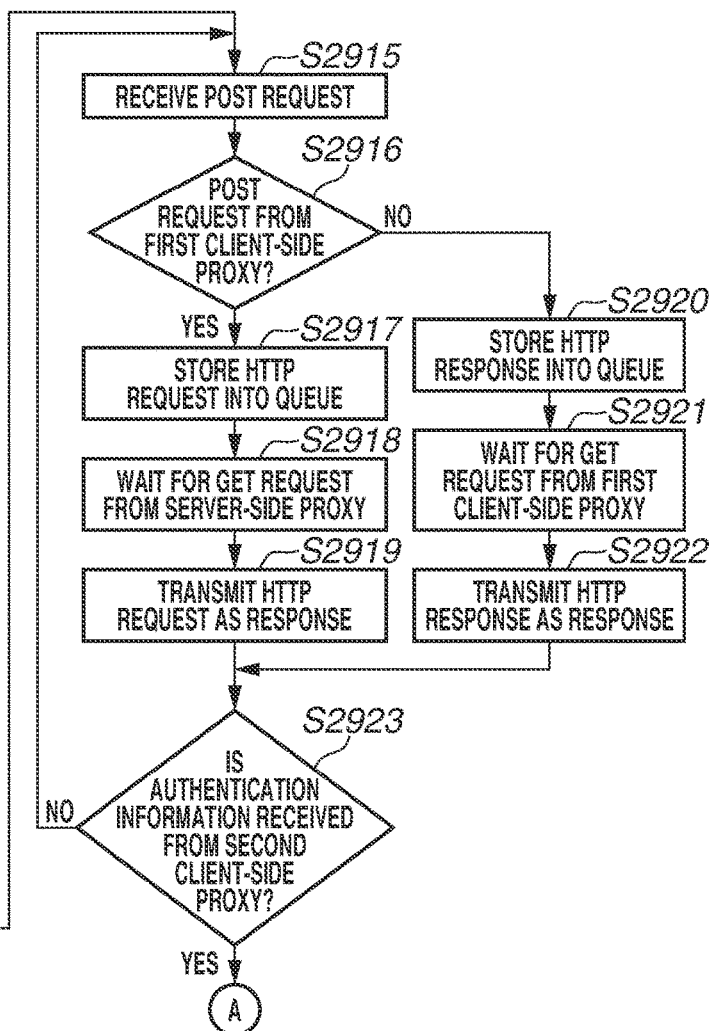
FIG.33A
FIG.33

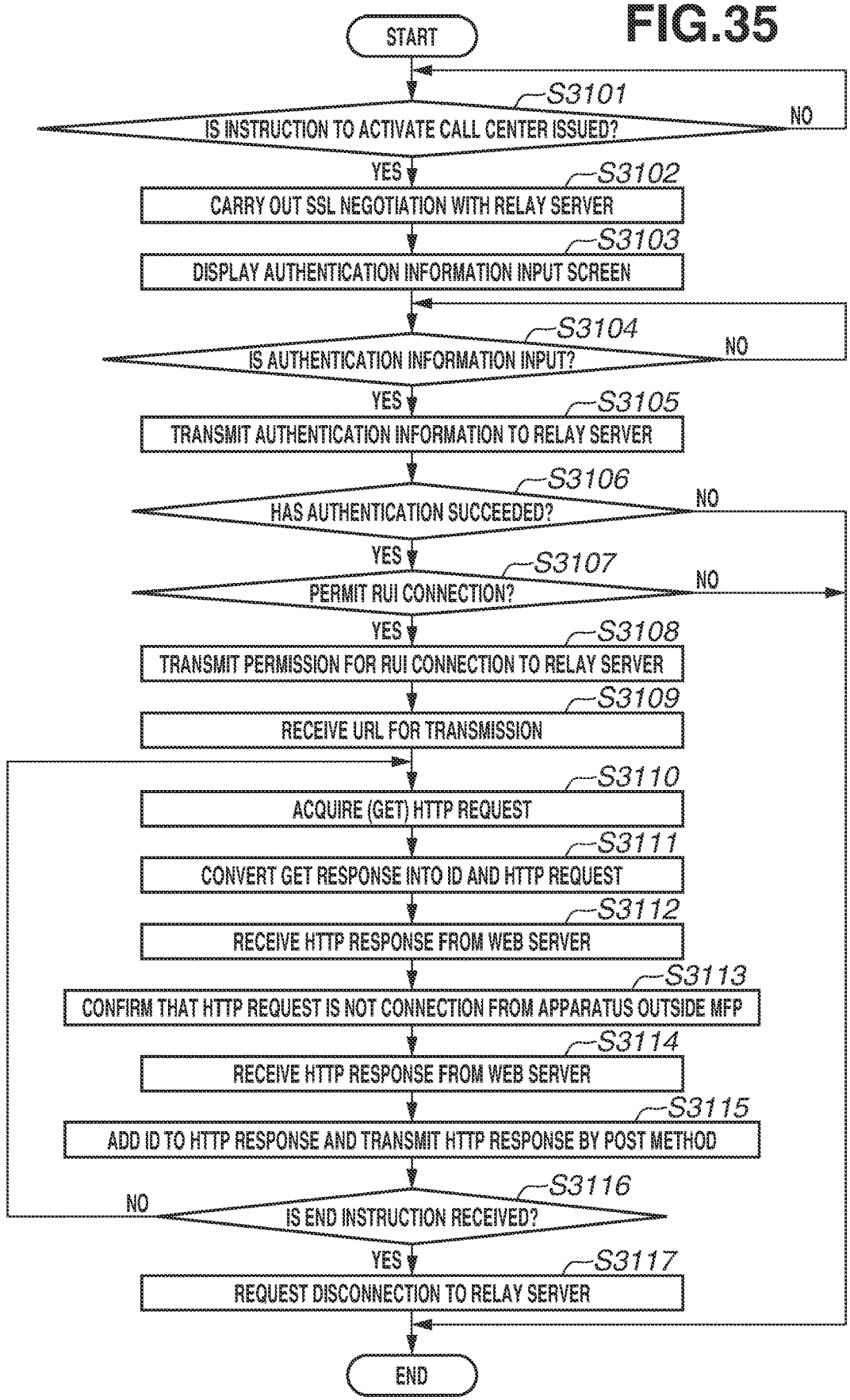

INFORMATION PROCESSING APPARATUS, SYSTEM, INFORMATION PROCESSING METHOD, AND PROGRAM

CROSS-REFERENCE TO RELATED APPLICATIONS

This application is a Divisional of U.S. patent application Ser. No. 14/659,344 filed Mar. 16, 2015, which claim priority from Japanese Patent Application No. 2014-055371 filed Mar. 18, 2014. Each of U.S. patent application Ser. No. 14/659,344 and Japanese Patent Application No. 2014-055371 is hereby incorporated by reference herein in its entirety.

BACKGROUND OF THE INVENTION

Field of the Invention

The present invention relates to an information processing apparatus, a system, an information processing method, and a program.

Description of the Related Art

Currently, a remote maintenance service based on audio and moving image communication and a remote operation is proposed for image forming apparatuses (Japanese Patent Application Laid-Open No. 2005-208974).

Further, the image forming apparatuses have been beginning to have a server function such as a web server and a file server, and users can use the server function of the image forming apparatus from a remote terminal via a network. One of such server functions is a web service such as a Remote User Interface (RUI).

The image forming apparatus having the RUI function allows the user to back up information in the image forming apparatus in a personal computer (PC) from a web browser or the like installed in the PC, and restore this information into another image forming apparatus (Japanese Patent Application Laid-Open No. 2005-202918).

However, even when the user tries to connect to the RUI of the image forming apparatus located at a remote place with use of the remote maintenance service, the user cannot connect to the RUI in such an environment that the image forming apparatus exists inside a firewall in the Internet. This is because the firewall is configured to reject a connection from a terminal outside the firewall to a terminal inside the firewall, and therefore the user cannot connect to the RUI in the Internet from the terminal outside the firewall.

Therefore, a service engineer or the like of a manufacturer of the image forming apparatus cannot back up and restore the information by connecting to the RUI of the image forming apparatus located at a customer's place with use of the remote maintenance service.

SUMMARY OF THE INVENTION

The present invention is directed to an information processing apparatus, a system, and an information processing method capable of improving convenience in use of a web service in a secure communication environment.

According to an aspect of the present invention, an information processing apparatus includes a conversion unit configured to convert a communication request according to a first format into a communication request according to a second format, a request transmission unit configured to transmit the communication request according to the second format, a response reception unit configured to receive a communication response according to the second format that is returned in response to the communication request according to the second format, and an acquisition unit configured to acquire a communication response according to the first format that is converted from the received communication response according to the second format, as a response to the communication request according to the first format.

Further features of the present invention will become apparent from the following description of exemplary embodiments with reference to the attached drawings.

BRIEF DESCRIPTION OF THE DRAWINGS

FIGS. 6A and 6B are diagrams each illustrating an example of Hypertext Transfer Protocol (HTTP) data.

FIG. 7 is a diagram illustrating an example of an identification (ID) table.

FIG. 8 is a flowchart illustrating an example of processing performed by the MFP according to a first exemplary embodiment.

FIGS. 10A, 10B, and 10C are diagrams each illustrating an example of HTTP data.

FIGS. 12A, 12B, and 12C each illustrate an example of an operation screen of the PC.

FIGS. 13A, 13B, and 13C are diagrams each illustrating an example of HTTP data.

FIGS. 16A, 16B, 16C, and 16D are diagrams each illustrating an example of HTTP data.

FIG. 18 is a diagram illustrating an example of an ID table.

FIG. 19 is a diagram illustrating an example of HTTP data.

FIGS. 21A, 21B, and 21C are diagrams each illustrating an example of HTTP data.

FIGS. 25A, 25B, 25C, 25D, and 25E are diagrams each illustrating an example of HTTP data.

FIG. 26 is a flowchart illustrating an example of processing performed by the relay server according to the fourth exemplary embodiment.

FIG. 35 is a flowchart illustrating an example of processing performed by the MFP according to an eighth exemplary embodiment.

DESCRIPTION OF THE EMBODIMENTS

Hereinbelow, exemplary embodiments for carrying out the present invention will be described with reference to the drawings.

Figure 1:
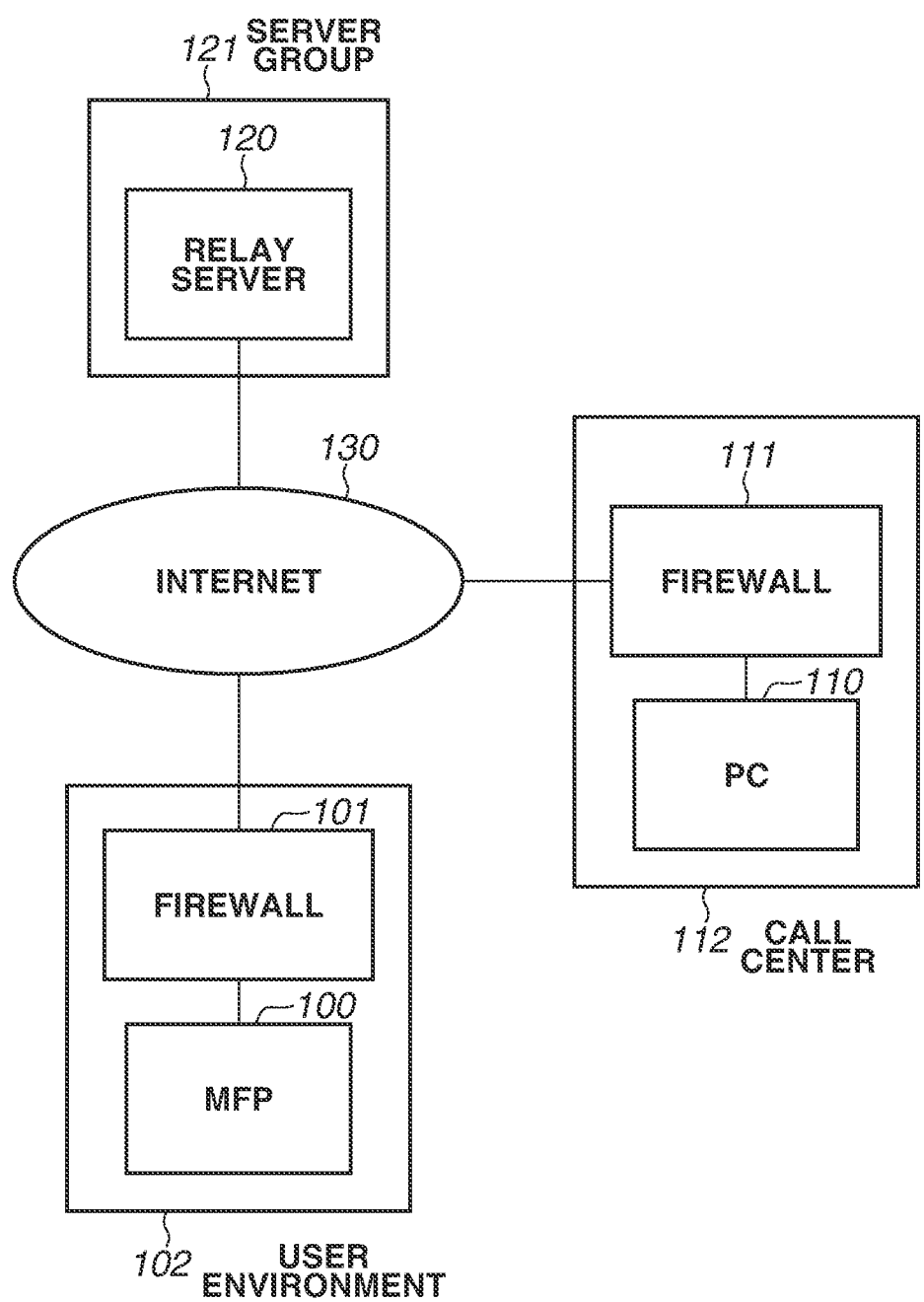
FIG. 1 is a block diagram illustrating an example of a system configuration.

FIG. 1 is a block diagram illustrating an example of a system configuration of a communication system that provides a secure remote maintenance service via a network according to a first exemplary embodiment.

A multifunction peripheral (MFP) (i.e., an image forming apparatus) 100 is disposed in a user environment 102, and can access an Internet 130. The MFP 100 is an example of an information processing apparatus. The term "MFP" stands for "Multifunction Peripheral".

A PC 110 is disposed in a call center 112, and can access the Internet 130. The PC 110 is an example of an information processing apparatus.

The communication system may include a plurality of user environments 102, a plurality of call centers 112, a plurality of MFPs 100, and a plurality of PCs 110. Further, the communication system is illustrated in FIG. 1 assuming that the MFP 100 is disposed in the user environment 102, but another information processing apparatus may be disposed in the user environment 102. The other information processing apparatus described here may be, for example, a PC, a server apparatus, and a tablet terminal.

A firewall 101 is provided in the user environment 102. Further, a firewall 111 is provided in the call center 112. The firewall 101 is configured to permit a connection from a terminal located inside the user environment 102 to the Internet 130 but reject a connection from the Internet 130 side to the terminal located inside the user environment 102. The firewall 111 is configured to permit a connection from a terminal located inside the call center 112 to the Internet 130 but reject a connection from the Internet 130 side to the terminal located inside the call center 112.

A server group 121 is a server group including server computers each providing a service via the Internet 130. The server group 121 may include a single server computer, and may include a plurality of server computers. FIG. 1 illustrates the server group 121, assuming that the server group 121 includes only a single relay server apparatus (hereinafter referred to a relay server) 120. The relay server 120 is an example of the information processing apparatus.

Figure 2:
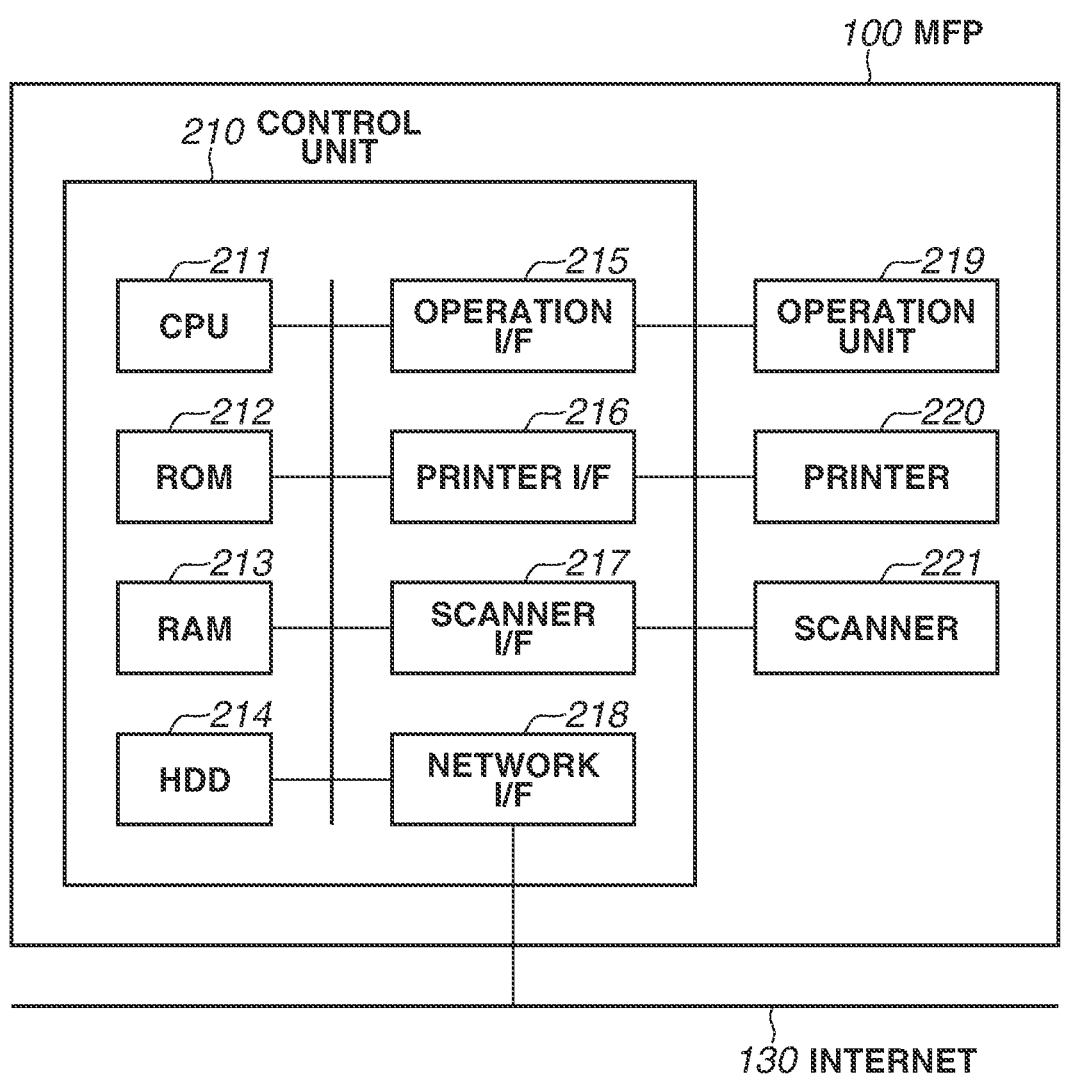
FIG. 2 is a block diagram illustrating an example of a hardware configuration of a multifunction peripheral (MFP).

FIG. 2 is a block diagram illustrating an example of a hardware configuration of the MFP 100.

A control unit 210 including a central processing unit (CPU) 211 controls an operation of the entire MFP 100.

The CPU 211 realizes functions of the MFP 100, and processing of the MFP 100 illustrated in a sequence diagram and processing illustrated in flowcharts regarding the MFP 100 that will be described below by executing a program stored in a read only memory (ROM) 212 or a hard disk drive (HDD) 214. The present exemplary embodiment is described, assuming that the single CPU 211 realizes the functions of the MFP 100, and the processing of the MFP 100 illustrated in the sequence diagram and the processing illustrated in the flowcharts regarding the MFP 100 that will be described below with use of a single memory (a random access memory (RAM) 213 or the HDD 214). However, the MFP 100 may be configured in another manner. For example, the MFP 100 may be configured in such a manner that a plurality of CPUs realizes the functions of the MFP 100, and the processing of the MFP 100 illustrated in the sequence diagram and the processing illustrated in the flowcharts regarding the MFP 100 that will be described below with use of a plurality of RAMs or HDDs.

The ROM 212 stores various kinds of programs to be executed by the CPU 211.

The RAM 213 is used as a main memory and a temporary storage area such as a work area of the CPU 211.

The HDD 214 stores image data and various kinds of programs.

An operation unit interface (I/F) 215 connects an operation unit 219 and the control unit 210 to each other.

The operation unit 219 includes a liquid crystal display unit having a touch panel function, a keyboard, and the like.

A printer I/F 216 connects a printer 220 and the control unit 210 to each other. The control unit 210 transmits image data to be printed to the printer 220 via the printer I/F 216.

The printer 220 prints the image data received from the control unit 210 via the printer I/F 216 onto a recording medium.

A scanner I/F 217 connects a scanner 221 and the control unit 210 to each other.

The scanner 221 reads an image on a document to generate image data (an image file), and inputs the generated image data to the control unit 210 via the scanner I/F 217. The MFP 100 can transmit the image data (the image file) generated by the scanner 221 by file transmission or electronic mail transmission.

A network I/F 218 connects the control unit 210 to the Internet 130.

Figure 3:
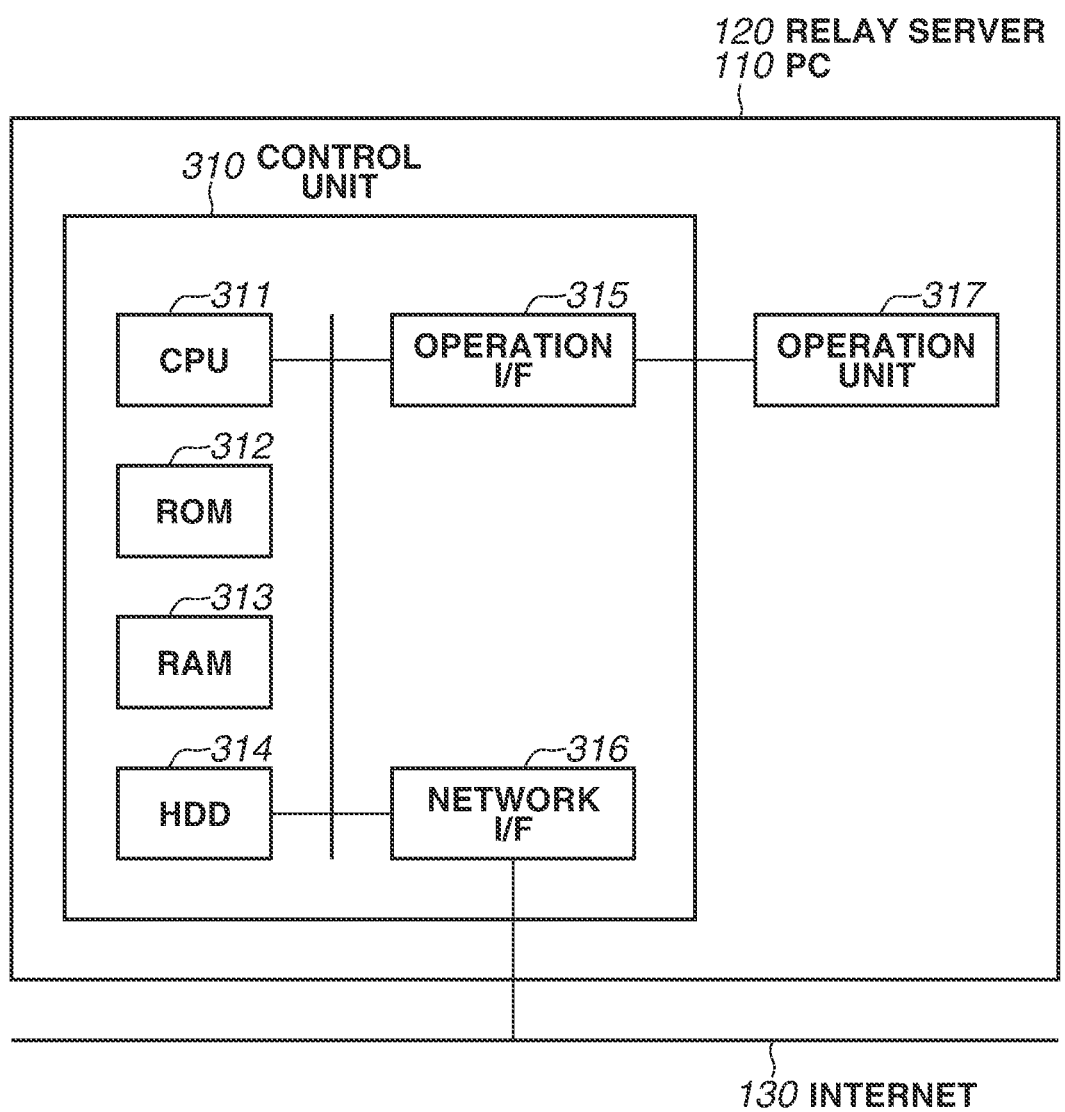
FIG. 3 is a block diagram illustrating an example of a hardware configuration of a personal computer (PC) and a relay server.

FIG. 3 is a block diagram illustrating an example of a hardware configuration of the PC 110.

A control unit 310 including a CPU 311 controls an operation of the entire PC 110.

The CPU 311 realizes functions of the PC 110, and processing of the PC 110 illustrated in the sequence diagram and processing illustrated in the flowcharts regarding the PC 110 that will be described below by executing a program stored in a ROM 312 or an HDD 314.

The ROM 312 stores various kinds of programs to be executed by the CPU 311.

A RAM 313 is used as a main memory and a temporary storage area such as a work area of the CPU 311.

The HDD 314 stores image data and various kinds of programs.

An operation unit I/F 315 connects an operation unit 317 and the control unit 310 to each other.

The operation unit 317 includes a liquid crystal display unit having the touch panel function, a keyboard, a mouse, and the like.

A network I/F 316 connects the control unit 310 to the Internet 130.

Assume that a hardware configuration of the relay server 120 is similar to the hardware configuration of the PC 110. In other words, the CPU 311 of the relay server 120 executes a program stored in the ROM 312 or the HDD 314 of the relay server 102. By executing the program, the relay server 120 realizes functions of the relay server 120, and processing of the relay server 120 illustrated in the sequence diagram and processing illustrated in the flowcharts regarding the relay server 120 that will be described below.

Figure 4:
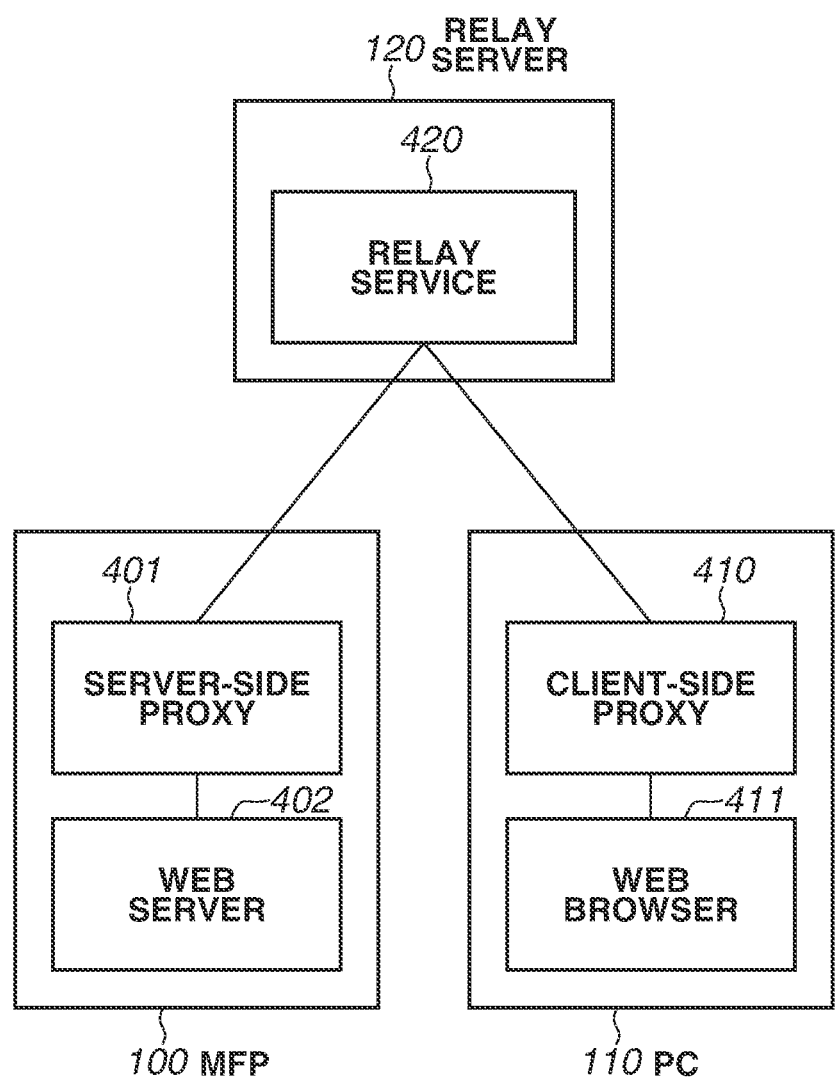
FIG. 4 is a block diagram illustrating an example of a function configuration of each of the MFP, the PC, and the relay server.

FIG. 4 is a block diagram illustrating an example of a function configuration of each of the MFP 100, the PC 110, and the relay server 120.

A server-side proxy 401 mediates (relays) communication between a relay service 420 and a web server 402 after establishing a connection with the relay service 420, upon receiving a connection instruction via the operation unit 219.

The web server 402 has a function of, upon receiving a Hypertext Transfer Protocol (HTTP) communication request from the relay server 120, returning a response according to the request.

A client-side proxy 410 mediates (relays) communication between a web browser 411 and the relay service 420.

The relay service 420 provides the web server function, and has a function of, upon receiving an HTTP communication request from the PC 110 and the MFP 100, returning a response according to the request.

Now, HTTP communication performed between the server-side proxy 401 and the relay service 420, and HTTP communication performed between the client-side proxy 410 and the relay service 420 will be described.

HTTP is a client/server type protocol defined in Request For Comment (RFC) 2616, and includes a plurality of methods. Generally, a GET method is used when a client receives information from a server, and a POST method is used when the client transmits information to the server.

In the present exemplary embodiment, when the server-side proxy 401 transmits data to the relay service 420, and when the client-side proxy 410 transmits data to the relay service 420, the POST method is used. Further, when the server-side proxy 401 receives data from the relay service 420, and when the client-side proxy 410 receives data from the relay service 420, the GET method is used. Further, different connections are used as a connection for transmission and a connection for reception.

Figure 5:
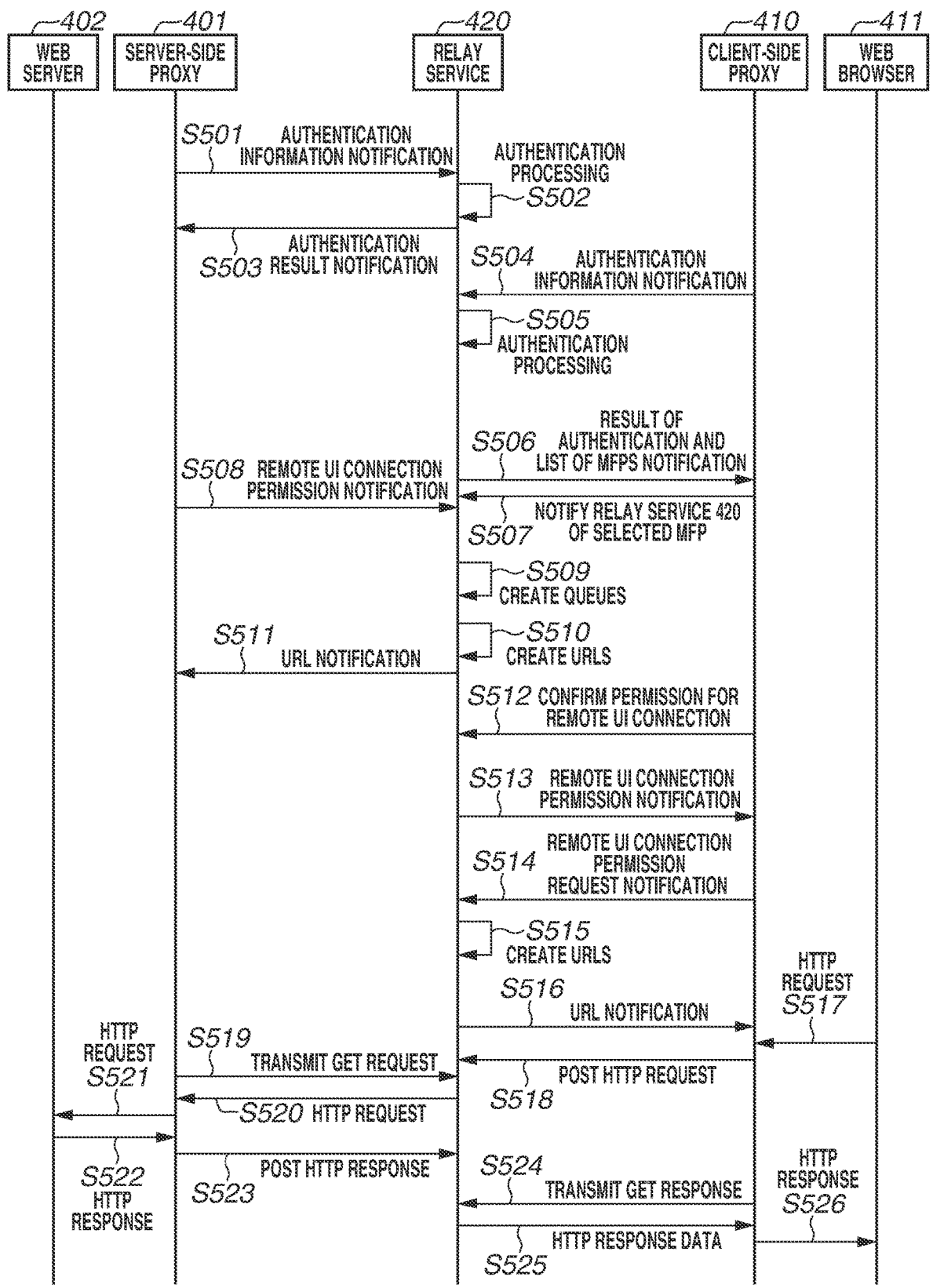
FIG. 5 is a sequence diagram illustrating an example of processing performed by the MFP, the PC, and the relay server.

FIG. 5 is a sequence diagram illustrating an example of processing performed by the MFP 100, the PC 110, and the relay server 120. This sequence diagram illustrates an example of an RUI connection between the MFP 100 and the PC 110.

In step S501, when a call center is activated and authentication information is input by a user via the operation unit 219, the server-side proxy 401 transmits the input authentication information to the relay service 420.

In step S502, the relay service 420 confirms the authentication information received from the server-side proxy 401. More specifically, the relay service 420 determines whether to authenticate a connection from the MFP 100 by comparing authentication information stored in advance with the authentication information received from the server-side proxy 401.

In step S503, the relay service 420 notifies the server-side proxy 401 of a result of the authentication.

In step S504, when an application is activated and authentication information is input by a user, the client-side proxy 410 notifies the relay service 420 of the authentication information.

In step S505, the relay service 420 confirms the authentication information received from the client-side proxy 410. More specifically, the relay service 420 determines whether to authenticate a connection from the PC 110 by comparing authentication information stored in advance with the authentication information received from the client-side proxy 410.

In step S506, the relay service 420 transmits a result of the authentication and a list of MFPs that have issued a call center notification, to the client-side proxy 410.

In step S507, the client-side proxy 410 notifies the relay service 420 of information about an MFP selected by the user.

In step S508, upon receiving permission for an RUI connection via the operation unit 219, the server-side proxy 401 notifies the relay service 420 of the permission for the RUI connection.

In step S509, the relay service 420 creates an RUI request data queue and an RUI response data queue. Request data directed to an RUI is stored in the RUI request data queue. The request data is, for example, an HTTP request (HTTP data) to the RUI as illustrated in FIG. 6A. Response data from the RUI is stored in the RUI response data queue. The response data is, for example, an HTTP response (HTTP data) from the RUI as illustrated in FIG. 6B.

In step S510, the relay service 420 creates an acquisition Uniform Resource Locator (URL) for acquisition from the RUI request data queue, and a storage URL for storage into the RUI response data queue, for the server-side proxy 401. Upon receiving a POST request to the storage URL from the server-side proxy 401, the relay service 420 stores posted data into the corresponding queue. Further, upon receiving a GET request to the acquisition URL from the server-side proxy 401, the relay service 420 extracts data from the corresponding queue to return the extracted data as a response to the GET request.

In step S511, the relay service 420 notifies the server-side proxy 401 of the storage URL and the acquisition URL.

In step S512, the client-side proxy 410 confirms to the relay service 420 whether the RUI connection is permitted. At this time, the client-side proxy 410, for example, polls the relay service 420 to periodically confirm whether the RUI connection is permitted. In step S513, the relay service 420 notifies the client-side proxy 410 that the permission to connect to the RUI is received from the MFP 100.

In step S514, upon receiving the permission for the RUI connection, the client-side proxy 410 notifies the relay service 420 of the RUI connection.

In step S515, the relay service 420 creates a storage URL for storage into the RUI request data queue, and an acquisition URL for acquisition from the RUI response data queue, for the client-side proxy 410. In the present exemplary embodiment, the relay service 420 creates different URLs as the storage URL for storage into the data queue and the acquisition URL for acquisition from the data queue, but may create a common URL for both of them. In this case, the relay service 420 determines whether to store data or acquire data depending on which request is received, a POST request or a GET request.

In step S516, the relay service 420 notifies the client-side proxy 410 of the storage URL and the acquisition URL.

After that, the server-side proxy 401, the client-side proxy 410, and the relay service 420 perform data transmission and reception between the web server 402 and the web browser 411 with use of the respective URLs.

In step S517, the web browser 411 notifies the client-side proxy 410 of an HTTP request to the web server 402 (for example, a GET request for acquiring an RUI screen and a POST request for issuing an instruction).

In step S518, upon receiving the HTTP request from the web browser 411, the client-side proxy 410 posts the HTTP request to the storage URL for the RUI request data queue of the relay service 420. The processing in which the client-side proxy 410 transmits the HTTP request to the relay service 420 is an example of request transmission processing.

In step S519, the server-side proxy 401 transmits a GET request for acquiring the HTTP request to the acquisition URL for the RUI request data queue of the relay service 420. At this time, the server-side proxy 401, for example, polls the relay service 420 to periodically transmit the GET request to the relay service 420.

In step S520, if there is HTTP request data in the RUI request data queue, the relay service 420 returns the HTTP request data as a response in response to the GET request from the server-side proxy 401. The processing in which the server-side proxy 401 receives the HTTP request from the relay service 420 is an example of request reception processing.

In step S521, the server-side proxy 401 transmits the HTTP request received from the relay service 420 to the web server 402.

In step S522, the web server 402 returns an HTTP response in response to the HTTP request received from the server-side proxy 401.

In step S523, the server-side proxy 401 posts the HTTP response received from the web server 402 to the storage URL for the RUI response data queue. The processing in which the server-side proxy 401 transmits the HTTP response to the relay service 420 is an example of response transmission processing.

In step S524, the client-side proxy 410 transmits a GET request to the acquisition URL for the RUI response data queue of the relay service 420. At this time, the client-side proxy 410, for example, polls the relay service 420 to periodically transmit the GET request to the relay service 420.

In step S525, if there is HTTP response data in the RUI response data queue, the relay service 420 returns the HTTP response data as a response in response to the GET request from the client-side proxy 410. The processing in which the client-side proxy 410 receives the HTTP response from the relay service 420 is an example of response reception processing.

In step S526, the client-side proxy 410 returns the HTTP response received from the relay service 420 to the web browser 411 as a response to the HTTP request transmitted in step S517.

The HTTP communication (the communication request and the communication response) performed between the web server 402 and the server-side proxy 401, and between the web browser 411 and the client-side proxy 410 is an HTTP communication according to a first format. Further, the HTTP communication (the communication request and the communication response) performed between the server-side proxy 401 and the relay service 420, and between the client-side proxy 410 and the relay service 420 is an HTTP communication according to a second format based on a Uniform Resource Identifier (URI) scheme. In other words, the server-side proxy 401 communicates with the web server 402 and the relay service 420 while reciprocally converting the communication formats of the HTTP communication according to the first format and the HTTP communication according to the second format. Further, the client-side proxy 410 communicates with the web browser 411 and the relay service 420 while reciprocally converting the communication formats of the HTTP communication according to the first format and the HTTP communication according to the second format.

By performing the above-described processing, the PC 110 and the MFP 100 can bi-directionally communicate with each other via the relay server 120 even when the PC 110 and the MFP 100 are disposed inside the different firewalls 110 and 101. In this manner, the present exemplary embodiment allows an apparatus located inside a firewall to connect to and use a web service of an apparatus located inside a different firewall via the Internet.

FIG. 7 illustrates an example of an identification (ID) (identification information) table stored in the HDD 314 of the PC 110.

Information 601 is information that indicates an ID used to determine whether an HTTP response is an HTTP response in response to a certain HTTP request posted by the PC 110. Information 602 is information that indicates a time at which the PC 110 has posted the HTTP request. Information 603 is information that indicates a name of a user who has caused the PC 110 to post the HTTP request. Information 604 is information that indicates the storage URL to which the PC 110 has posted the HTTP request.

The ID illustrated in FIG. 7 is used in processing illustrated in FIGS. 8 and 11 that will be described below.

FIG. 8 is a flowchart illustrating an example of processing performed by the MFP 100 according to the present exemplary embodiment. In step S701, the server-side proxy 401 determines whether an instruction to activate the call center is issued via the operation unit 219. More specifically, the server-side proxy 401 determines whether a button 800 on an operation screen that will be described below with reference to FIG. 9A is pressed (selected).

Figure 9A:
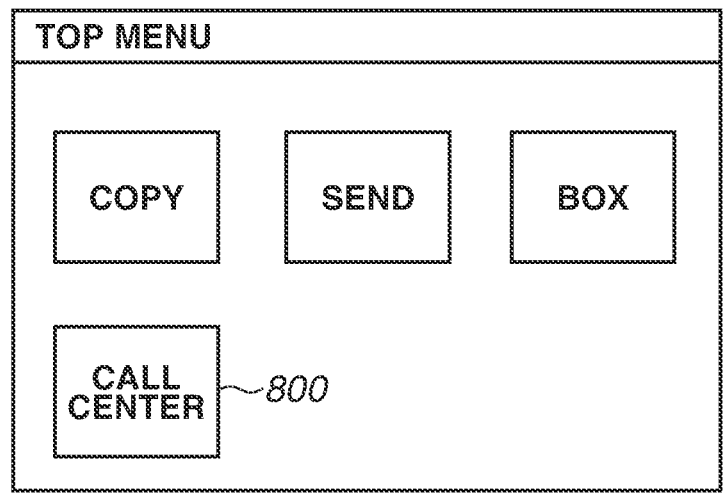
FIGS. 9A, 9B, and 9C each illustrate an example of an operation screen of the MFP.

FIG. 9A illustrates an example of the operation screen displayed on the operation unit 219.

The operation screen illustrated in FIG. 9A is a screen that presents a main menu displayed when the user selects a function of the MFP 100. The button 800 is a button pressed when the user requests a connection to the PC 110 in the call center 112. When the button 800 is pressed, the server-side proxy 401 starts a connection with the relay server 120.

If the server-side proxy 401 determines that the instruction to activate the call center is issued, i.e., the button 800 is pressed in step S701 (YES in step S701), in step S702, the server-side proxy 401 displays an authentication information input screen illustrated in FIG. 9B that will be described below.

Figure 9B:
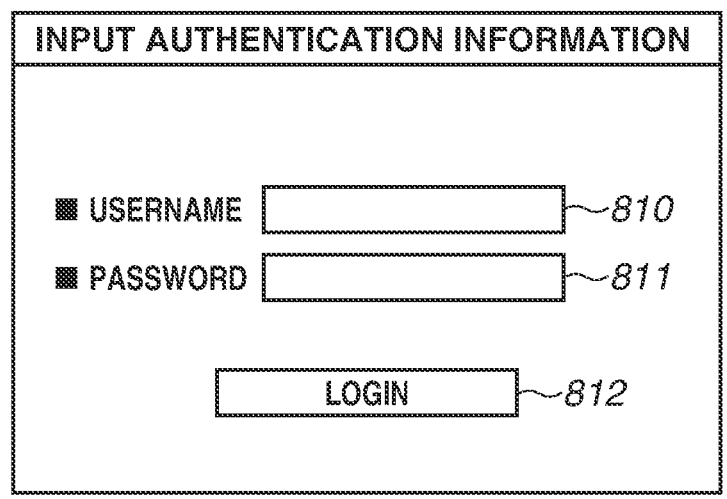

FIG. 9B illustrates an example of the operation screen displayed on the operation unit 219.

The operation screen illustrated in FIG. 9B is the authentication information input screen displayed when the user requests the authentication to the relay server 120.

An input field 810 is an input field for inputting a username that is the authentication information required to access the relay server 120.

An input field 811 is an input field for inputting a password that is the authentication information required to access the relay server 120.

A button 812 is a login button that the user presses to issue a login instruction after inputting the authentication information into the input field 810 and the input field 811.

In step S703, the server-side proxy 401 determines whether the authentication information is input and the button 812 is pressed on the authentication information input screen displayed in step S702. If the server-side proxy 401 determines that the authentication information is input and the button 812 is pressed (YES in step S703), the processing proceeds to step S704. On the other hand, if the server-side proxy 401 determines that the authentication information is not input (NO in step S703), the server-side proxy 401 waits until the authentication information is input. The server-side proxy 401 may be configured to end the processing illustrated in FIG. 8, if the authentication information is not input for a predetermined time period.

In step S704, the server-side proxy 401 transmits the input authentication information to the relay service 420, and waits for the result of the authentication.

Figure 9C:
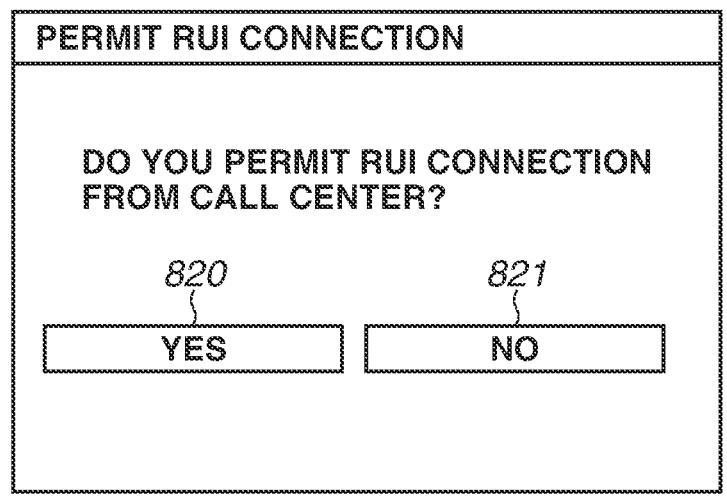

In step S705, the server-side proxy 401 determines whether a success or a failure is indicated by the authentication result notification received in response to the authentication information transmitted to the relay service 420. If the server-side proxy 401 determines that the authentication has succeeded as a result of the determination (YES in step S705), in step S706, the server-side proxy 401 displays an operation screen for selecting whether to permit or reject the RUI connection, which is illustrated in FIG. 9C. Then, the server-side proxy 401 determines whether to permit or reject the RUI connection based on a user's instruction issued via an operation performed on the operation screen illustrated in FIG. 9C. On the other hand, if the server-side proxy 401 determines that the authentication has failed (NO in step S705), the processing illustrated in FIG. 8 ends.

FIG. 9C illustrates an example of the operation screen displayed on the operation unit 219.

The operation screen illustrated in FIG. 9C is a screen displayed when the user selects whether to permit or reject the RUI connection from the call center.

A button 820 is a button pressed when the user permits the RUI connection from the call center. If the server-side proxy 401 receives pressing of the button 820 by the user (YES in step S706), the processing proceeds to step S707.

A button 821 is a button pressed when the user rejects the RUI connection from the call center. If the server-side proxy 401 receives pressing of the button 821 by the user (NO in step S706), the processing illustrated in FIG. 8 ends.

In step S707, the server-side proxy 401 transmits the permission for the RUI connection to the relay server 120.

In step S708, the server-side proxy 401 receives the acquisition URL for acquiring the data from the RUI request data queue of the relay service 420, and the storage URL for storing the data into the RUI response data queue of the relay service 420 from the relay server 120, and stores the received URLs into the HDD 214. In step S709, the server-side proxy 401 acquires (GET) an HTTP request illustrated in FIG. 10A that is stored in the RUI request data queue from the acquisition URL.

In step S710, the server-side proxy 401 extracts an ID and the HTTP request from a BODY portion in a GET response (the HTTP request) acquired (GET) in step S709 that is illustrated in FIG. 10B by way of example, and stores the extracted ID into the HDD 214. In other words, the server-side proxy 401 converts the GET response to acquire the ID and the HTTP request.

In step S711, the server-side proxy 401 transmits the extracted HTTP request to the web server 402.

In step S712, the server-side proxy 401 receives an HTTP response illustrated in FIG. 10C from the web server 402.

In step S713, the server-side proxy 401 adds the ID stored in the HDD 214 to the received HTTP response, and transmits the HTTP response to the storage URL to store the HTTP response into the RUI response data queue.

In step S714, the server-side proxy 401 determines whether an end instruction is received from the user via the operation unit 219. If the server-side proxy 401 determines that the end instruction is received (YES in step S714), in step S715, the server-side proxy 401 issues a disconnection instruction to the relay service 420. Then, the processing illustrated in FIG. 8 ends. On the other hand, if the server-side proxy 401 determines that the end instruction is not issued (NO in step S714), the processing returns to step S709.

By performing the above-described processing, the MFP 100 can transmit to the relay server 120 the HTTP response returned from the web server 402 in response to the HTTP request received from the relay server 120 after adding the same ID as the ID added to this HTTP request. This allows the HTTP request and the HTTP response between the MFP 100 and the PC 110 to be paired with each other, thereby realizing such HTTP communication that the request and the response are consistent with each other.

Figure 11B:
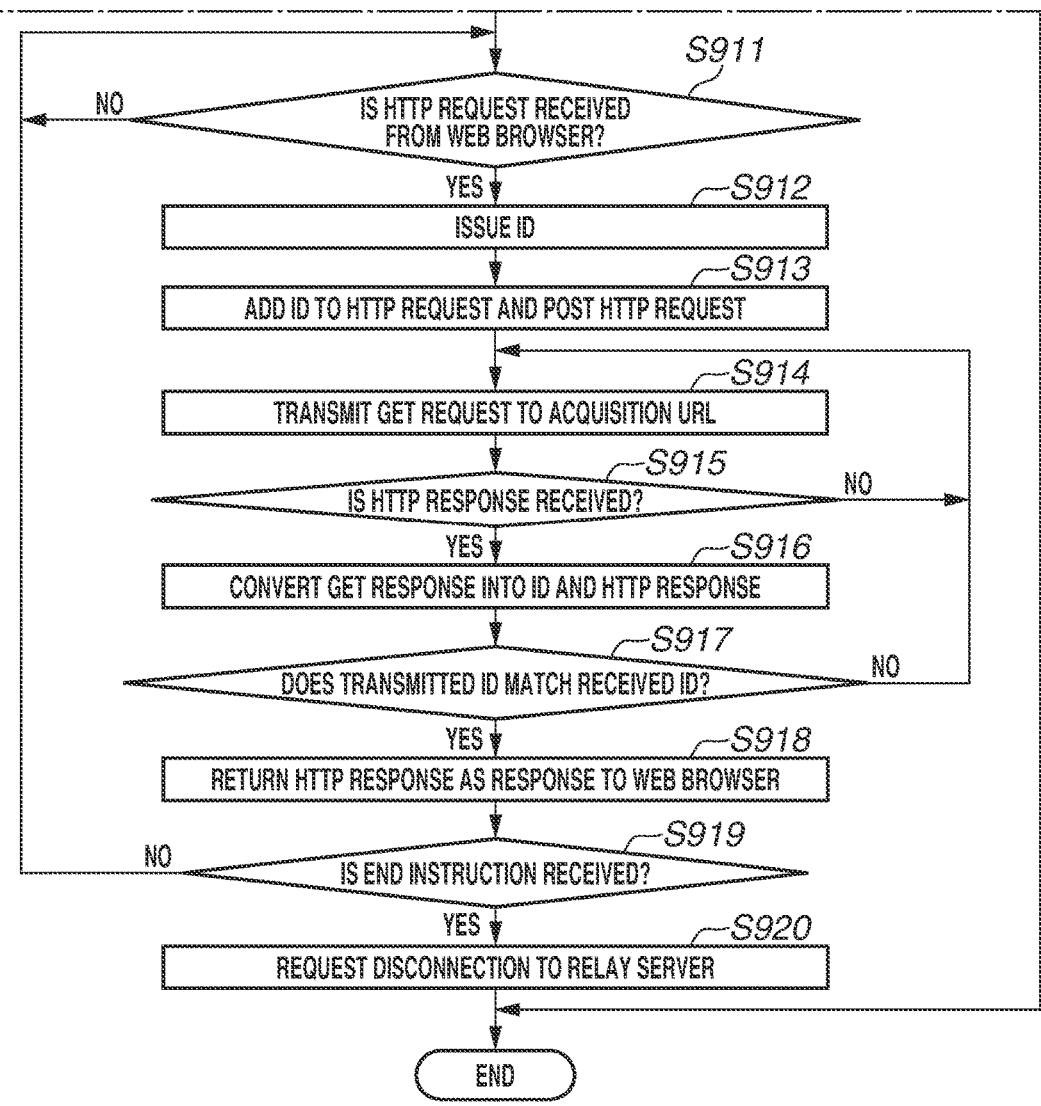
FIG. 11 (consisting of FIGS. 11A and 11B) is a flowchart illustrating an example of processing performed by the PC according to the first exemplary embodiment.

FIG. 11 (consisting of FIGS. 11A and 11B) is a flowchart illustrating an example of processing performed by the PC 110 according to the present exemplary embodiment. In step S901, the client-side proxy 410 determines whether the application is activated via the operation unit 317 of the PC 110 (hereinafter, simply referred to as the operation unit 317 in the processing illustrated in FIG. 11).

If the client-side proxy 410 determines that the application is activated (YES in step S901), in step S902, the client-side proxy 410 displays an authentication information input screen illustrated in FIG. 12A that will be described below. On the other hand, if the client-side proxy 410 determines that the application is not activated (NO in step S901), the processing of S901 is repeated.

FIG. 12A illustrates an example of the operation screen displayed on the operation unit 317.

The operation screen illustrated in FIG. 12A is a screen displayed when the user requests the authentication to the relay server 120.

An input field 830 is an input field for inputting a username that is the authentication information required to access the relay server 120.

An input field 831 is an input field for inputting a password that is the authentication information required to access the relay server 120.

A button 832 is a login button that the user presses to issue a login instruction after inputting the authentication information into the input field 830 and the input field 831.

In step S903, the client-side proxy 410 determines whether the authentication information is input and the button 832 is pressed on the authentication information input screen displayed in step S902. If the client-side proxy 410 determines that the authentication information is input and the button 832 is pressed (YES in step S903), the processing proceeds to step S904. On the other hand, if the client-side proxy 410 determines that the authentication information is not input (NO in step S903), the client-side proxy 410 waits until the authentication information is input. The client-side proxy 410 may be configured to end the processing illustrated in FIG. 11, if the authentication information is not input for a predetermined time period.

In step S904, the client-side proxy 410 connects to the relay service 420, transmits the input authentication information to the relay service 420, and waits for the result of the authentication.

In step S905, the client-side proxy 410 determines whether the authentication result notification received in response to the authentication information transmitted to the relay service 420 indicates a success or a failure. If the client-side proxy 410 determines that the authentication has succeeded as a result of the determination (YES in step S905), in step S906, the client-side proxy 410 displays a screen for selecting an MFP that the user will support as illustrated in FIG. 12B that will be described below. On the other hand, if the client-side proxy 410 determines that the authentication has failed (NO in step S905), the processing illustrated in FIG. 11 ends.

FIG. 12B illustrates an example of the operation screen displayed on the operation unit 317.

The operation screen illustrated in FIG. 12B is a screen displayed when the user selects an MFP to support.

Information 840 is a list of user environments in which MFPs connected to the relay server 120 in step S706 illustrated in FIG. 8 are disposed. FIG. 12B illustrates only a single user environment as the information 840 by way of example, but the information 840 is further added when an MFP disposed in another user environment is connected to the relay service 420.

A button 841 is a button pressed when the user instructs the PC 110 to start support. When the client-side proxy 410 receives pressing of the button 841 by the user, the processing proceeds to step S907.

In step S907, the client-side proxy 410 receives the permission for the RUI connection from the relay server 120, and displays an RUI connection screen illustrated in FIG. 12C that will be described below. Then, in step S908, the client-side proxy 410 determines whether to connect to the RUI based on a use's instruction received via the RUI connection screen illustrated in FIG. 12C.

FIG. 12C illustrates an example of the operation screen displayed on the operation unit 317.

The operation screen illustrated in FIG. 12C is a screen displayed when the user determines whether to connect to the RUI of the MFP 100.

A button 850 is a button pressed when the user determines to connect to the RUI of the MFP 100 that the user will support. If the client-side proxy 410 receives pressing of the button 850 by the user (YES in step S908), the processing proceeds to step S909.

A button 851 is a button pressed when the user determines not to connect to the RUI of the MFP 100 that the user would otherwise support. If the client-side proxy 410 receives pressing of the button 851 by the user (NO in step S908), the processing illustrated in FIG. 11 ends.

In step S909, the client-side proxy 410 transmits a request for the RUI connection to the relay server 120.

In step S910, the client-side proxy 410 stores the storage URL for storage into the RUI request data queue and the acquisition URL for acquisition from the RUI response data queue, which are received from the relay server 120, into the HDD 314 of the PC 110. Hereinafter, in the processing illustrated in FIG. 11, the HDD 314 of the PC 110 will be simply referred to as the HDD 314.

In step S911, the client-side proxy 410 determines whether the HTTP request described above with reference to FIG. 6A is received from the web browser 411. If the client-side proxy 410 determines that the HTTP request is received (YES in step S911), the processing proceeds to step S912. If the client-side proxy 410 determines that the HTTP request is not received (NO in step S911), the client-side proxy 410 waits until the HTTP request is received.

In step S912, the client-side proxy 410 issues a unique ID. For example, the client-side proxy 410 manages the ID with use of the ID table described above with reference to FIG. 7.

In step S913, the client-side proxy 410 adds the issued ID to the received HTTP request, and posts this HTTP request to the storage URL stored in the HDD 314 to store the HTTP request into the RUI request data queue. At this time, the client-side proxy 410 acquires a response illustrated in FIG. 13A as a response to the POST request.

In step S914, the client-side proxy 410 transmits a GET request illustrated in FIG. 13B to the acquisition URL to receive the HTTP response from the RUI response data queue.

In step S915, the client-side proxy 410 determines whether an HTTP response is received in response to the GET request transmitted in step S914. If the client-side proxy 410 determines that the HTTP response is received (YES in step S915), the processing proceeds to step S916. If the client-side proxy 410 determines that the HTTP response is not received (NO in step S915), the processing returns to step S914.

In step S916, the client-side proxy 410 extracts an ID and the HTTP response from a BODY portion in the received GET response. In other words, the client-side proxy 410 converts the GET response to acquire the ID and the HTTP response.

In step S917, the client-side proxy 410 refers to the ID table described above with reference to FIG. 7 to determine whether the extracted ID matches the ID added to the HTTP request transmitted in step S913. If the client-side proxy 410 determines that these IDs match each other (YES in step S917), the processing proceeds to step S918. On the other hand, if the client-side proxy 410 determines that these IDs do not match each other (NO in step S917), the processing returns to step S914. As a result, the client-side proxy 410 can determine and acquire the HTTP response paired with the transmitted HTTP request based on the ID.

In step S918, the client-side proxy 410 returns an HTTP response as illustrated in FIG. 13C as the response to the HTTP request from the web browser 411.

In step S919, the client-side proxy 410 determines whether an end instruction is received from the user via the operation unit 317. If the client-side proxy 410 determines that the end instruction is received (YES in step S919), in step S920, the client-side proxy 410 issues a disconnection instruction to the relay service 420. Then, the processing illustrated in FIG. 11 ends. On the other hand, if the client-side proxy 410 determines that the end instruction is not received (NO in step S919), the processing returns to step S911.

By performing the above-described processing, the PC 110 compares the ID added to the transmitted HTTP request with the ID added to the received HTTP response, which allows the HTTP request and the HTTP response between the MFP 100 and the PC 110 to be paired with each other. As a result, the PC 110 can realize such HTTP communication that the request and the response are consistent with each other.

Figure 14:
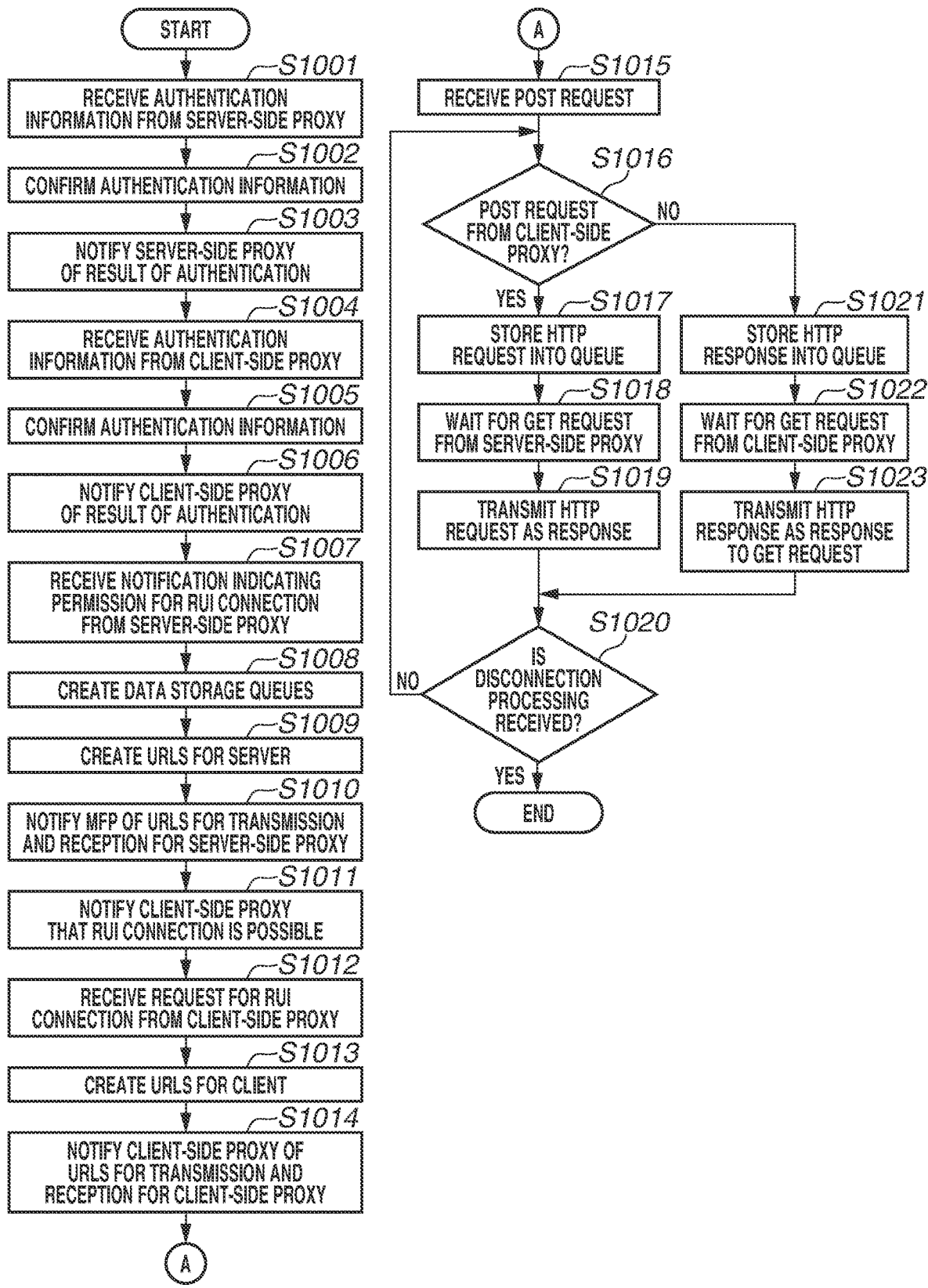
FIG. 14 is a flowchart illustrating an example of processing performed by the relay server according to the first exemplary embodiment.

FIG. 14 is a flowchart illustrating an example of processing performed by the relay server 120 according to the present exemplary embodiment.

In step S1001, the relay service 420 receives the authentication information from the server-side proxy 401.

In step S1002, the relay service 420 confirms the received authentication information.

In step S1003, the relay service 420 notifies the server-side proxy 401 of the result of the authentication.

In step S1004, the relay service 420 receives the authentication information from the client-side proxy 410.

In step S1005, the relay service 420 confirms the received authentication information.

In step S1006, the relay service 420 notifies the client-side proxy 410 of the result of the authentication.

In step S1007, the relay service 420 receives a notification indicating the permission for the RUI connection from the server-side proxy 401.

In step S1008, the relay service 420 creates the RUI request data queue and the RUI response data queue.

In step S1009, the relay service 420 creates the acquisition URL for acquisition from the RUI request data queue and the storage URL for storage into the RUI response data queue, for the server-side proxy 401.

In step S1010, the relay service 420 notifies the server-side proxy 401 of the created URLs.

In step S1011, the relay service 420 notifies the client-side proxy 410 of a notification indicating that the RUI connection is possible.

In step S1012, the relay service 420 receives the request for the RUI connection from the client-side proxy 410.

In step S1013, the relay service 420 creates the storage URL for storage into the RUI request data queue and the acquisition URL for acquisition from the RUI response data queue, for the client-side proxy 410.

In step S1014, the relay service 420 notifies the client-side proxy 410 of the created URLs.

In step S1015, the relay service 420 waits for reception of a POST request.

In step S1016, the relay service 420 determines whether the received POST request is the POST request transmitted from the client-side proxy 410. If the relay service 420 determines that the received POST request is the POST request transmitted from the client-side proxy 410 (YES in step S1016), the processing proceeds to step S1017. On the other hand, if the relay service 420 determines that the received POST request is not the POST request transmitted from the client-side proxy 410 (NO in step S1016), the processing proceeds to step S1021.

In step S1017, the relay service 420 stores the HTTP request transmitted from the client-side proxy 410 into the RUI request data queue.

In step S1018, the relay service 420 waits for the GET request transmitted from the server-side proxy 401 to the acquisition URL for acquisition from the RUI request data queue.

In step S1019, the relay service 420 transmits the HTTP request stored in the RUI request data queue to the server-side proxy 401 as the response to the GET request.

In step S1020, the relay service 420 determines whether the disconnection processing is received from the MFP 100 or the PC 110. If the relay service 420 determines that the disconnection processing is received (YES in step S1020), the processing illustrated in FIG. 14 ends. If the relay service 420 determines that the disconnection processing is not received (NO in step S1020), the processing returns to step S1016.

In step S1021, the relay service 420 stores the HTTP response received from the server-side proxy 401 into the RUI response data queue.

In step S1022, the relay service 420 waits for the GET request transmitted from the client-side proxy 410 to the acquisition URL for acquisition from the RUI response data queue.

In step S1023, the relay service 420 transmits the HTTP response stored in the RUI response data queue to the client-side proxy 410 as the response to the GET request. Then, the processing proceeds to step S1020.

By performing the above-described processing, the relay server 120 can relay the communication between the PC 110 and the MFP 100. The HTTP data described in the present exemplary embodiment is not necessarily limited to data according to any specific format, and may be data according to a different format from the described format.

As described above, according to the present exemplary embodiment, the client-side proxy 410 of the PC 110 and the server-side proxy 401 of the MFP 100 communicate with each other while adding the ID to the HTTP data, thereby achieving bi-directional communication with the HTTP request and the HTTP response paired with each other. As a result, the present exemplary embodiment can realize a system that allows a request and a response to correspond to each other when an apparatus located inside a firewall connects to a web service of an apparatus located inside a different firewall to use the service via the Internet.

According to the first exemplary embodiment, the client-side proxy 410 and the server-side proxy 401 add the ID to the HTTP data. A second exemplary embodiment will be described as a configuration in which the relay service 420 adds an ID to HTTP data. Similar configurations of the second exemplary embodiment to those of the above-described first exemplary embodiment will not be described in detail below.

Figure 15:
FIG. 15 (consisting of FIGS. 15A and 15B) is a flowchart illustrating an example of processing performed by the PC according to a second exemplary embodiment.
Figure 15A:
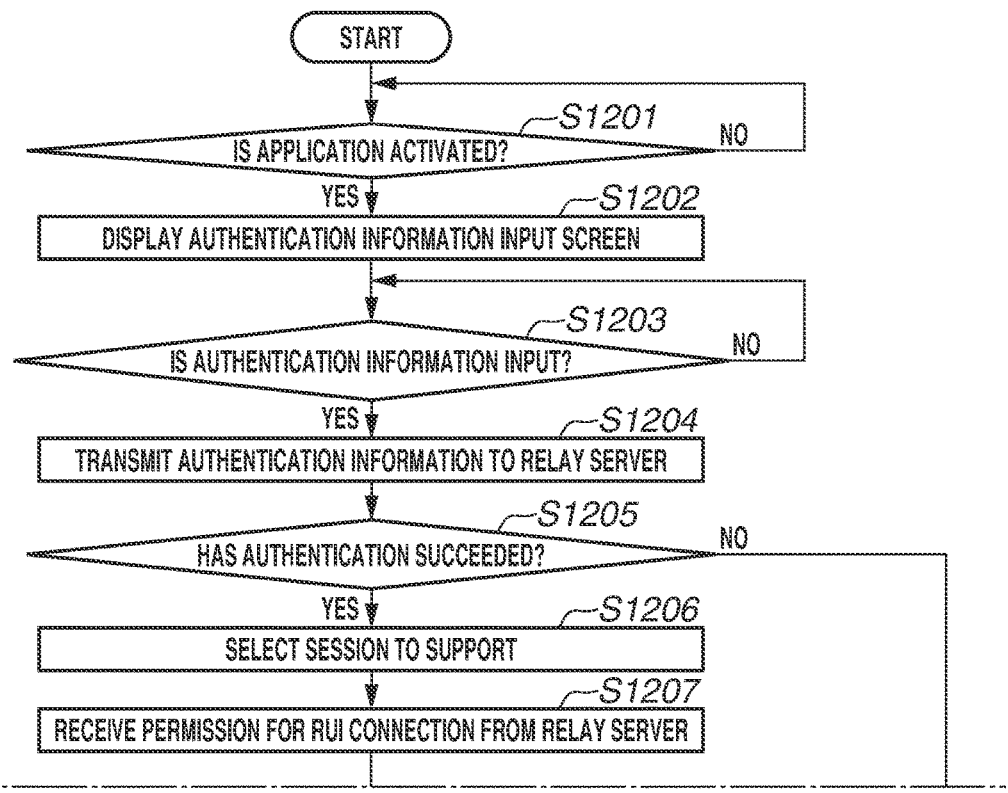
Figure 15B:
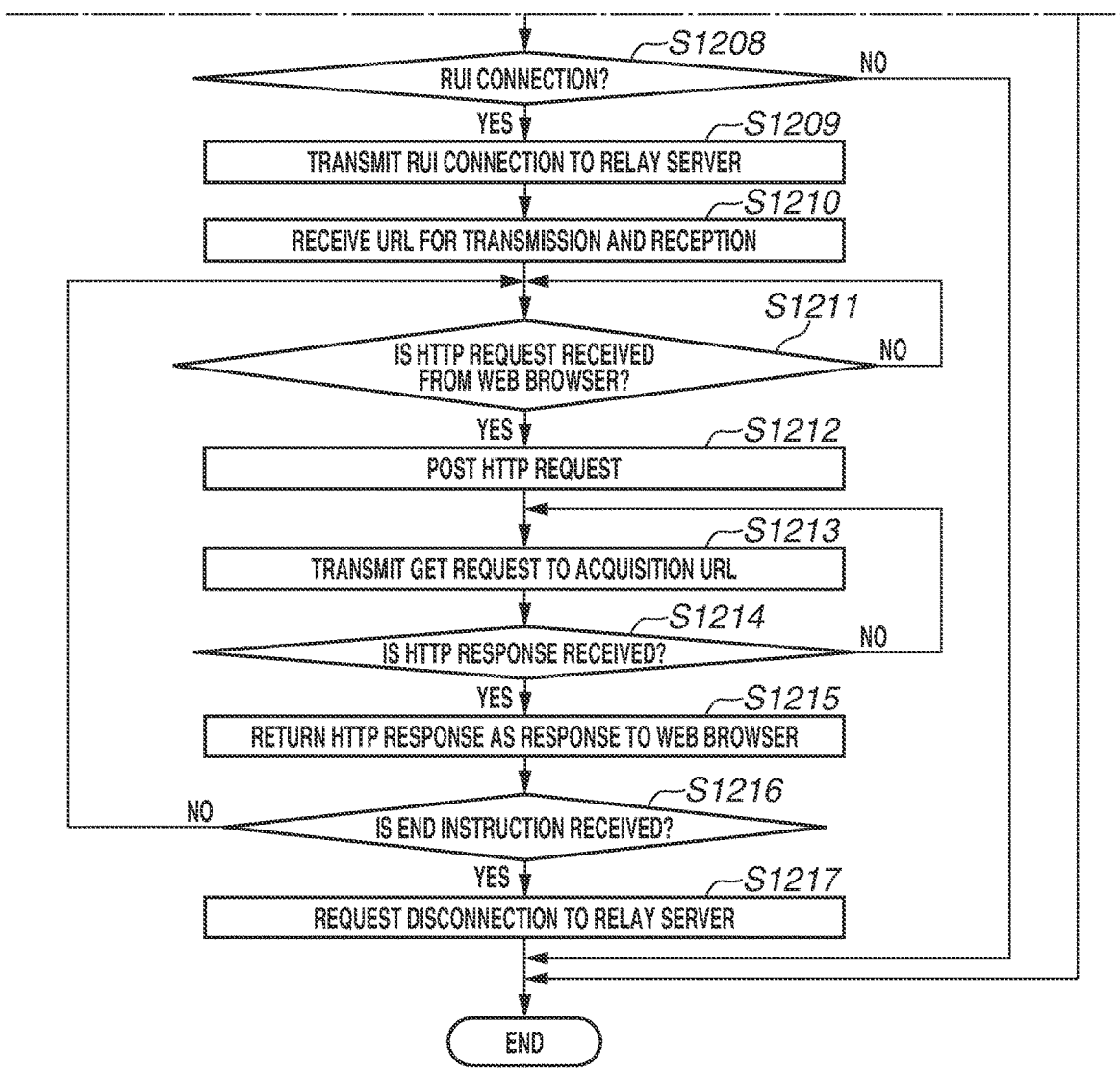

FIG. 15 (consisting of FIGS. 15A and 15B) is a flowchart illustrating an example of processing performed by the PC 110 according to the present exemplary embodiment. Processing from steps S1201 to S1210 is similar to the processing from steps S901 to S910 illustrated in FIG. 11, and therefore, a description thereof is omitted here.

In step S1211, the client-side proxy 410 determines whether an HTTP request illustrated in FIG. 16A is received from the web browser 411. If the client-side proxy 410 determines that the HTTP request is received (YES in step S1211), the processing proceeds to step S1212. If the client-side proxy 410 determines that the HTTP request is not received (NO in step S1211), the client-side proxy 410 waits until the HTTP request is received.

In step S1212, the client-side proxy 410 posts the HTTP request to the storage URL stored in the HDD 314 of the PC 110 as illustrated in FIG. 16B to store the HTTP request into the RUI request data queue.

In step S1213, the client-side proxy 410 transmits a GET request to the acquisition URL as illustrated in FIG. 16C to receive an HTTP response from the RUI response data queue.

In step S1214, the client-side proxy 410 determines whether an HTTP response to the GET request transmitted in step S1213 is received. If the client-side proxy 410 determines that the HTTP response is received (YES in step S1214), the processing proceeds to step S1215. If the client-side proxy 410 determines that the HTTP response is not received (NO in step S1214), the processing returns to step S1213.

In step S1215, the client-side proxy 410 returns an HTTP response illustrated in FIG. 16D as a response to the HTTP request from the web browser 411.

In step S1216, the client-side proxy 410 determines whether an end instruction is received from the user via the operation unit 317 of the PC 110. If the client-side proxy 410 determines that the end instruction is received (YES in step S1216), in step S1217, the client-side proxy 410 issues a disconnection instruction to the relay service 420. Then, the processing illustrated in FIG. 15 ends. On the other hand, if the client-side proxy 410 determines that the end instruction is not received (NO in step S1216), the processing returns to step S1211.

Figure 17:
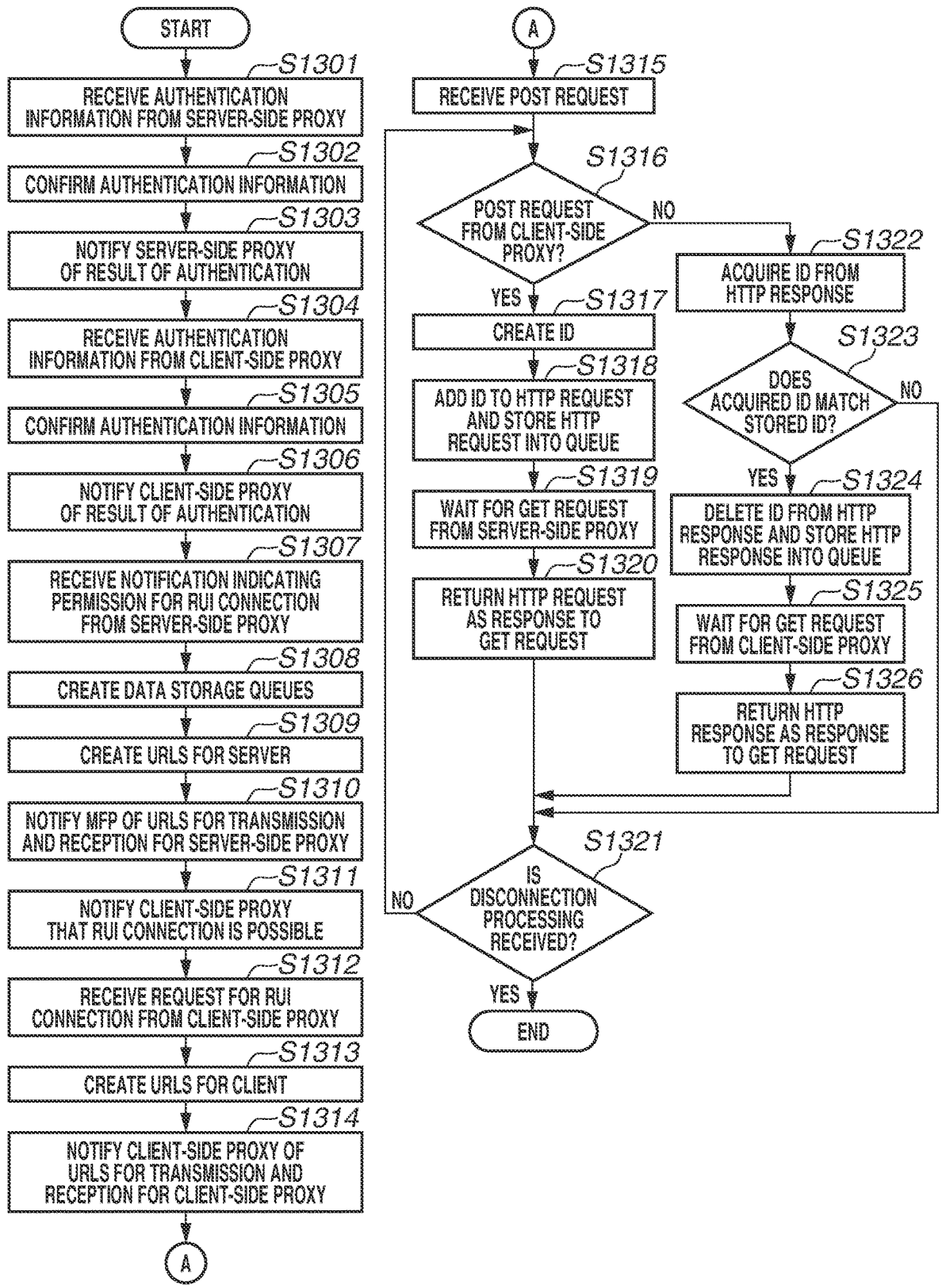
FIG. 17 is a flowchart illustrating an example of processing performed by the relay server according to the second exemplary embodiment.

FIG. 17 is a flowchart illustrating an example of processing performed by the relay server 120 according to the present exemplary embodiment.

Processing from steps S1301 to S1316 is similar to the processing from steps S1001 to S1016 illustrated in FIG. 14, and therefore, a description thereof is omitted here.

In step S1317, the relay service 420 creates a unique ID, and stores the created ID into the HDD 314 of the relay server 120 (hereinafter, simply referred to as the HDD 314 in the processing illustrated in FIG. 17). For example, the relay service 420 manages the ID with use of an ID table illustrated in FIG. 18.

FIG. 18 illustrates an example of the ID table stored in the HDD 314 of the relay server 120.

Information 1401 is information that indicates an ID used to determine whether an HTTP response is an HTTP response to a certain HTTP request. Information 1402 is information that indicates a name of a device to be supported. Information 1403 is information that indicates a name of a client that supports the device. Information 1404 is information that indicates the storage URL for the server (the server-side proxy 401). Information 1405 is information that indicates the acquisition URL for the server. Information 1406 is information that indicates the storage URL for the client (the client-side proxy 410). Information 1407 is information that indicates the acquisition URL for the client. Information 1408 is information that indicates a time at which the HTTP request is acquired by the GET method.

In step S1318, the relay service 420 adds the ID created in step S1317 to the HTTP request posted from the client-side proxy 410 as illustrated in FIG. 19, and stores this HTTP request into the RUI request data queue.

In step S1319, the relay service 420 waits for a GET request transmitted from the server-side proxy 401 to the acquisition URL for acquisition from the RUI request data queue.

In step S1320, the relay service 420 transmits the HTTP request stored in the RUI request data queue to the server-side proxy 401 as a response to the GET request.

In step S1321, the relay service 420 determines whether the disconnection processing is received from the MFP 100 or the PC 110. If the relay service 420 determines that the disconnection processing is received (YES in step S1321), the processing illustrated in FIG. 17 ends. If the relay service 420 determines that the disconnection processing is not received (NO in step S1321), the processing returns to step S1316.

In step S1322, the relay service 420 acquires an ID from the HTTP response data received from the server-side proxy 401.

In step S1323, the relay service 420 determines whether the acquired ID matches the ID in the ID table stored in the HDD 314 that is described above with reference to FIG. 18. If the relay service 420 determines that these IDs match each other (YES in step S1323), the processing proceeds to step S1324. If the relay service 420 determines that these IDs do not match each other (NO in step S1323), the processing proceeds to step S1321.

In step S1324, the relay service 420 deletes the ID from the HTTP response to store this HTTP response into the RUI response data queue, and further deletes the data corresponding to the deleted ID from the ID table stored in the HDD 314.

In step S1325, the relay service 420 waits for the GET request transmitted from the client-side proxy 410 to the acquisition URL for the RUI response data queue.

In step S1326, upon receiving the GET request, the relay service 420 returns the HTTP response to the client-side proxy 410 as a response to the GET request. Then, the processing proceeds to step S1321.

By performing the above-described processing, the relay server 120 can relay the communication between the PC 110 and the MFP 100, while pairing the HTTP request and the HTTP response with each other by adding the ID to the HTTP data. The HTTP data described in the present exemplary embodiment is not necessarily limited to data according to any specific format, and may be data according to a different format from the described format. Further, processing performed by the MFP 100 according to the present exemplary embodiment is similar to that of the first exemplary embodiment, and therefore, a description thereof is omitted here.

As described above, according to the present exemplary embodiment, the relay server 120, which relays the communication between the PC 110 and the MFP 100, adds the ID to the HTTP data and manages the ID, thereby allowing the PC 110 and the MFP 100 to bi-directionally communicate with each other with the HTTP request and the HTTP response paired with each other. As a result, the present exemplary embodiment can realize the system that allows a request and a response to correspond to each other when an apparatus located inside a firewall connects to a web service of an apparatus located inside a different firewall to use the service via the Internet.

According to the first and second exemplary embodiments, the proxy or the relay service 420 adds the ID to the HTTP data, thereby allowing the HTTP response to correspond to the HTTP request from the web browser 411.

A third exemplary embodiment will be described with a configuration that allows an HTTP response to correspond to an HTTP request without using the ID in the system illustrated in FIG. 1. More specifically, in the third exemplary embodiment, a configuration will be described in which the relay server 120 does not accept a POST request for a new HTTP request from the PC 110 until the PC 110 receives the HTTP response. Similar configurations of the third exemplary embodiment to those of the above-described first and second exemplary embodiments will not be described in detail below.

Figure 20:
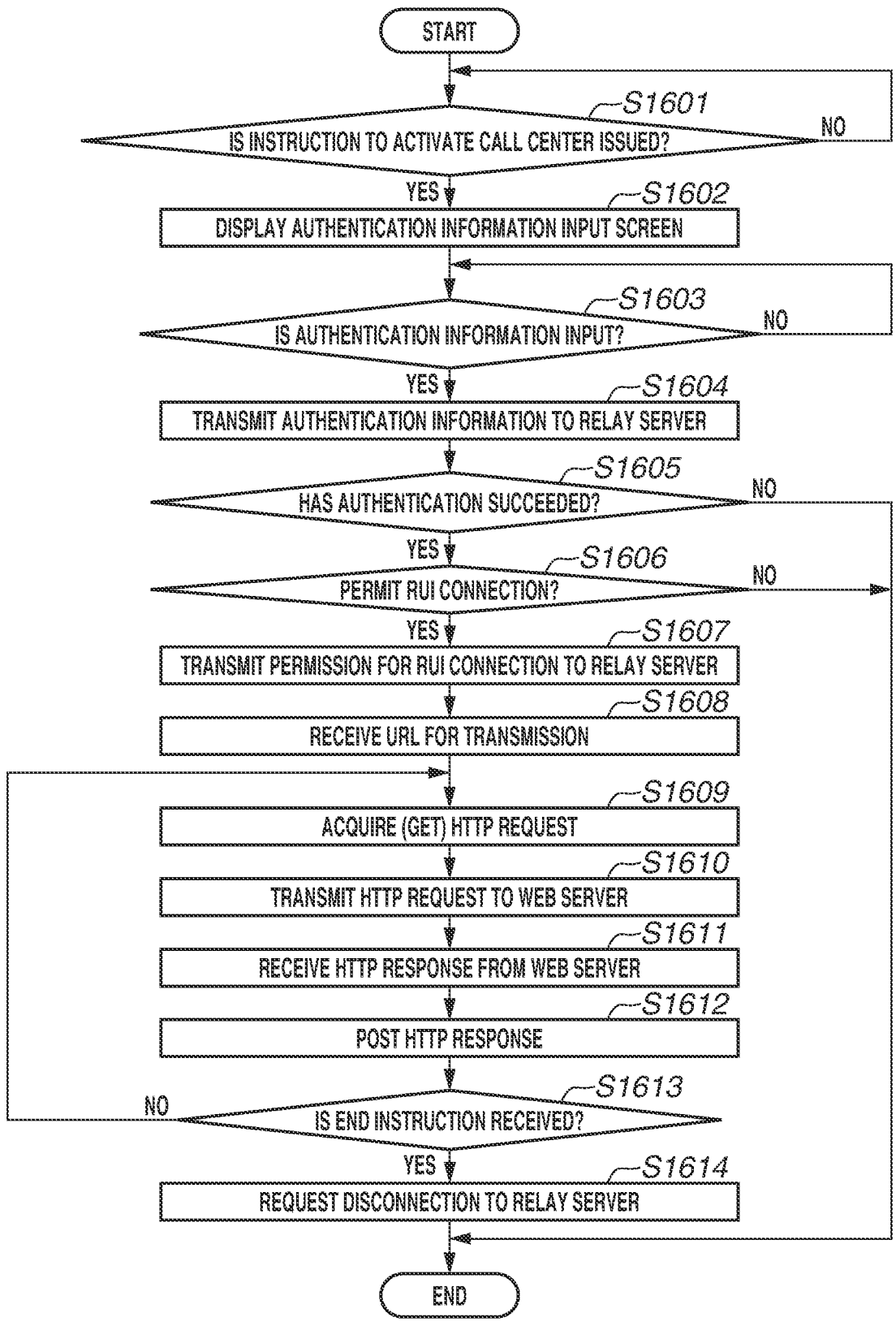
FIG. 20 is a flowchart illustrating an example of processing performed by the MFP according to a third exemplary embodiment.

FIG. 20 is a flowchart illustrating an example of processing performed by the MFP 100 according to the present exemplary embodiment.

Processing from steps S1601 to S1608 is similar to the processing from steps S701 to S708 illustrated in FIG. 8, and therefore, a description thereof is omitted there.

In step S1609, the server-side proxy 401 gets an HTTP request illustrated in FIG. 21A from the acquisition URL for the RUI request data queue.

In step S1610, the server-side proxy 401 transmits the acquired (GET) HTTP request to the web server 402 as illustrated in FIG. 21B.

In step S1611, the server-side proxy 401 receives an HTTP response illustrated in FIG. 21C from the web server 402.

In step S1612, the server-side proxy 401 transmits the received HTTP response to the storage URL to store this HTTP response into the RUI response data queue.

Processing of steps S1613 and S1614 is similar to the processing of steps S714 and S715 illustrated in FIG. 8, and therefore, a description thereof is omitted here.

Figure 22:
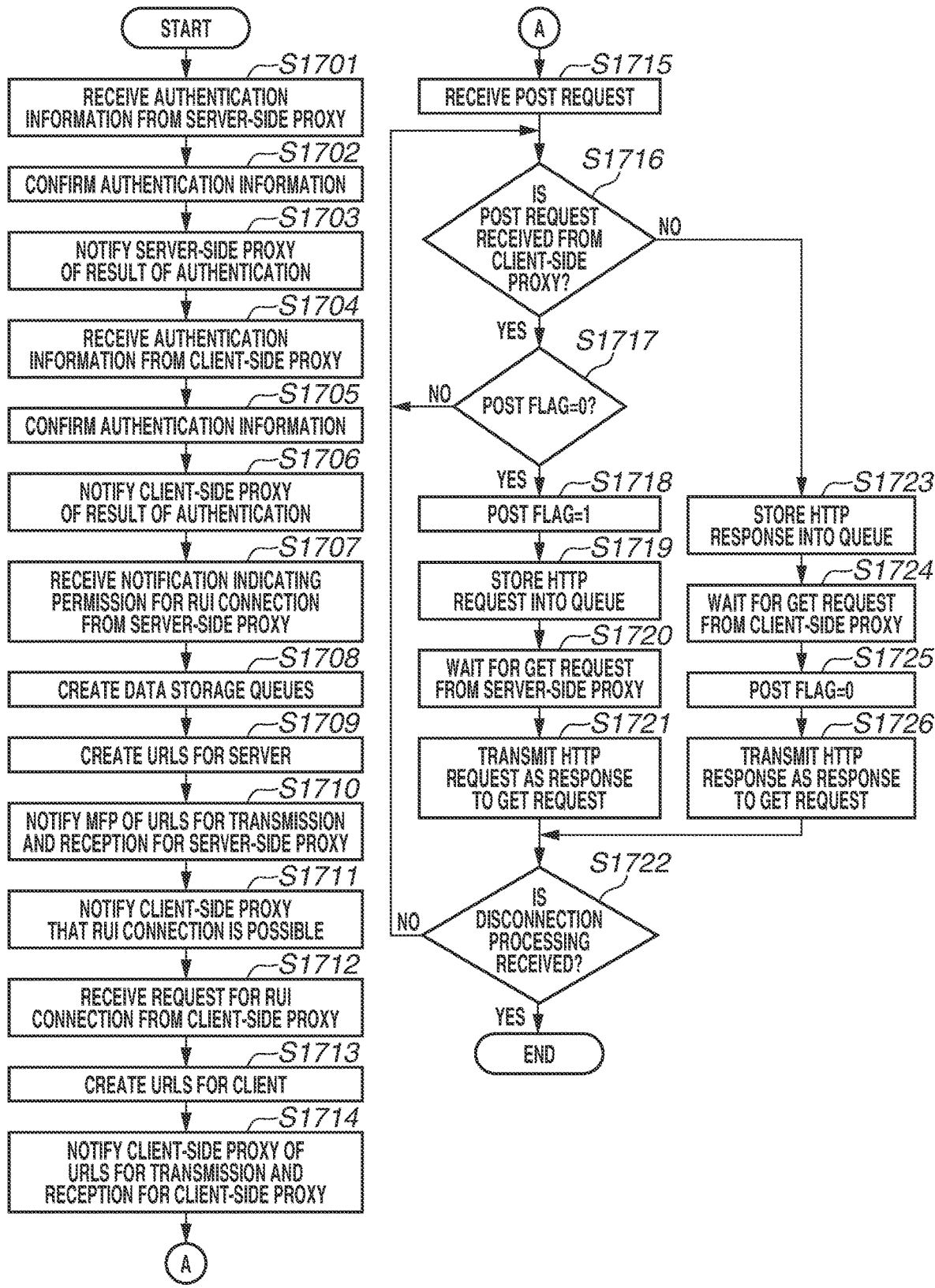
FIG. 22 is a flowchart illustrating an example of processing performed by the relay server according to the third exemplary embodiment.

FIG. 22 is a flowchart illustrating an example of processing performed by the relay server 120 according to the present exemplary embodiment.

Processing from steps S1701 to S1716 is similar to the processing from steps S1001 to S1016 illustrated in FIG. 14, and therefore, a description thereof is omitted here.

In step S1717, the relay service 420 determines whether a POST request is already received from the URL for RUI data transmission on the client side. At this time, the relay service 420 determines whether this POST request is received by confirming a POST flag. More specifically, if the POST flag is set to 0 (YES in step S1717), the relay service 420 determines that the above-described POST request is not received. Then, the processing proceeds to step S1718. On the other hand, if the POST flag is set to 1 (NO in step S1717), the relay service 420 determines that the above-described POST request is received. Then, the processing returns to step S1715.

In step S1718, the relay service 420 changes the POST flag so as to indicate that the POST request is received (the POST flag=1).

In step S1719, the relay service 420 stores the HTTP request received from the client-side proxy 410 into the RUI request data queue.

In step S1720, the relay service 420 waits for the GET request transmitted from the server-side proxy 401 to the acquisition URL for the RUI request data queue.

In step S1721, the relay service 420 transmits the HTTP request stored in the RUI request data queue to the server-side proxy 401 as a response to the GET request.

In step S1722, the relay service 420 determines whether the disconnection processing is received from the MFP 100 or the PC 110. If the relay service 420 determines that the disconnection processing is received (YES in step S1722), the processing illustrated in FIG. 22 ends. If the relay service 420 determines that the disconnection processing is not received (NO in step S1722), the processing returns to step S1716.

In step S1723, the relay service 420 stores the HTTP response into the RUI response data queue.

In step S1724, the relay service 420 waits for a GET request transmitted from the client-side proxy 410 to the acquisition URL for the RUI response data queue.

In step S1725, the relay service 420 changes the POST flag so as to indicate that no transmission request is received (the POST flag=0).

In step S1726, upon receiving the request from the client-side proxy 410, the relay service 420 returns the HTTP response as a response to the GET request. Then, the processing proceeds to step S1722.

By performing the above-described processing, the relay server 120 does not accept the POST request for the new HTTP request from the PC 110 until the PC 110 receives the HTTP response, thereby succeeding in relaying the communication between the PC 110 and the MFP 100 with the HTTP request and the HTTP response paired with each other. The HTTP data described in the present exemplary embodiment is not necessarily limited to data according to any specific format, and may be data according to a different format from the described format. Further, processing performed by the PC 110 according to the present exemplary embodiment is similar to the second exemplary embodiment, and therefore, a description thereof is omitted here.

As described above, according to the present exemplary embodiment, the relay server 120 is configured to refrain from accepting the POST request for the new HTTP request from the PC 110 until the PC 110 receives the HTTP response, thereby allowing the HTTP request and the HTTP response to correspond to each other. This allows the PC 110 and the MFP 100 to bi-directionally communicate with each other with the HTTP request and the HTTP response paired with each other. As a result, the present exemplary embodiment can realize the system that allows a request and a response to correspond to each other when an apparatus located inside a firewall connects to a web service of an apparatus located inside a different firewall to use the service via the Internet.

A fourth exemplary embodiment will be described with a configuration that allows an HTTP request from the web browser 411 and an HTTP response to this HTTP request to correspond to each other with use of URLs (address information) in the system illustrated in FIG. 1. More specifically, the relay server 120 notifies the PC 110 of a URL for acquiring (GET) the HTTP response as a response to a POST request for the HTTP request that is transmitted from the PC 110. Further, the relay server 120 notifies the MFP 100 of a URL for posting the HTTP response as a response to a GET request for the HTTP request that is transmitted from the MFP 100. Similar configurations of the fourth exemplary embodiment to those of the above-described first to third exemplary embodiments will not be described in detail below.

Figure 23:
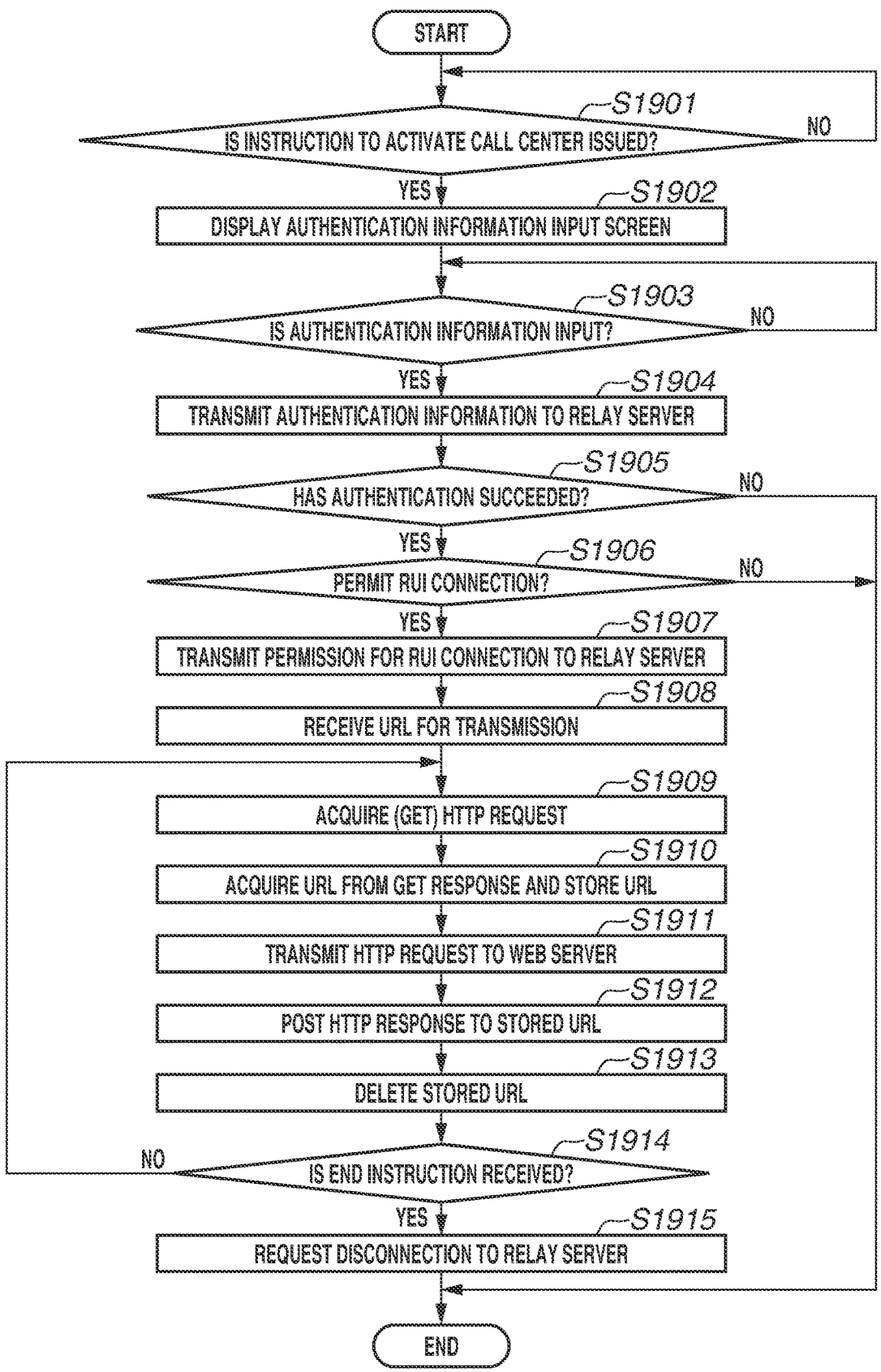
FIG. 23 is a flowchart illustrating an example of processing performed by the MFP according to a fourth exemplary embodiment.

FIG. 23 is a flowchart illustrating an example of processing performed by the MFP 100 according to the present exemplary embodiment.

Processing from steps S1901 to S1907 is similar to the processing from steps S701 to S707 illustrated in FIG. 8, and therefore, a description thereof is omitted here.

In step S1908, the server-side proxy 401 stores the acquisition URL into the RUI request data queue that is received from the relay server 120, into the HDD 214.

In step S1909, the server-side proxy 401 acquires (GET) an HTTP request in the RUI request data queue from the acquisition URL.

In step S1910, the server-side proxy 401 converts the above-described GET response illustrated in FIG. 10B to acquire a URL and the HTTP request, and stores the acquired URL into the HDD 214.

In step S1911, the server-side proxy 401 transmits the acquired HTTP request to the web server 402.

In step S1912, the server-side proxy 401 posts an HTTP response returned from the web server 402 in response to the HTTP request transmitted to the web server 402, to the URL stored in the HDD 214.

In step S1913, the server-side proxy 401 deletes the URL stored in the HDD 214.

Processing of steps S1914 and S1915 is similar to the processing of steps S714 and S715 illustrated in FIG. 8, and therefore, a description thereof is omitted here.

By performing the above-described processing, the MFP 100 can post the HTTP response returned from the web server 402 with use of the URL acquired from the GET response. This allows the HTTP request and the HTTP response between the MFP 100 and the PC 110 to be paired with each other, thereby realizing such HTTP communication that the request and the response are consistent with each other.

Figure 24B:
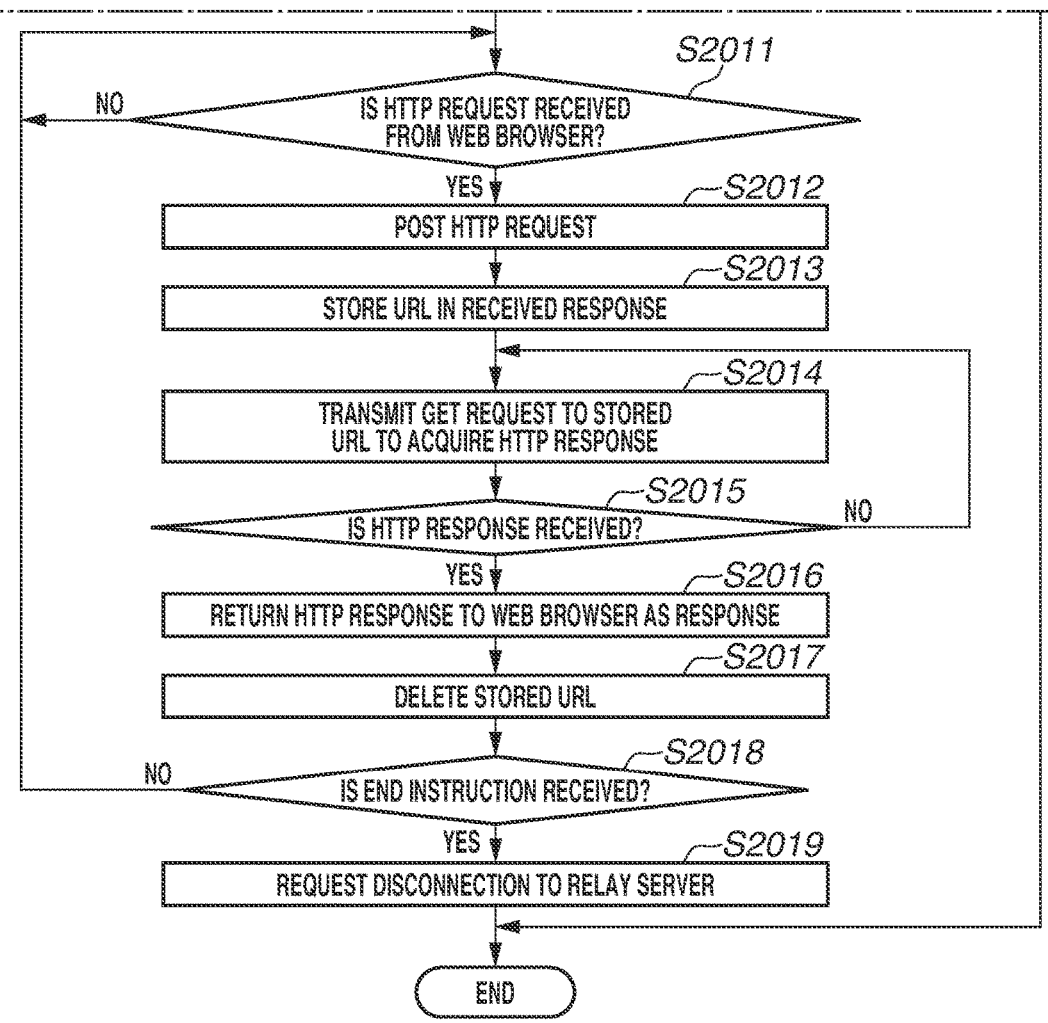
FIG. 24 (consisting of FIGS. 24A and 24B) is a flowchart illustrating an example of processing performed by the PC according to the fourth exemplary embodiment.

FIG. 24 is a flowchart illustrating an example of processing performed by the PC 110 according to the present exemplary embodiment. Processing from steps S2001 to S2009 is similar to the processing from steps S901 to S909 illustrated in FIG. 11, and therefore, a description thereof is omitted here.

In step S2010, the client-side proxy 410 stores the storage URL for storage into the RUI request data queue that is received from the relay server 120, into the HDD 314 of the PC 110 (hereinafter, simply referred to as the HDD 314 in the processing illustrated in FIG. 24).

In step S2011, the client-side proxy 410 determines whether an HTTP request illustrated in FIG. 25A is received from the web browser 411. If the client-side proxy 410 determines that the HTTP request is received (YES in step S2011), the processing proceeds to step S2012. If the client-side proxy 410 determines that the HTTP request is not received (NO in step S2011), the client-side proxy 410 waits until the HTTP request is received.

In step S2012, the client-side proxy 410 posts the HTTP request received from the web browser 411 to the storage URL stored in the HDD 314 as illustrated in FIG. 25B to store this HTTP request into the RUI request data queue.

In step S2013, the client-side proxy 410 stores a URL in a response illustrated in FIG. 25C that is received from the relay server 120 as a response to the POST request transmitted to the storage URL, into the HDD 314.

In step S2014, the client-side proxy 410 transmits a GET request for acquiring the HTTP response to the URL stored in the HDD 314 as illustrated in FIG. 25D to receive the data from the RUI response data queue.

In step S2015, the client-side proxy 410 determines whether an HTTP response is received in response to the GET request transmitted in step S2014. If the client-side proxy 410 determines that the HTTP response is received (YES in step S2015), the processing proceeds to step S2016. If the client-side proxy 410 determines that the HTTP response is not received (NO in step S2015), the processing returns to step S2014.

In step S2016, the client-side proxy 410 returns an HTTP response illustrated in FIG. 25E as a response to the HTTP request from the web browser 411.

In step S2017, the client-side proxy 410 deletes the URL stored in the HDD 314.

Processing of steps S2018 and S2019 is similar to the processing of steps S919 and S920 illustrated in FIG. 11, and therefore, a description thereof is omitted here.

By performing the above-described processing, the PC 110 can acquire (GET) the HTTP response based on the URL notified of from the relay server 120 as the response to the POST request for the HTTP request. This allows the HTTP request and the HTTP response between the MFP 100 and the PC 110 to be paired with each other, thereby realizing such HTTP communication that the request and the response are consistent with each other.

FIG. 26 is a flowchart illustrating an example of processing performed by the relay server 120 according to the present exemplary embodiment.

In step S2101, the relay service 420 receives the authentication information from the server-side proxy 401.

In step S2102, the relay service 420 confirms the received authentication information.

In step S2103, the relay service 420 notifies the server-side proxy 401 of the result of the authentication.

In step S2104, the relay service 420 receives the authentication information from the client-side proxy 410.

In step S2105, the relay service 420 confirms the received authentication information.

In step S2106, the relay service 420 notifies the client-side proxy 410 of the result of the authentication.

In step S2107, the relay service 420 receives the notification indicating the permission for the RUI connection from the server-side proxy 401.

In step S2108, the relay service 420 creates the RUI request data queue and the RUI response data queue.

In step S2109, the relay service 420 creates the acquisition URL for acquisition from the RUI request data queue for the server-side proxy 401.

In step S2110, the relay service 420 notifies the server-side proxy 401 of the created URL.

In step S2111, the relay service 420 notifies the client-side proxy 410 of the notification indicating that the RUI connection is possible.

In step S2112, the relay service 420 receives the request for the RUI connection from the client-side proxy 410.

In step S2113, the relay service 420 creates the storage URL for storage into the RUI request data queue for the client-side proxy 410.

In step S2114, the relay service 420 notifies the client-side proxy 410 of the created URL.

In step S2115, the relay service 420 waits for reception of a POST request.

In step S2116, the relay service 420 determines whether the received POST request is the POST request transmitted from the client-side proxy 410. If the relay service 420 determines that the received POST request is the POST request transmitted from the client-side proxy 410 (YES in step S2116), the processing proceeds to step S2117. If the received POST request is not the POST request transmitted from the client-side proxy 410 (NO in step S2116), the processing proceeds to step S2124.

In step S2117, the relay service 420 creates the acquisition URL for the client-side proxy 410 for acquisition from the RUI response data queue.

In step S2118, the relay service 420 adds the created URL to the POST response to the client-side proxy 410, and transmits this POST response.

In step S2119, the relay service 420 creates the storage URL for the server-side proxy 401 for transmission to the RUI response data queue.

In step S2120, the relay service 420 adds the created storage URL to the HTTP request, and stores this HTTP request into the RUI request data queue.

In step S2121, the relay service 420 waits for the GET request transmitted from the server-side proxy 401 to the acquisition URL for the RUI request data queue.

In step S2122, the relay service 420 transmits the HTTP request stored in the RUI request data queue as the response to the GET request.

In step S2123, the relay service 420 determines whether the disconnection processing is received from the MFP 100 or the PC 110. If the relay service 420 determines that the disconnection processing is received (YES in step S2123), the processing illustrated in FIG. 26 ends. If the relay service 420 determines that the disconnection processing is not received (NO in step S2123), the processing returns to step S2116.

In step S2124, the relay service 420 stores the HTTP response received from the server-side proxy 401 into the RUI response data queue.

In step S2125, the relay service 420 waits for the GET request transmitted from the client-side proxy 410 to the acquisition URL for acquisition from the RUI response data queue.

In step S2126, the relay service 420 transmits the HTTP response stored in the RUI response data queue to the client-side proxy 410 as the response to the GET request. Then, the processing proceeds to step S2123.

By performing the above-described processing, the relay server 120 allows the HTTP request and the HTTP response to correspond to each other with use of the URLs. The HTTP data described in the present exemplary embodiment is not necessarily limited to data according to any specific format, and may be data according to a different format from the described format.

As described above, according to the present exemplary embodiment, the HTTP request from the web browser 411 and the HTTP response to this request can be paired with each other with use of the URLs. As a result, the present exemplary embodiment can realize the system that allows a request and a response to correspond to each other when an apparatus located inside a firewall connects to a web service of an apparatus located inside a different firewall to use the service via the Internet.

A fifth exemplary embodiment is configured to allow a content of RUI communication between the MFP 100 and the PC 110 to be viewed from a PC 103 that is another PC illustrated in a system configuration diagram of FIG. 27 that will be described below. Generally, when a service engineer performs maintenance of a user's image forming apparatus, a status of this work should be also confirmed from a customer side. For example, when the service engineer changes a setting value for recovering the image forming apparatus during the maintenance of the image forming apparatus, this maintenance often involves work of backing up information in the image forming apparatus into a PC. In this case, which setting value is backed up by the service engineer should be able to be confirmed by the user side.

The present exemplary embodiment will be described with a configuration that allows the content of the RUI communication between the MFP 100 and the PC 110 to be viewed from the PC 103 on the user side. Similar configurations of the fifth exemplary embodiment to those of the above-described first to fourth exemplary embodiments will not be described in detail below.

Figure 27:
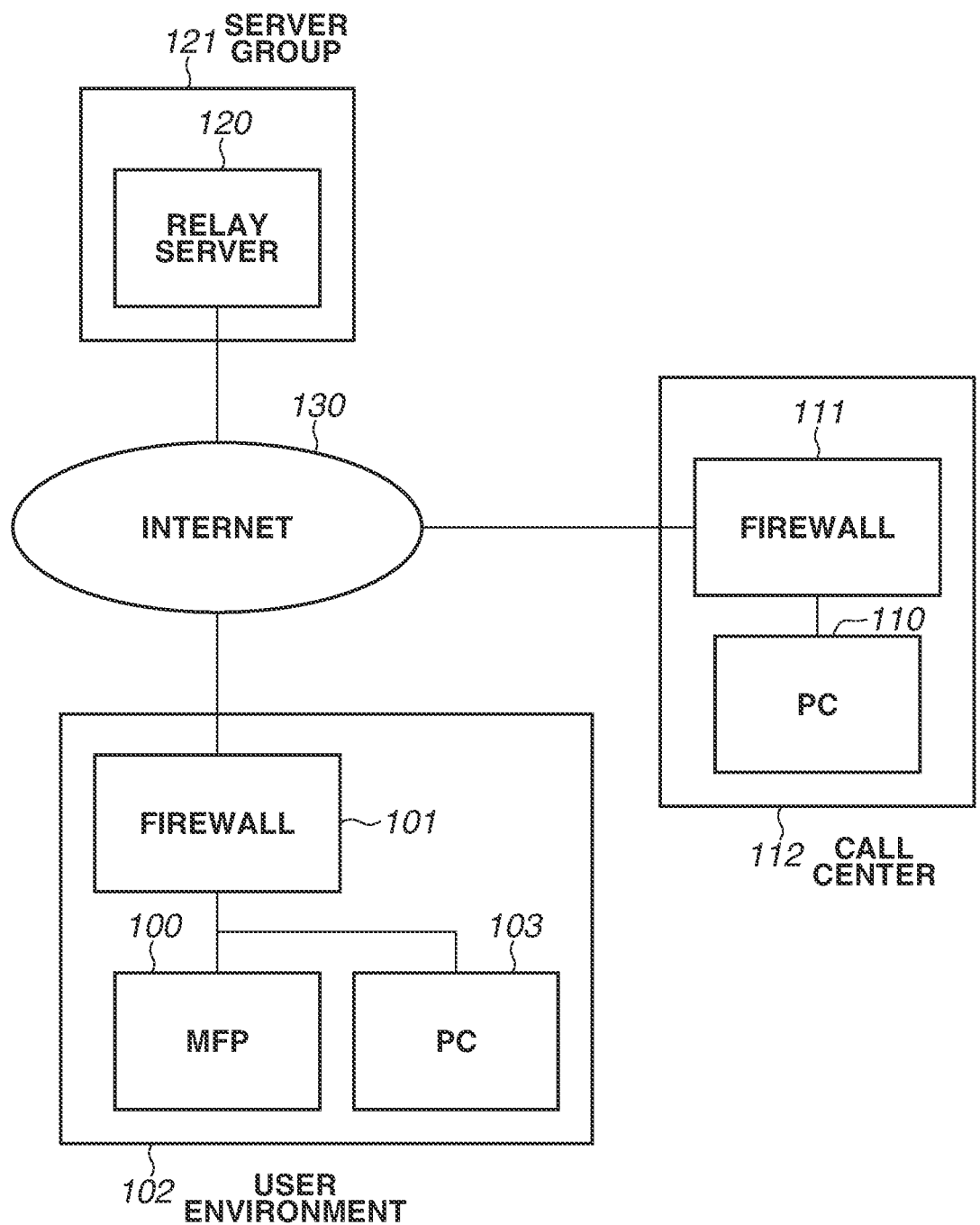
FIG. 27 is a block diagram illustrating an example of a system configuration.

FIG. 27 illustrates an example of a system configuration of a communication system that provides the secure remote maintenance service via a network according to the present exemplary embodiment.

The PC 103 is disposed in the user environment 102, and can access the Internet 130. The other components are similar to the above-described components illustrated in FIG. 1, and therefore, descriptions thereof are omitted here.

Further, a hardware configuration of the PC 103 is similar to the above-described hardware configuration illustrated in FIG. 3. In other words, the CPU 311 of the PC 103 realizes functions of the PC 103 and processing illustrated in flowcharts regarding the PC 103 that will be described below, by executing a program stored in the ROM 312 or the HDD 314 of the PC 103. Descriptions of the other units are omitted here.

Figure 28:
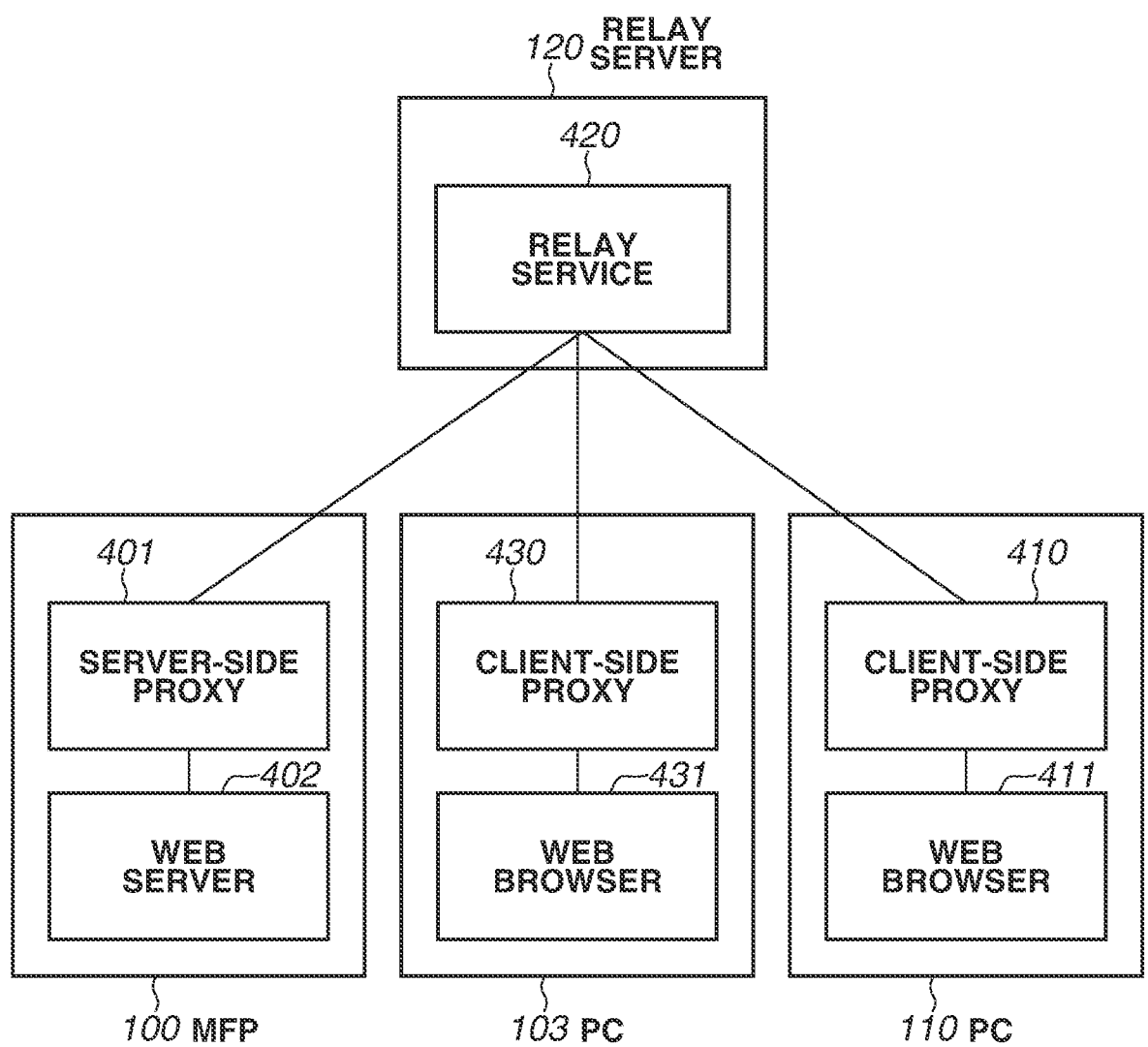
FIG. 28 is a block diagram illustrating an example of a function configuration of each of the MFP, the PCs, and the relay server.

FIG. 28 illustrates an example of a function configuration of each of the MFP 100, the PC 103, the PC 110, and the relay server 120 according to the present exemplary embodiment.

The function configurations of the MFP 100, the PC 110, and the relay server 120 are similar to the function configurations illustrated in FIG. 4, and therefore, descriptions thereof are omitted here.

A client-side proxy 430 in the PC 103 mediates (relays) communication between a web browser 431 and the relay service 420. The client-side proxy 430 uses the POST method for data transmission to the relay service 420. Further, the client-side proxy 430 uses the GET method for data reception from the relay server 120. Further, assume that the client-side proxy 430 uses different connections as a connection for transmission and a connection for reception.

Figure 29:
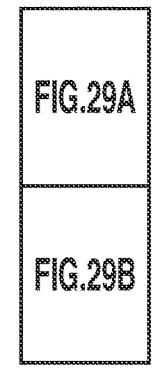
FIG. 29 (consisting of FIGS. 29A and 29B) is a flowchart illustrating an example of processing performed by the PC according to a fifth exemplary embodiment.
Figure 29A:
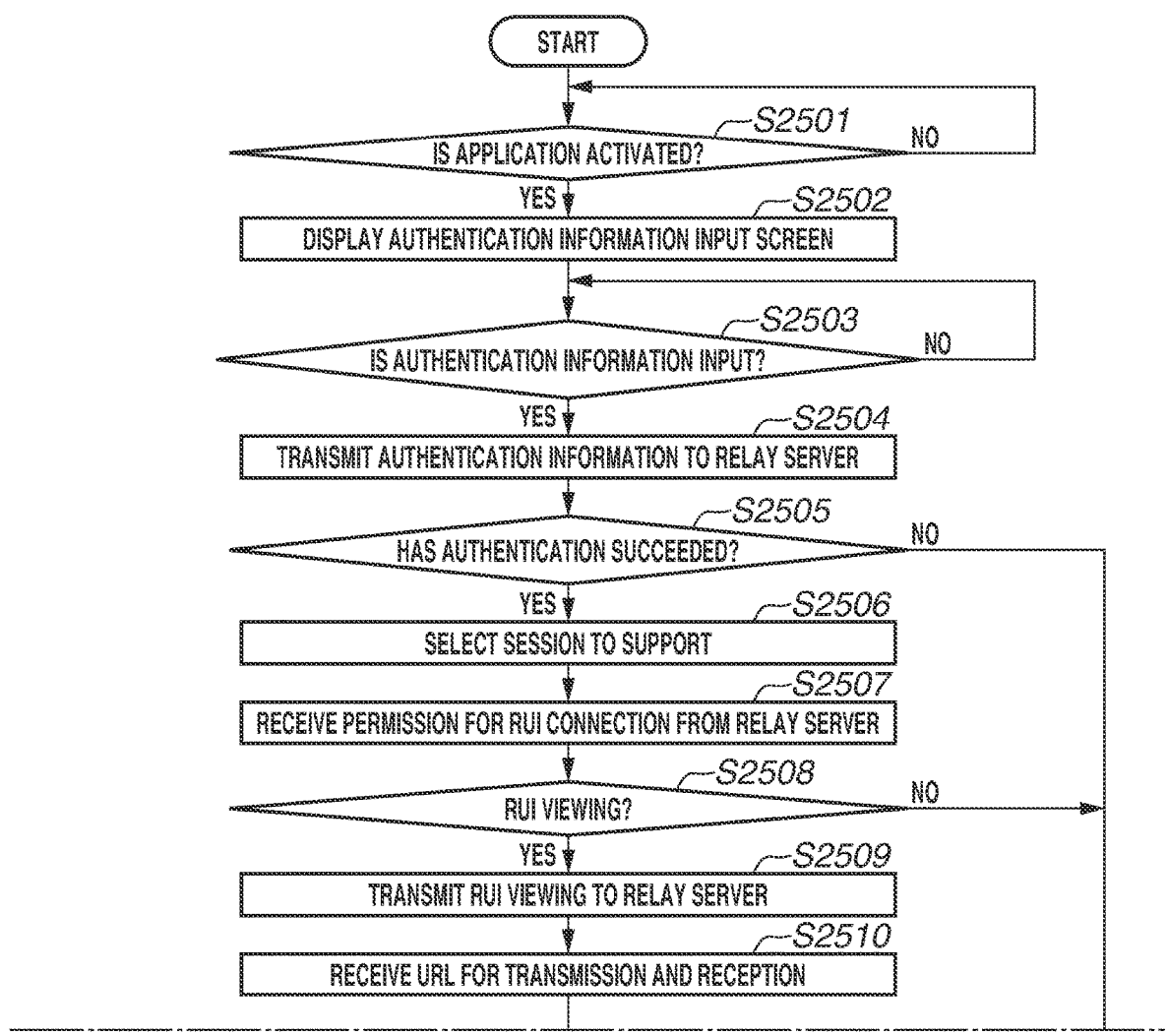
Figure 29B:
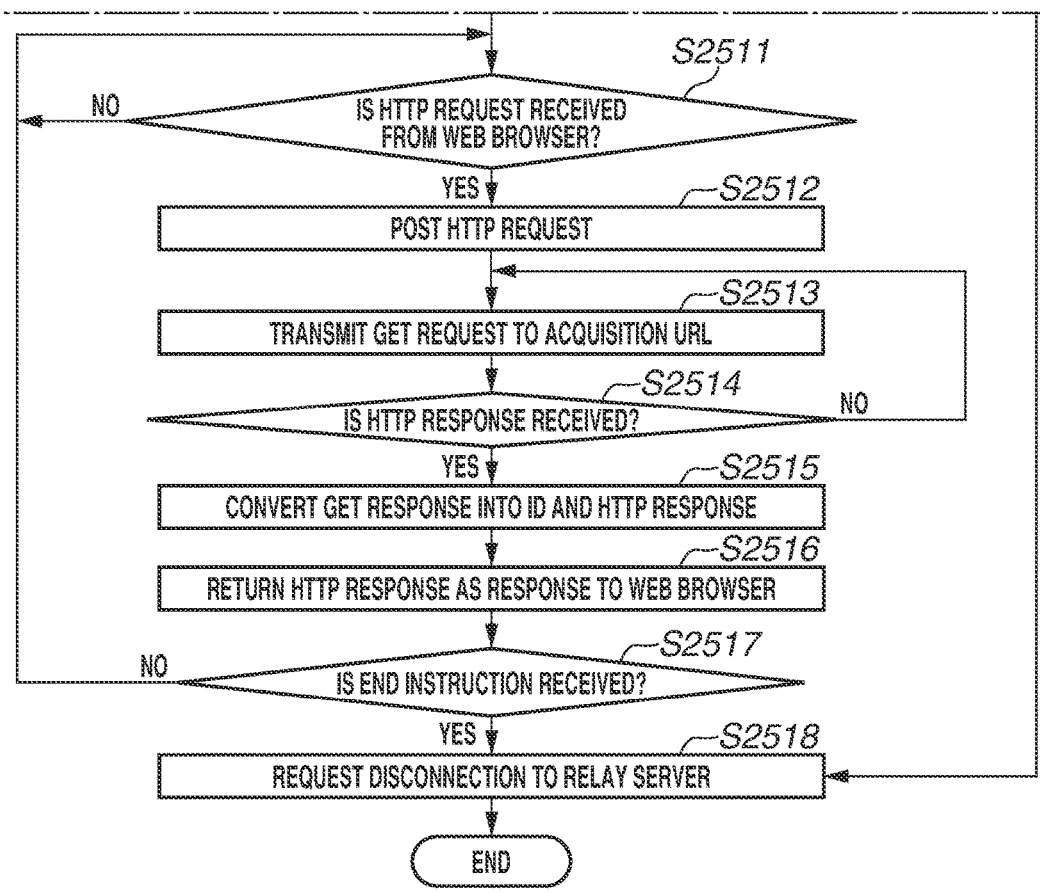

FIG. 29 is a flowchart illustrating an example of processing performed by the PC 103 according to the present exemplary embodiment. Processing from steps S2501 to S2506 is similar to the processing from steps S901 to S906 illustrated in FIG. 11, and therefore, a description thereof is omitted here. In the present exemplary embodiment, assume that the MFP 100 to be supported, which is selected in step S2506, is already communicating with the PC 110.

In step S2507, the client-side proxy 430 receives permission for an RUI connection from the relay server 120. Information about the permission for the RUI connection that is received by the client-side proxy 430 in step S2507 contains information indicating that the RUI communication is already established between the MFP 100 and the PC 110.

In step S2508, the client-side proxy 430 determines whether to carry out RUI viewing. More specifically, the client-side proxy 430 displays a screen that prompts the user to select whether to carry out the RUI viewing on the operation unit 317 of the PC 103 (hereinafter simply referred to as the operation unit 317 in the processing illustrated in FIG. 29). Then, if the client-side proxy 430 receives a selection of carrying out the viewing from the user via the operation unit 317 (YES in step S2508), the processing proceeds to step S2509. On the other hand, if the client-side proxy 430 does not receive the selection of carrying out the viewing from the user via the operation unit 317, i.e., the user requests an end without selecting carrying out the viewing (NO in step S2508), the processing proceeds to step S2518.

In step S2509, the client-side proxy 430 transmits the RUI viewing to the relay server 120.

In step S2510, the client-side proxy 430 stores the storage URL for storage into the RUI request data queue and the acquisition URL for acquisition from the RUI response data queue that are received from the relay server 120, into the HDD 314 of the PC 103 (hereinafter, simply referred to as the HDD 314 in the processing illustrated in FIG. 29).

In step S2511, the client-side proxy 430 determines whether an HTTP request is received from the web browser 431. If the client-side proxy 430 determines that the HTTP request is received (YES in step S2511), the processing proceeds to step S2512. If the client-side proxy 430 determines that the HTTP request is not received (NO in step S2511), the client-side proxy 430 waits for reception of the HTTP request.

In step S2512, the client-side proxy 430 posts the HTTP request received from the web browser 431 to the storage URL stored in the HDD 314. In the present exemplary embodiment, the HTTP request posted from the client-side proxy 430 in step S2512 is deleted in the relay server 120 after being read. Further, in the present exemplary embodiment, the client-side proxy 430 posts the HTTP request transmitted from the web browser 431 to the relay server 120, but the communication system may be configured in such a manner that the client-side proxy 430 deletes the HTTP request after reading it.

In step S2513, the client-side proxy 430 transmits a GET request to the acquisition URL to receive an HTTP response from the RUI response data queue.

In step S2514, the client-side proxy 430 determines whether an HTTP response is received from the relay server 120 in response to the GET request transmitted in step S2513. If the client-side proxy 430 determines that the HTTP response is received (YES in step S2514), the processing proceeds to step S2515. If the client-side proxy 430 determines that the HTTP response is not received (NO in step S2514), the processing returns to step S2513.

In step S2515, the client-side proxy 430 extracts an ID portion from the GET response (HTTP response) received from the relay server 120. More specifically, the client-side proxy 430 converts the GET response to acquire the ID and the HTTP response.

In step S2516, the client-side proxy 430 returns the HTTP response with the ID portion removed therefrom as a response to the HTTP request from the web browser 431.

In step S2517, the client-side proxy 430 determines whether an end instruction is received from the user via the operation unit 317. If the client-side proxy 430 determines that the end instruction is received (YES in step S2517), in step S2518, the client-side proxy 430 issues a disconnection instruction to the relay service 420. Then, the processing illustrated in FIG. 29 ends. On the other hand, if the client-side proxy 430 determines that the end instruction is not received (NO in step S2517), the processing returns to step S2511.

The execution of the above-described processing allows the communication content of the RUI communication between the MFP 100 and the PC 110 to be viewed from the PC 103 on the user side.

Figure 30B:
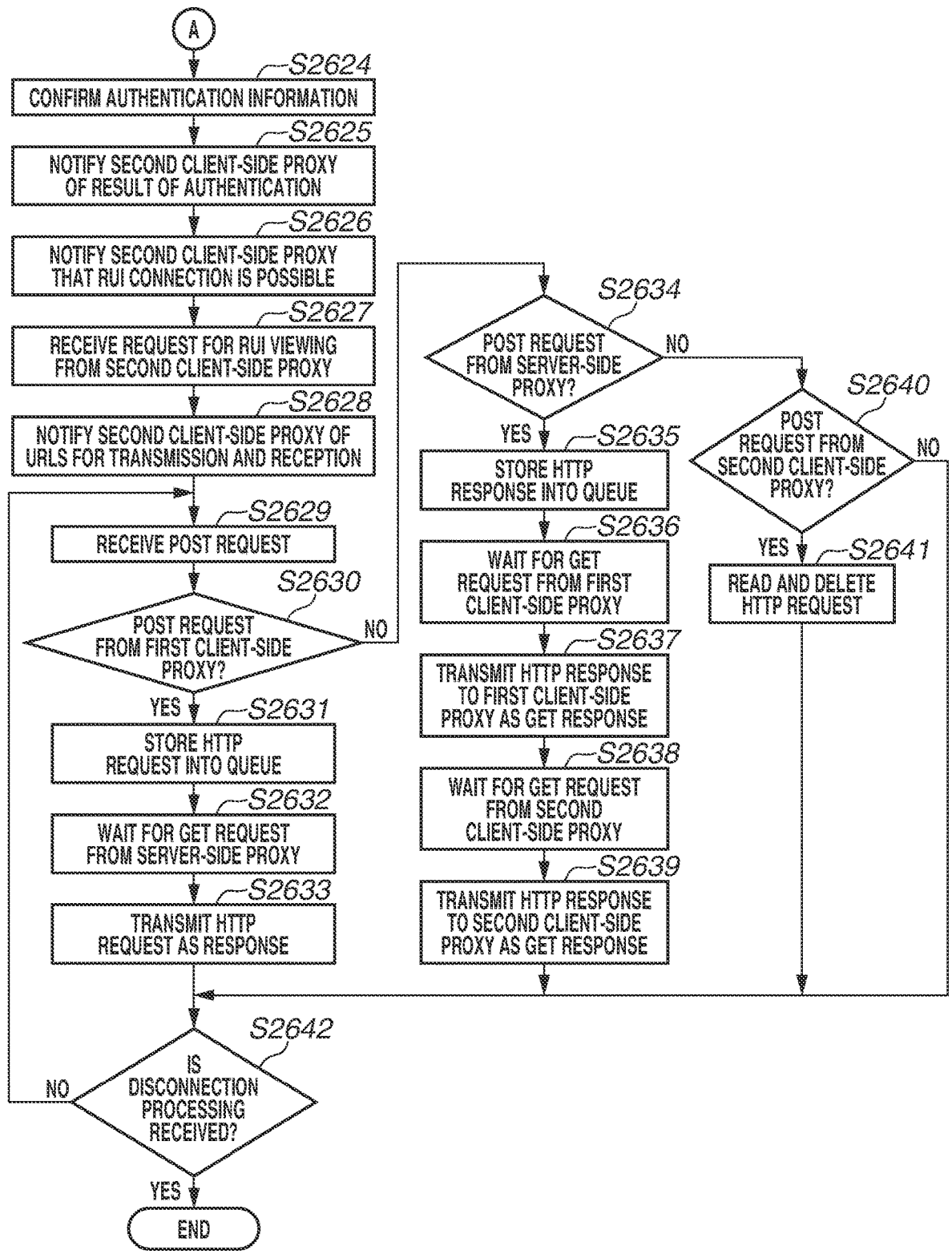
FIG. 30 (consisting of FIGS. 30A and 30B) is a flowchart illustrating an example of processing performed by the relay server according to the fifth exemplary embodiment.

FIG. 30 (consisting of FIGS. 30A and 30B) is a flowchart illustrating an example of processing performed by the relay server 120 according to the present exemplary embodiment.

Processing from steps S2601 to S2619 is similar to the processing from steps S1001 to S1019 illustrated in FIG. 14, and therefore, a description thereof is omitted here. Further, processing from steps S2621 to S2623 is similar to the processing from steps S1021 to S1023 illustrated in FIG. 14, and therefore, a description thereof is omitted here. In FIG. 30, a first client-side proxy indicates the client-side proxy 410 in the PC 110. Further, a second client-side proxy indicates the client-side proxy 430 in the PC 103.

In step S2620, the relay service 420 determines whether the authentication information is received from the client-side proxy 430. If the relay service 420 determines that the authentication information is received (YES in step S2620), the processing proceeds to step S2624. If the relay service 420 determines that the authentication information is not received (NO in step S2620), the processing returns to step S2615.

In step S2624, the relay service 420 confirms the authentication information received from the client-side proxy 430. More specifically, the relay service 420 determines whether to authenticate a connection from the PC 103 by comparing authentication information stored in advance with the authentication information received from the client-side proxy 430.

In step S2625, the relay service 420 notifies the client-side proxy 430 of a result of the authentication.

In step S2626, the relay service 420 notifies the client-side proxy 430 that the RUI connection is possible.

In step S2627, the relay service 420 receives a request for the RUI viewing from the client-side proxy 430. The request for the RUI viewing is an example of a request to acquire the content of the communication.

In step S2628, the relay service 420 notifies the client-side proxy 430 of the URLs for transmission and reception. At this time, the relay service 420 notifies the client-side proxy 430 of the same URLs as the URLs created in step S2613. More specifically, the relay service 420 notifies the client-side proxy 430 of the storage URL for storage into the RUI request data queue, and the acquisition URL for acquisition from the RUI response data queue. These URLs are also used for the MFP 100 and the PC 110 to perform the RUI communication therebetween.

In step S2629, the relay service 420 waits for reception of a POST request.

In step S2630, the relay service 420 determines whether the received POST request is a POST request transmitted from the client-side proxy 410. If the relay service 420 determines that the received POST request is the POST request transmitted from the client-side proxy 410 (YES in step S2630), the processing proceeds to step S2631. On the other hand, if the relay service 420 determines that the received POST request is not the POST request transmitted from the client-side proxy 410 (NO in step S2630), the processing proceeds to step S2634.

In step S2631, the relay service 420 stores the HTTP request into the RUI request data queue.

In step S2632, the relay service 420 waits for a GET request transmitted from the server-side proxy 401 to the acquisition URL for acquisition from the RUI request data queue.

In step S2633, the relay service 420 transmits the HTTP request stored in the RUI request data queue to the server-side proxy 401 as a response to the GET request.

In step S2642, the relay service 420 determines whether the disconnection processing is received from the MFP 100, the PC 110, or the PC 103. If the relay service 420 determines that the disconnection processing is received (YES in step S2642), the processing illustrated in FIG. 30 ends. If the relay service 420 determines that the disconnection processing is not received (NO in step S2642), the processing returns to step S2629.

In step S2634, the relay service 420 determines whether the POST request received in step S2629 is a POST request transmitted from the server-side proxy 401. If the relay service 420 determines that the received POST request is the POST request transmitted from the server-side proxy 401

(YES in step S2634), the processing proceeds to step S2635. On the other hand, if the relay service 420 determines that the received POST request is not the POST request transmitted from the server-side proxy 401 (NO in step S2634), the processing proceeds to step S2640.

In step S2635, the relay service 420 stores the HTTP response received from the server-side proxy 401 into the RUI response data queue.

In step S2636, the relay service 420 waits for a GET request transmitted from the client-side proxy 410 to the acquisition URL.

In step S2637, the relay service 420 transmits the HTTP response stored in the RUI response data queue to the client-side proxy 410 as a response to the GET request.

In step S2638, the relay service 420 waits for the GET request transmitted from the client-side proxy 430 to the acquisition URL.

In step S2639, the relay service 420 transmits the HTTP response stored in the RUI response data queue to the client-side proxy 430 as the response to the GET request. In other words, the relay service 420 transmits the same HTTP response as the HTTP response transmitted to the client-side proxy 410 in step S2637, to the client-side proxy 430. This allows the PC 103 to acquire the communication content of the RUI communication between the MFP 100 and the PC 110.

In step S2640, the relay service 420 determines whether the POST request received in step S2629 is the POST request transmitted from the client-side proxy 430. If the relay service 420 determines that the POST request received in step S2629 is the POST request transmitted from the client-side proxy 430 (YES in step S2640), the processing proceeds to step S2641. On the other hand, if the relay service 420 determines that the POST request received in step S2629 is not the POST request transmitted from the client-side proxy 430 (NO in step S2640), the processing proceeds to step S2642.

In step S2641, the relay service 420 deletes the HTTP request posted from the client-side proxy 430 after reading it. The processing of step S2641 is an example of deletion processing. As a result, the relay service 420 can transmit the latest HTTP response stored in the RUI response data queue for the PC 110 in response to the GET request from the PC 103. In other words, the PC 103 can acquire the communication content of the latest RUI communication between the MFP 100 and the PC 110.

By performing the above-described processing, the relay server 120 can transmit the communication content of the RUI communication between the MFP 100 and the PC 110 to the PC 103. At this time, the relay server 120 can transmit the GET response to the GET request from the PC 103 while replacing the GET response with the latest GET response for the PC 110.

As described above, according to the present exemplary embodiment, the communication content of the RUI communication between the MFP 100 and the PC 110 can be viewed from the PC 103 on the user side. In the present exemplary embodiment, the client-side proxy 430 and the web browser 431 are provided in the PC 103, but they may be provided in the MFP 100. In this case, the communication system may be configured in such a manner that the client-side proxy 430 directly communicates with the server-side proxy 401, and the server-side proxy 401 directly transfers the HTTP response from the web server 402 to the client-side proxy 430. Further, processing performed by the PC 110 is similar to the above-described processing illustrated in FIG. 11, and therefore, a description thereof is omitted here.

A sixth exemplary embodiment is configured to allow RUI communication between the MFP 100 and the PC 110 to be switched to RUI communication between the MFP 100 and the PC 103. Generally, when the service engineer performs maintenance of the user's image forming apparatus, the service engineer asks the customer side to carry out work depending on a content of the work. For example, when the service engineer changes a setting value for recovering the image forming apparatus during the maintenance of the image forming apparatus, this maintenance often involves the work of backing up information in the image forming apparatus into a PC. If the information to be backed up includes confidential information on the customer side, an operation for backing up this information should be performed by the customer side.

The present exemplary embodiment will be described with a configuration that switches the RUI communication performed between the MFP 100 and the PC 110 to a connection between the MFP 100 and the PC 103. Similar configurations of the sixth exemplary embodiment to those of the above-described first to fifth exemplary embodiments will not be described in detail below. Further, assume that a system configuration according to the present exemplary embodiment is similar to the system configuration illustrated in FIG. 27.

Figure 31B:
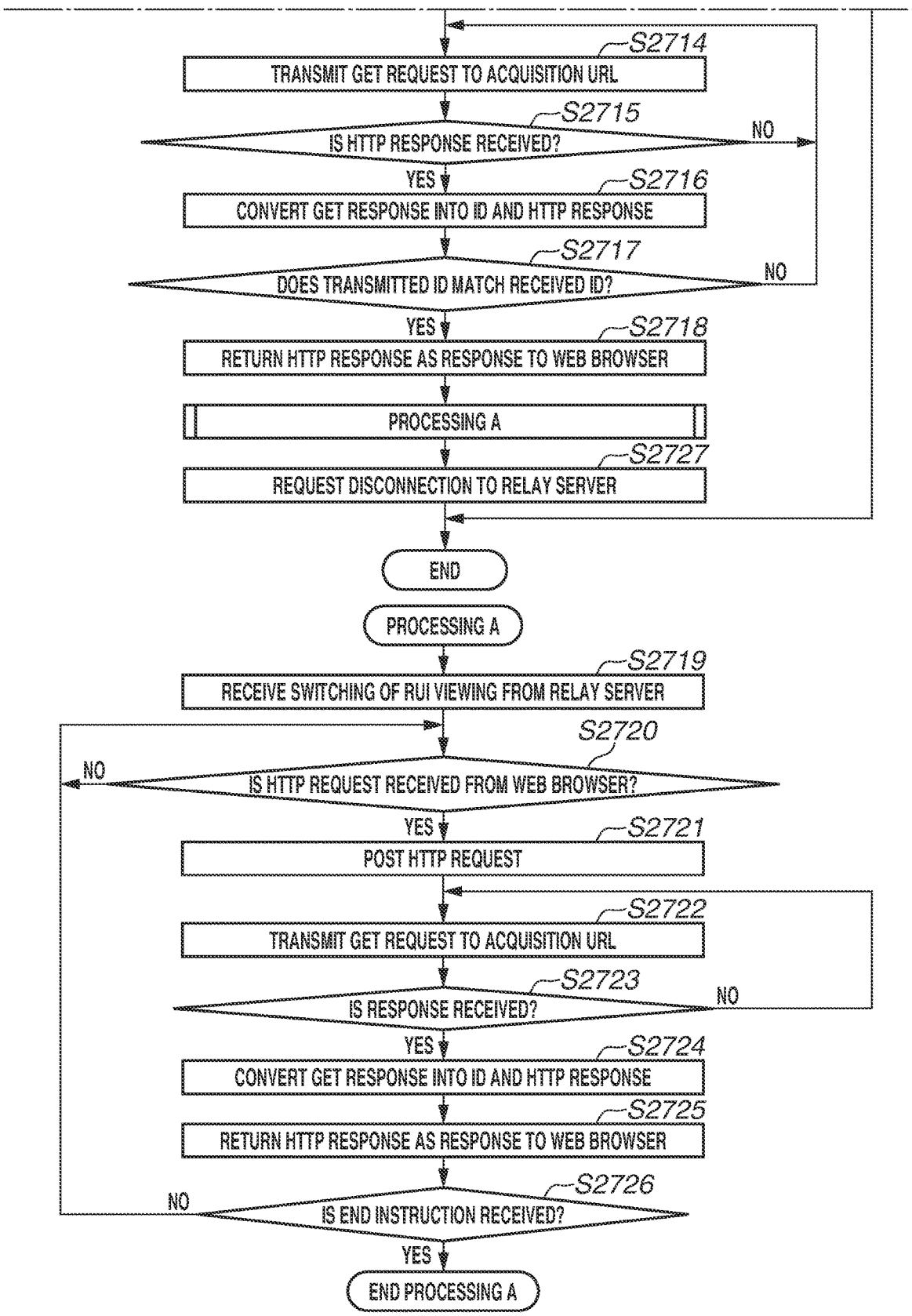
FIG. 31 (consisting of FIGS. 31A and 31B) is a flowchart illustrating an example of processing performed by the PC according to a sixth exemplary embodiment.

FIG. 31 (consisting of FIGS. 31A and 31B) is a flowchart illustrating an example of processing performed by the PC 110 according to the present exemplary embodiment. Processing from steps S2701 to S2718 is similar to the processing from steps S901 to S918 illustrated in FIG. 11, and therefore, a description thereof is omitted here.

In step S2719, the client-side proxy 410 receives a request to switch the RUI viewing from the relay server 120.

In step S2720, the client-side proxy 410 determines whether an HTTP request is received from the web browser 411. If the client-side proxy 410 determines that the HTTP request is received (YES in step S2720), the processing proceeds to step S2721. If the client-side proxy 410 determines that the HTTP request is not received (NO in step S2720), the client-side proxy 410 waits for reception of the HTTP request.

In step S2721, the client-side proxy 410 posts the HTTP request to the relay server 120. The HTTP request posted from the client-side proxy 410 to the relay server 120 in step S2721 is deleted on the relay server 120 side after being read. In the present exemplary embodiment, the client-side proxy 410 posts the HTTP request transmitted from the web browser 411 to the relay server 120, but the communication system may be configured in such a manner that the client-side proxy 410 deletes this HTTP request after reading it.

In step S2722, the client-side proxy 410 transmits a GET request to the acquisition URL to receive an HTTP response from the RUI response data queue.

In step S2723, the client-side proxy 410 determines whether an HTTP response is received from the relay server 120 in response to the GET request transmitted in step S2722. If the client-side proxy 410 determines that the HTTP response is received (YES in step S2723), the processing proceeds to step S2724. If the client-side proxy 410 determines that the HTTP response is not received (NO in step S2723), the processing returns to step S2722. The HTTP response received by the client-side proxy 410 in step S2723 is an HTTP response returned from the MFP 100 toward the PC 103.

In step S2724, the client-side proxy 410 extracts an ID portion from the GET response (HTTP response) received from the relay server 120. More specifically, the client-side proxy 410 converts the GET response to acquire the ID and the HTTP response.

In step S2725, the client-side proxy 410 returns the HTTP response with the ID portion removed therefrom as a response to the HTTP request from the web browser 411.

In step S2726, the client-side proxy 410 determines whether an end instruction is received from the user via the operation unit 317 of the PC 110. If the client-side proxy 410 determines that the end instruction is received (YES in step S2726), in step S2727, the client-side proxy 410 issues a disconnection instruction to the relay service 420. Then, the processing illustrated in FIG. 31 ends. On the other hand, if the client-side proxy 410 determines that the end instruction is not received (NO in step S2726), the processing returns to step S2720.

Figure 32B:
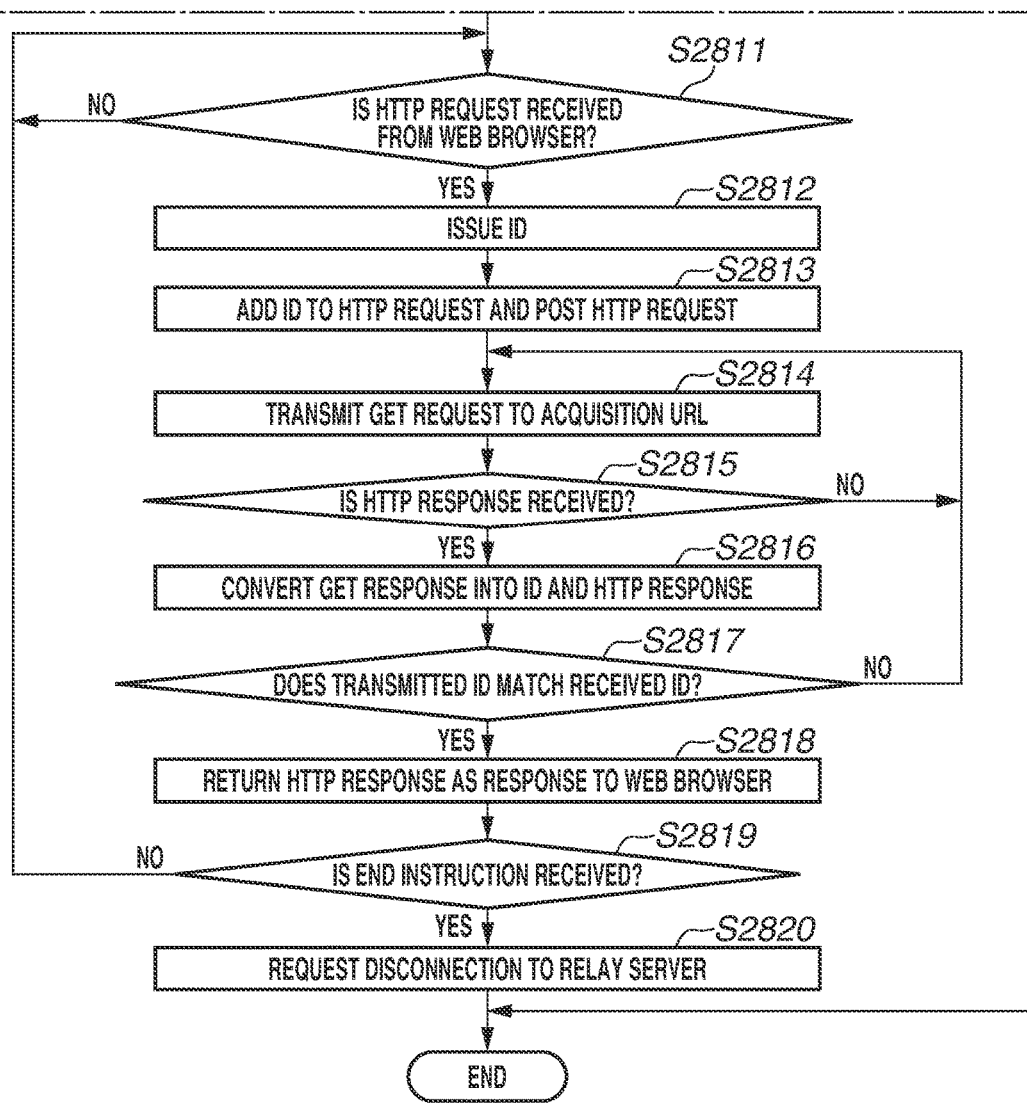
FIG. 32 (consisting of FIGS. 32A and 32B) is a flowchart illustrating an example of processing performed by the PC according to the sixth exemplary embodiment.

FIG. 32 (consisting of FIGS. 32A and 32B) is a flowchart illustrating an example of processing performed by the PC 103 according to the present exemplary embodiment. Processing from steps S2801 to S2820 is similar to the processing from steps S901 to S920 illustrated in FIG. 11, and therefore, a description thereof is omitted here. In the present exemplary embodiment, assume that the MFP 100 to be supported, which is selected in step S2806, is already communicating with the PC 110. Further, in step S2809, the client-side proxy 430 transmits a request for an RUI connection to the relay server 120, which triggers a start of RUI communication between the PC 103 and the MFP 100. The RUI communication between the MFP 100 and the PC 110 that are already communicating with each other is switched to communication only for viewing.

Figure 33B:
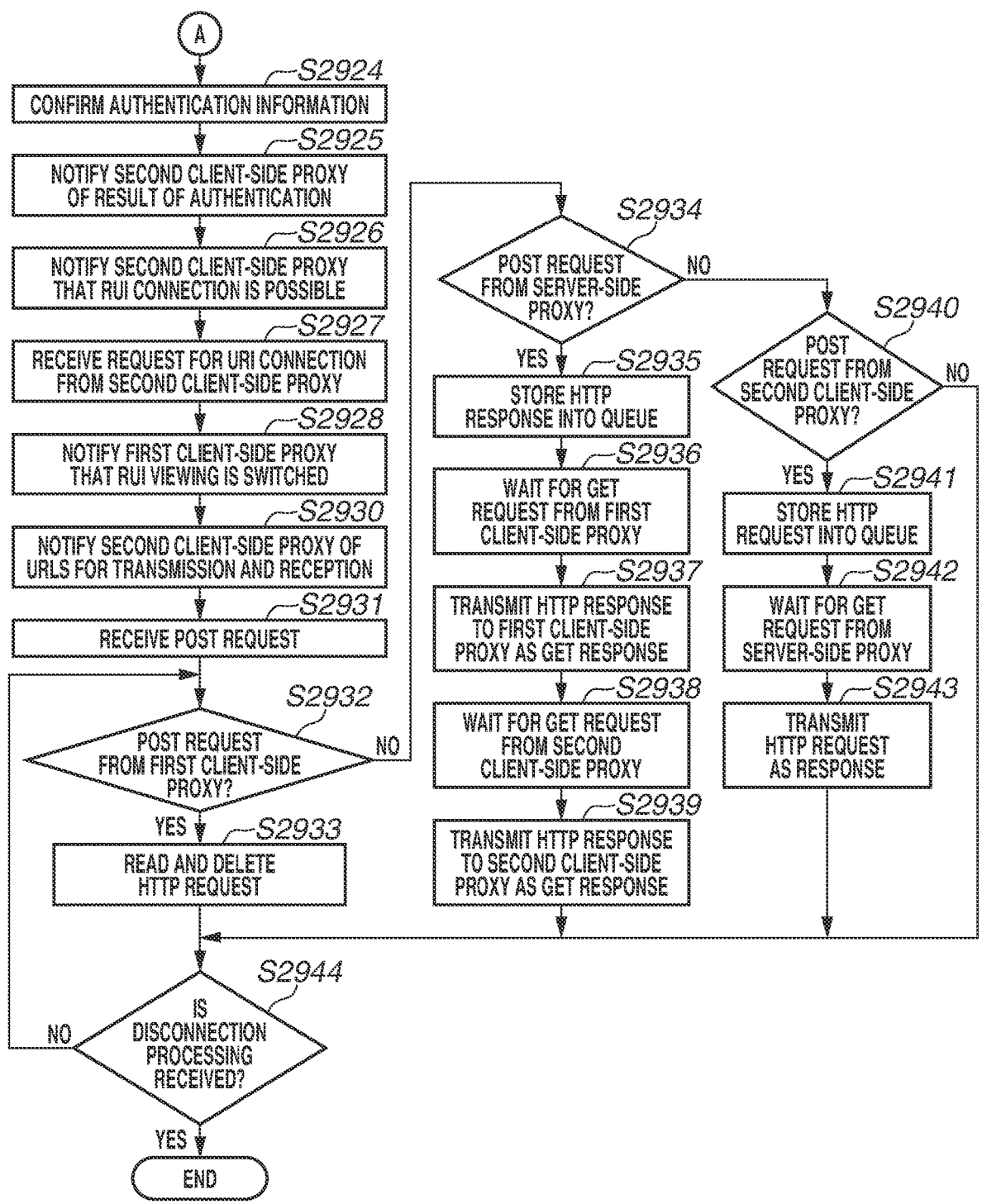
FIG. 33 (consisting of FIGS. 33A and 33B) is a flowchart illustrating an example of processing performed by the relay server according to the sixth exemplary embodiment.

FIG. 33 (consisting of FIGS. 33A and 33B) is a flowchart illustrating an example of processing performed by the relay server 120 according to the present exemplary embodiment.

Processing from steps S2901 to S2926 is similar to the processing from steps S2601 to S2626 illustrated in FIG. 30, and therefore, a description thereof is omitted here.

In step S2927, the relay service 420 receives the request for the RUI connection from the client-side proxy 430.

In step S2928, the relay service 420 notifies the client-side proxy 410 that the RUI communication is switched to the RUI communication for viewing. In this manner, the relay service 420 can switch the communication between the MFP 100 and the PC 110 to the RUI communication only for viewing, and switch the communication in such a manner that operable RUI communication is performed between the MFP 100 and the PC 103.

Processing from steps S2930 to S2932 is similar to the processing from steps S2628 to 2630 illustrated in FIG. 30, and therefore, a description thereof is omitted here.

Processing of steps S2934 and S2940 is similar to the processing of steps S2634 and S2640 illustrated in FIG. 30, and therefore, a description thereof is omitted here.

In step S2933, the relay service 420 deletes the HTTP request posted from the client-side proxy 410 after reading it. The processing of step S2933 is an example of the deletion processing. As a result, the relay service 420 can switch the communication between the MFP 100 and the PC 110 to the RUI communication only for viewing.

Processing from steps S2935 to S2939 is similar to the processing from steps S2635 to S2639 illustrated in FIG. 30, and therefore, a description thereof is omitted here.

In step S2941, the relay service 420 stores the HTTP request into the RUI request data queue.

In step S2942, the relay service 420 waits for the GET request transmitted from the server-side proxy 401 to the acquisition URL for acquisition from the RUI request data queue.

In step S2943, the relay service 420 transmits the HTTP request stored in the RUI request data queue to the server-side proxy 401 as the response to the GET request.

Processing of step S2944 is similar to the processing of step S2642 illustrated in FIG. 30, and therefore, a description thereof is omitted here.

As described above, according to the present exemplary embodiment, the relay server 120 can switch the RUI communication between the MFP 100 and the PC 110 to the RUI communication only for viewing, and switch an operation right in the RUI communication with the MFP 100 to the newly connected PC 103. This allows the relay server 120 to shift the operation right of the service engineer (user of the PC 110) with respect to the MFP 100 to the customer (user of the PC 103).

A seventh exemplary embodiment will be described with a configuration that allows a content of RUI communication between the MFP 100 and the PC 110 to be viewed from the PC 103 on the user (customer) side even when the RUI requires Secure Sockets Layer (SSL) communication (encrypted communication). Similar configurations of the seventh exemplary embodiment to those of the above-described first to sixth exemplary embodiments will not be described in detail below. Further, assume that a system configuration according to the present exemplary embodiment is similar to the system configuration illustrated in FIG. 27.

A flowchart illustrating processing performed when the PC 110 connects to the relay server 120 is as illustrated in FIG. 11 in a similar manner to the fifth exemplary embodiment, but there is a difference in a part of the processing and this difference will be described below. In the processing of step S902 illustrated in FIG. 11, if the client-side proxy 410 determines that the application is activated in step S901, the client-side proxy 410 displays the authentication information input screen on the operation unit 317 of the PC 110. The present exemplary embodiment includes an additional procedure thereto in step S902. In step S902, the client-side proxy 410 carries out SSL negotiation with the relay server 120. As a result, the PC 110 acquires an SSL common key, and performs the HTTP communication with the relay server 120 after that while encrypting all of them.

A flowchart illustrating processing performed when the PC 103 connects to the relay server 120 is as described in the fifth exemplary embodiment with reference to FIG. 29, but there is a difference in a part of the processing and this difference will be described below.

In the processing of step S2502 illustrated in FIG. 29, if the client-side proxy 430 determines that the application is activated in step S2501, the client-side proxy 430 displays the authentication information input screen on the operation unit 317 of the PC 103. The present exemplary embodiment includes an additional procedure thereto in step S2502. In step S2502, the client-side proxy 430 carries out SSL negotiation with the relay server 120. As a result, the PC 103 acquires an SSL common key, and performs the HTTP communication with the relay server 120 after that while encrypting all of them.

A flowchart illustrating processing performed when the relay server 120 connects to the MFP 100 and the PC 110 is as described above in the fifth exemplary embodiment with reference to FIG. 30, and therefore, a description thereof is omitted here.

Figure 34:
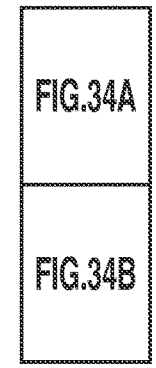
FIG. 34 (consisting of FIGS. 34A and 34B) is a flowchart illustrating an example of processing performed by the MFP according to a seventh exemplary embodiment.
Figure 34A:
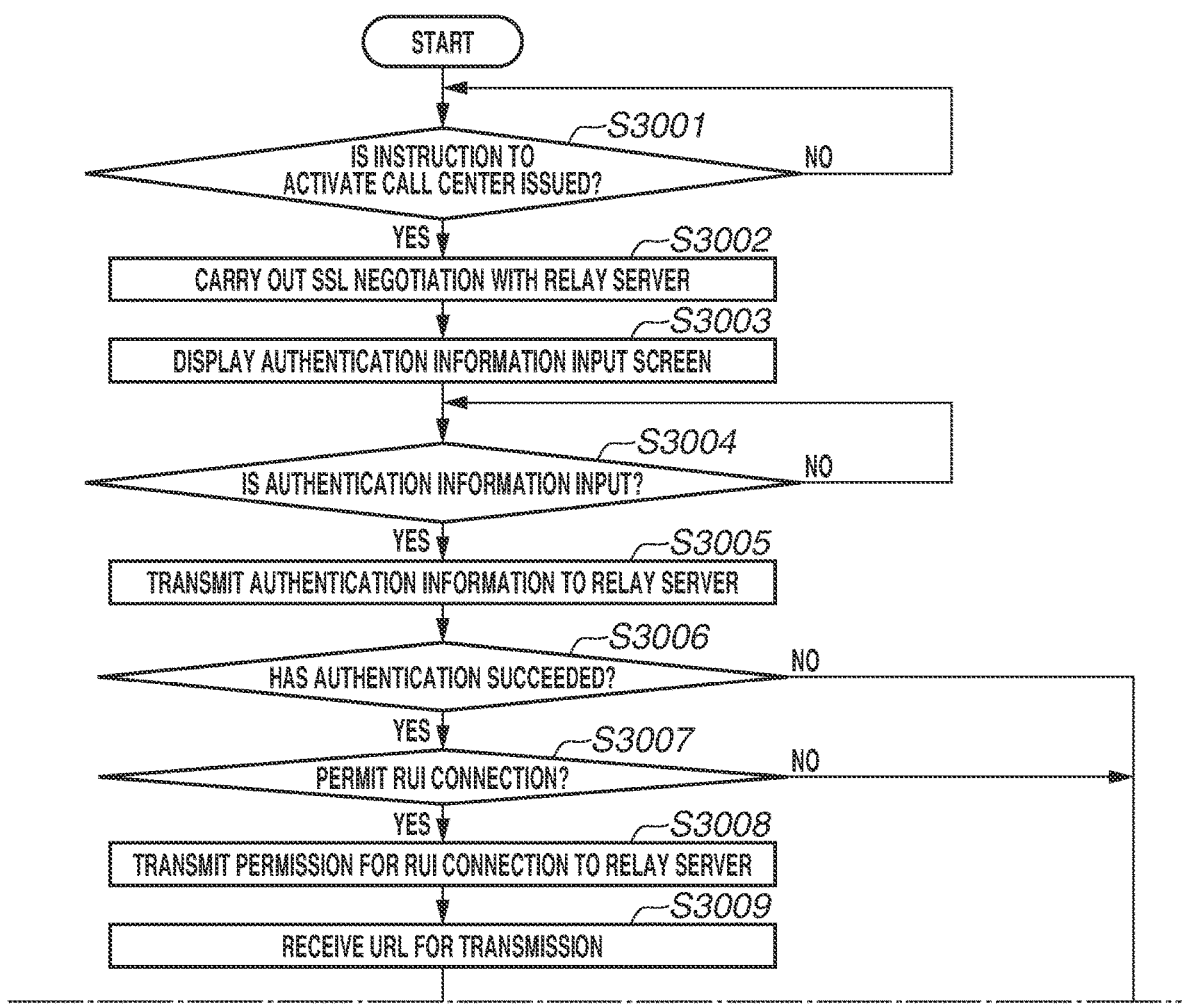
Figure 34B:
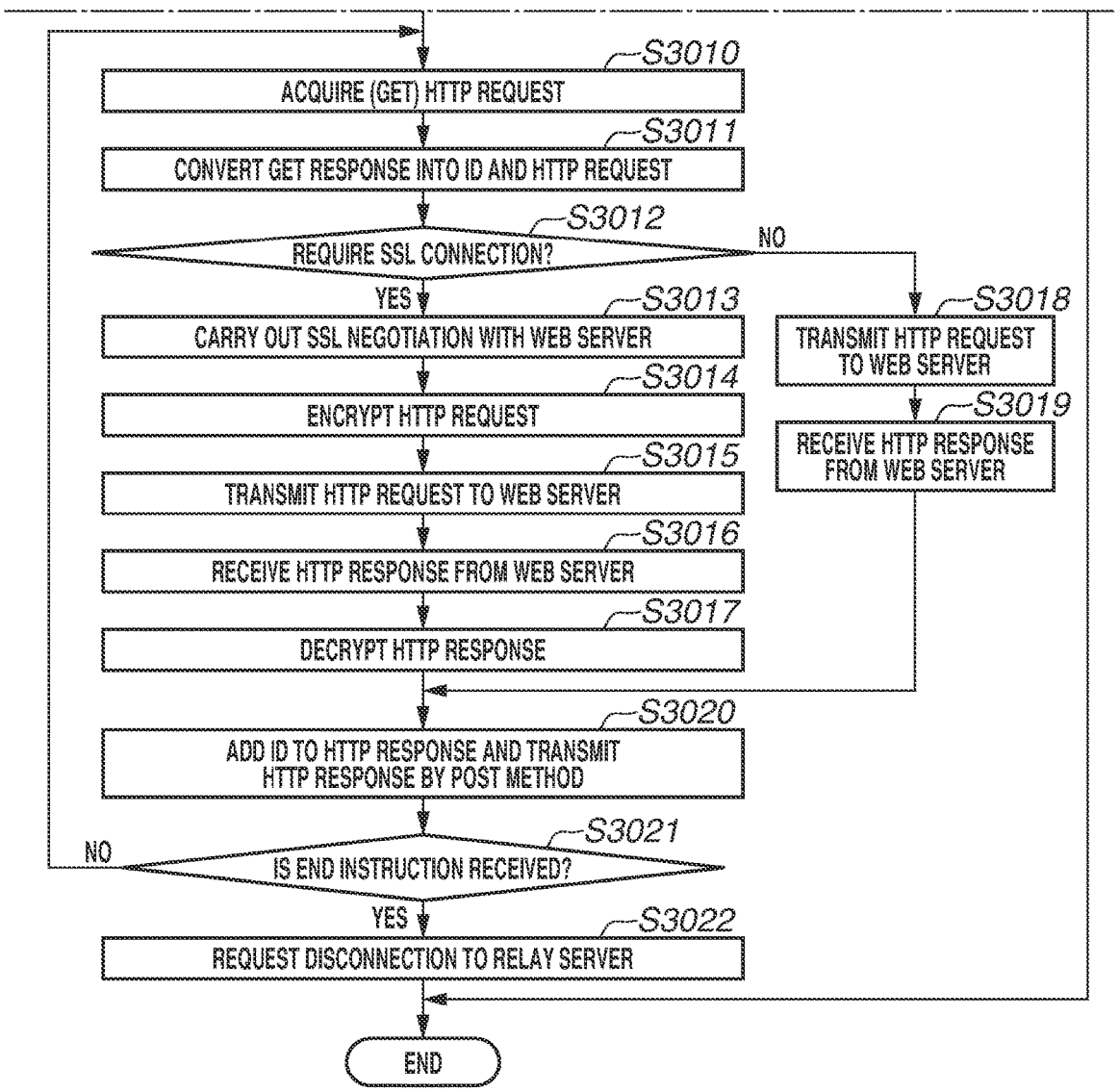

FIG. 34 (consisting of FIGS. 34A and 34B) is a flowchart illustrating an example of processing performed when the MFP 100 connects to the relay server 120 according to the present exemplary embodiment.

In step S3001, the server-side proxy 401 determines whether an instruction to activate the call center is issued via the operation unit 219.

In step S3002, the server-side proxy 401 carries out SSL negotiation with the relay server 120. As a result, the server-side proxy 401 can acquire an SSL common key, and perform the HTTP communication with the relay server 120 after that while encrypting all of them. Processing from steps S3003 to S3011 is similar to the processing from steps S702 to S710 illustrated in FIG. 8, and therefore, a description thereof is omitted here. However, in step S3010, the server-side proxy 401 decrypts the HTTP data acquired by the GET method with use of the SSL common key acquired in step S3002.

In step S3012, upon acquiring the HTTP request by performing the processing of step S3011, the server-side proxy 401 determines whether the web server 402 that is a connection destination of the HTTP request requires an SSL connection. If the server-side proxy 401 determines that the SSL connection is required (YES in step S3012), the processing proceeds to step S3013. If the server-side proxy 401 determines that the SSL connection is not required (NO in step S3012), the processing proceeds to step S3018. As a method used for the determination in step S3012, the server-side proxy 401 may make this determination based on whether the server-side proxy 401 is redirected (guided) to a page based on Hypertext Transfer Protocol Secure (HTTPS) after attempting to connect to the web server 402. At this time, the server-side proxy 401 determines that the SSL connection is required if the server-side proxy 401 is redirected to the page based on HTTPS. Alternatively, the server-side proxy 401 may make this determination by registering information about the web server 402 that requires the SSL connection (registration information) in advance in the HDD 214. The term "HTTPS" stands for "Hypertext Transfer Protocol Secure".

If the server-side proxy 401 determines that the SSL connection is required in step S3012 (YES in step S3012), in step S3013, the server-side proxy 401 carries out SSL negotiation with the web server 402.

In step S3014, the server-side proxy 401 encrypts the HTTP request acquired in step S3011 with use of an SSL common key acquired from the web server 402 in step S3013.

In step S3015, the server-side proxy 401 transmits the HTTP request encrypted in step S3014 to the web server 402.

In step S3016, the server-side proxy 401 receives an encrypted HTTP response from the web server 402 as a response to the request transmitted in step S3015.

In step S3017, the server-side proxy 401 decrypts the HTTP response received in step S3016 with use of the SSL common key. Then, the processing proceeds to step S3020.

If the server-side proxy 401 determines that the SSL connection is not required in step S3012 (NO in step S3012), in step S3018, the server-side proxy 401 transmits the HTTP request to the web server 402.

In step S3019, the server-side proxy 401 receives an HTTP response from the web server 402 as a response to the request transmitted in step S3018. Then, the processing proceeds to step S3020.

After the processing of step S3017 or step S3019, in step S3020, the server-side proxy 401 adds the ID stored in the HDD 214 to the HTTP response received from the web server 402, and transmits this HTTP response to the storage URL to store the HTTP response into the RUI response data queue.

Processing of steps S3021 and S3022 is similar to the processing of steps S714 and S715 illustrated in FIG. 8, and therefore, a description thereof is omitted here.

In this series of processes, the communication pathway between the PC 110 and the MFP 100 is encrypted by SSL, but the server-side proxy 401 decrypts the encrypted HTTP data received from the web server 402 and transmits the decrypted HTTP data to the relay service 420. This allows the PC 103 to monitor the content of the communication between the PC 110 and the MFP 100, when the PC 103 connects after being authenticated by the relay server 120.

As described above, according to the present exemplary embodiment, the content of the RUI communication between the MFP 100 and the PC 110 can be viewed from the PC 103 on the user side even when the RUI requires the SSL communication.

An eighth exemplary embodiment will be described with a configuration in which, even when the RUI requires SSL communication, as long as a connection source (a request source) of an HTTP request received by the web server 402 is not located outside the MFP 100, the connection source is allowed to connect even without an SSL connection. Similar configurations of the eighth exemplary embodiment to those of the above-described first to seventh exemplary embodiments will not be described in detail below. Further, assume that a system configuration according to the present exemplary embodiment is similar to the system configuration illustrated in FIG. 27.

FIG. 35 is a flowchart illustrating an example of processing performed when the MFP 100 connects to the relay server 120 according to the present exemplary embodiment.

Processing from steps S3101 to S3111 is similar to the processing from steps S3001 to S3011 illustrated in FIG. 34, and therefore, a description thereof is omitted here.

In step S3112, the server-side proxy 401 transmits the HTTP request to the web server 402.

In step S3113, the server-side proxy 401 confirms that a connection source of the HTTP request received by the web server 402 is not located outside the MFP 100, i.e., the connection source is located within the MFP 100. At this time, the server-side proxy 401 may be configured to determine that the connection source is not located outside the MFP 100, if this connection is a connection from a local loop-back address. Alternatively, the server-side proxy 401 may be configured to confirm that the connection source is not located outside the MFP 100 based on a certificate (certification information) owned by the connection source. More specifically, the server-side proxy 401 may be configured to determine that the connection source is not located outside the MFP 100, if a certificate stored in advance matches the certificate owned by the connection source. As described above, in the present exemplary embodiment, if the connection source of the HTTP request received by the web server 402 is not located outside the MFP 100, the connection source is allowed to connect even without the SSL connection.

After the server-side proxy 401 confirms that the connection source of the HTTP request received by the web server 402 is not located outside the MFP 100 in step S3113, the processing proceeds to step S3114. On the other hand, if the server-side proxy 401 confirms that the connection source of the HTTP request is located outside the MFP 100 in step S3113, the server-side proxy 401 terminates an unsecured (unencrypted) connection with this connection source. Then, the processing illustrated in FIG. 35 ends.

In step S3114, the server-side proxy 401 receives an HTTP response from the web server 402 as a response to the request transmitted in step S3112.

Processing from steps S3115 to S3117 is similar to the processing from steps S3020 to S3022 illustrated in FIG. 34, and therefore, a description thereof is omitted here.

Processing performed when the PC 110 and the PC 103 connect to the relay server 120 is as described in the seventh exemplary embodiment with reference to FIGS. 11 and 29, and therefore, a description thereof is omitted here. Further, processing performed when the relay server 120 connects to the MFP 100 and the PC 110 is as described above in the fifth exemplary embodiment with reference to FIG. 30, and therefore, a description thereof is omitted here. The present exemplary embodiment has been described assuming that the RUI requires the SSL communication, but may be configured in such a manner that the server-side proxy 401 determines whether the web server 402 requires the SSL connection, like step S3012 illustrated in FIG. 34.

As described above, according to the present exemplary embodiment, even when the RUI requires the SSL communication, as long as the connection source of the HTTP request received by the web server 402 is located within the MFP 100, the connection source is allowed to connect even without the SSL connection. As a result, if the connection source is located within the MFP 100, this connection source becomes able to view the HTTP data within the MFP 100 even when the RUI requires the SSL connection.

Other Exemplary Embodiments

Further, the present invention can be also realized by performing the following processing. That is, the present invention can be realized by performing processing for supplying software (a program) for achieving the functions of the above-described exemplary embodiments to a system or an apparatus via a network or various kinds of storage media, and causing a computer (or a CPU, a micro processing unit (MPU), or the like) of this system or apparatus to readout and execute the program.

Further, similar effects can be acquired even when the MFP 100 included in the system according to the above-described respective exemplary embodiments is replaced with another information processing apparatus such as a PC, a server apparatus, and a tablet terminal.

As described above, according to the above-described respective exemplary embodiments, it is possible to improve the convenience in use of a web service in a secure communication environment. More specifically, the user can connect to, from an information processing apparatus located inside a firewall, a web service function of an image forming apparatus located inside a different firewall via the Internet. This allows the user to use a function such as the backup function and the restoring function in the web service from the information processing apparatus.

According to the present invention, it is possible to improve the convenience in use of a web service in a secure communication environment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus configured to communicate, via a relay server, with a communication apparatus including a web server, the information processing apparatus comprising:
a memory device that stores a set of instructions; and
at least one processor that executes the set of instructions to:
generate a first request to the web server in the communication apparatus in accordance with Hypertext Transfer Protocol (HTTP);
generate a second request to the relay server in accordance with HTTP, the second request including the generated first request;
transmit, to the relay server via a first firewall, the generated second request for storing the first request in the relay server;
transmit, to the relay server via the first firewall, a third request for getting a first response to the first request stored in the relay server, the first response to the first request being transmitted by the communication apparatus to the relay server via a second firewall; and
acquire the first response to the first request included in a second response to the third request.

2. The information processing apparatus according to claim 1, wherein the first request by the information processing apparatus is a request for operating Remote User Interface (RUI) provided by the web server of the communication apparatus.

3. The information processing apparatus according to claim 2, wherein the communication apparatus accepts, not via the relay server, a request for accessing the RUI provided by the web server from another information processing apparatus in accordance with HTTP, wherein the information processing apparatus communicates with the another information processing apparatus without any firewall.

4. The information processing apparatus according to claim 2, wherein the RUI of the communication apparatus is used for backing up information in the communication apparatus into another apparatus.

5. The information processing apparatus according to claim 1, wherein the information processing apparatus includes client side proxy for communicating with the relay server.

6. The information processing apparatus according to claim 1, wherein the communication apparatus is an image forming apparatus including a printer, and, the information processing apparatus is a terminal device which is used by a service engineer for performing remote maintenance of the image forming apparatus.

7. The information processing apparatus according to claim 1, wherein the information processing apparatus is configured to communicate with the communication apparatus in a first state and in a second state,
wherein the information processing apparatus is able to operate the communication apparatus and another information processing apparatus is not able to operate the communication apparatus in the first state, and the information processing apparatus is able to display an operation screen of the communication apparatus and the another information processing apparatus is able to operate the communication apparatus in the second state.

8. The information processing apparatus according to claim 1, wherein the at least one processor executes instructions in the memory device to:
generate the second request including the first request and identification information of the first request; and
determine an acquired response as the first response to the first request, in a case where identification information included in the second response matches the identification information included in the second request.

9. The information processing apparatus according to claim 1, wherein the at least one processor executes instructions in the memory device to:
receive the second response that is identified based on address information notified in response to the transmitted second request.

10. The information processing apparatus according to claim 1, wherein the first request is a GET request of HTTP to the web server, the second request is a POST request of HTTP to the relay server, and, the third request is a GET request of HTTP to the relay server.

11. A communication apparatus configured to communicate, via a relay server, with an information processing apparatus, the communication apparatus comprising:
a memory device that stores a set of instructions; and
at least one processor that executes the set of instructions to:
get, from the relay server via a second firewall, information including a first request by the information processing apparatus to a web server in the communication apparatus;
acquire the first request from the got information;
generate a response in accordance with Hypertext Transfer Protocol (HTTP) to the first request by the information processing apparatus;
generate a fourth request to the relay server in accordance with HTTP, the fourth request including the generated response to the first request; and transmit, to the relay server via the second firewall, the generated fourth request for storing, in the relay server, the generated response to the first request by the information processing apparatus, wherein the generated response to the first request is got by the information processing apparatus from the relay server via a first firewall.

12. The communication apparatus according to claim 11, wherein the first request by the information processing apparatus is a request for operating Remote User Interface (RUI) provided by the web server of the communication apparatus.

13. The communication apparatus according to claim 12, wherein the at least one processor executes instructions in the memory device to:
accept, not via the relay server, a request for accessing the RUI provided by the web server from another information processing apparatus which is connected to the communication apparatus not via any firewall.

14. The communication apparatus according to claim 12, wherein the RUI of the communication apparatus is used for backing up information in the communication apparatus into another apparatus.

15. The communication apparatus according to claim 11, wherein the communication apparatus includes server side proxy for communicating with the relay server.

16. The communication apparatus according to claim 11, wherein the communication apparatus is an image forming apparatus including a printer, and, the information processing apparatus is a terminal device which is used by a service engineer for performing remote maintenance of the image forming apparatus.

17. The communication apparatus according to claim 11, wherein the at least one processor executes instructions in the memory device to:
get the information including the first request and identification information, and
generate the second request including the identification information and the generated response to the first request.

18. The communication apparatus according to claim 11, wherein the at least one processor executes instructions in the memory device to:
get the information including the first request and address information, and
transmit the generated fourth request based on the address information.

19. The communication apparatus according to claim 11, wherein the first request is a GET request of HTTP to the web server in the communication apparatus and the fourth request is a POST request of HTTP to the relay server.

20. A system comprising:
an information processing apparatus;
a communication apparatus; and
a relay server,
wherein the information processing apparatus comprising:
a memory device that stores a set of instructions; and
at least one processor that executes the set of instructions to:
generate a first request to a web server in the communication apparatus in accordance with Hypertext Transfer Protocol (HTTP);
generate a second request to the relay server in accordance with HTTP, the second request including the generated first request;

transmit, to the relay server via a first firewall, the generated second request for storing the first request in the relay server;

transmit, to the relay server via the first firewall, a third request for getting a first response to the first request stored in the relay server, the first response to the first request being transmitted by the communication apparatus to the relay server via a second firewall; and acquire the first response to the first request included in a second response to the third request; and wherein the communication apparatus comprising:

a memory device that stores a set of instructions; and at least one processor that executes the set of instructions to:

get, from the relay server via the second firewall, information including the first request by the information processing apparatus to the web server in the communication apparatus;

acquire the first request from the got information;

generate the first response in accordance with Hypertext Transfer Protocol (HTTP) to the first request by the information processing apparatus;

generate a fourth request to the relay server in accordance with HTTP, the fourth request including the generated first response to the first request; and transmit, to the relay server via the second firewall, the generated fourth request for storing, in the relay server, the generated first response to the first request by the information processing apparatus.

21. The system according to claim 20, wherein the first request by the information processing apparatus is a request for operating Remote User Interface (RUI) provided by the web server of the communication apparatus.

22. The system according to claim 21, wherein the communication apparatus accepts, not via the relay server, a request for accessing the RUI provided by the web server from another information processing apparatus in accordance with HTTP, and wherein the information processing apparatus communicates with the anther information processing communicates without any firewall.

23. The system according to claim 21, wherein the RUI of the communication apparatus is used for backing up information in the communication apparatus into another apparatus.

24. The system according to claim 20, wherein the information processing apparatus includes client side proxy for communicating with the relay server, and, the communication apparatus includes server side proxy for communicating with the relay server.

25. The system according to claim 20, wherein the communication apparatus is an image forming apparatus including a printer, and, the information processing apparatus is a terminal device which is used by a service engineer for performing remote maintenance of the image forming apparatus.

26. An information processing method performed by an information processing apparatus configured to communicate, via a relay server, with a communication apparatus including a web server, the method comprising:

generating a first request to the web server in the communication apparatus in accordance with Hypertext Transfer Protocol (HTTP);

generating a second request to the relay server in accordance with HTTP, the second request including the generated first request;

transmitting, to the relay server via a first firewall, the generated second request for storing the first request in the relay server;

transmitting, to the relay server via the first firewall, a third request for getting a first response to the first request stored in the relay server, the first response to the first request being transmitted by the communication apparatus to the relay server via a second firewall; and acquiring the first response to the first request included in a second response to the third request.

27. The method according to claim 26, wherein the first request by the information processing apparatus is a request for operating Remote User Interface (RUI) provided by the web server of the communication apparatus.

28. The method according to claim 27, wherein the communication apparatus accepts, not via the relay server, a request for accessing the RUI provided by the web server from another information processing apparatus in accordance with HTTP, wherein the information processing apparatus communicates with the anther information processing communicates without any firewall.

29. The method according to claim 27, wherein the RUI of the communication apparatus is used for backing up information in the communication apparatus into other apparatus.

30. The method according to claim 26, wherein the information processing apparatus including client side proxy for communicating with the relay server, and, the communication apparatus including server side proxy for communicating with the relay server.

31. The method according to claim 26, wherein the communication apparatus is an image forming apparatus including a printer, and, the information processing apparatus is a terminal device which is used by a service engineer for performing remote maintenance of the image forming apparatus.

32. A communication method performed by a communication apparatus configured to communicate, via a relay server, with an information processing apparatus, the method comprising:

getting, from the relay server via a second firewall, information including a first request by the information processing apparatus to a web server in the communication apparatus;

acquiring the first request from the got information;

generating a response in accordance with Hypertext Transfer Protocol (HTTP) to the first request by the information processing apparatus;

generating a fourth request to the relay server in accordance with HTTP, the fourth request including the generated response to the first request; and transmitting, to the relay server via the second firewall, the generated fourth request for storing, in the relay server, the generated response to the first request by the information processing apparatus, wherein the generated response to the first request is got by the information processing apparatus from the relay server via a first firewall.

33. The method according to claim 32, wherein the first request by the information processing apparatus is a request for operating Remote User Interface (RUI) provided by the web server of the communication apparatus.

34. The method according to claim 33, wherein the communication apparatus accepts, not via the relay server, a request for accessing the RUI provided by the web server from another information processing apparatus in accordance with HTTP, and wherein the information processing apparatus communicates with the anther information processing communicates without any firewall.

35. The method according to claim 33, wherein the RUI of the communication apparatus is used for backing up information in the communication apparatus into another apparatus.

36. The method according to claim 32, wherein the information processing apparatus includes client side proxy for communicating with the relay server, and, the communication apparatus includes server side proxy for communicating with the relay server.

37. The method according to claim 32, wherein the communication apparatus is an image forming apparatus including a printer, and, the information processing apparatus is a terminal device which is used by a service engineer for performing remote maintenance of the image forming apparatus.

38. A non-transitory computer readable storage medium storing a program for causing a processor to execute a method of controlling an information processing apparatus configured to communicate, via a relay server, with a communication apparatus including a web server, the method comprising:

generating a first request to the web server in the communication apparatus in accordance with Hypertext Transfer Protocol (HTTP);

generating a second request to the relay server in accordance with HTTP, the second request including the generated first request;

transmitting, to the relay server via a first firewall, the generated second request for storing the first request in the relay server;

transmitting, to the relay server via the first firewall, a third request for getting a first response to the first request stored in the relay server, the first response to the first request being transmitted by the communication apparatus to the relay server via a second firewall; and acquiring the first response to the first request included in a second response to the third request.

39. A non-transitory computer readable storage medium storing a program for causing a processor to execute a method of controlling a communication apparatus configured to communicate, via a relay server, with an information processing apparatus, the method comprising:

getting, from the relay server via a second firewall, information including a first request by the information processing apparatus to a web server in the communication apparatus;

acquiring the first request from the got information;

generating a response in accordance with Hypertext Transfer Protocol (HTTP) to the first request by the information processing apparatus;

generating a fourth request to the relay server in accordance with HTTP, the fourth request including the generated response to the first request; and transmitting, to the relay server via the second firewall, the generated fourth request for storing, in the relay server, the generated response to the first request by the information processing apparatus, wherein the generated response to the first request is got by the information processing apparatus from the relay server via a first firewall.

40. The information processing apparatus according to claim 2, wherein the at least one processor executes instructions in the memory device to perform an encrypted HTTP communication with the relay sever by using Secure Sockets Layer (SSL) common key, when the RUI requires SSL communication.

41. The method according to claim 27, wherein the information processing apparatus performs encrypted HTTP communication with the relay sever by using Secure Sockets Layer (SSL) common key, when the RUI requires SSL communication.

42. The communication apparatus according to claim 12, wherein the RUI requires Secure Sockets Layer (SSL) communication.

43. The method according to claim 33, wherein the RUI requires Secure Sockets Layer (SSL) communication.

* * * * *